US011758407B2

(12) United States Patent
Peng

(10) Patent No.: US 11,758,407 B2
(45) Date of Patent: Sep. 12, 2023

(54) CONSTRUCTION METHOD OF TFDMA RANDOM SELF-ORGANIZING AD HOC NETWORK

(71) Applicant: HUAZHONG UNIVERSITY OF SCIENCE AND TECHNOLOGY, Hubei (CN)

(72) Inventor: Li Peng, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 244 days.

(21) Appl. No.: 17/352,337

(22) Filed: Jun. 20, 2021

(65) Prior Publication Data
US 2021/0368346 A1 Nov. 25, 2021

(30) Foreign Application Priority Data

Jun. 20, 2020 (CN) .......................... 202010569496.X

(51) Int. Cl.
*H04W 16/02* (2009.01)
*H04L 5/00* (2006.01)
*H04L 27/32* (2006.01)
*H04W 72/0446* (2023.01)
*H04W 74/08* (2009.01)
*H04W 84/18* (2009.01)

(52) U.S. Cl.
CPC ........... *H04W 16/02* (2013.01); *H04L 5/0005* (2013.01); *H04L 27/32* (2013.01); *H04W 72/0446* (2013.01); *H04W 74/0833* (2013.01); *H04W 84/18* (2013.01)

(58) Field of Classification Search
CPC ............ H04W 72/0446; H04W 16/10; H04W 74/0833; H04W 16/02; H04W 84/18; H04W 48/10; H04W 4/70; H04W 72/51; H04W 72/0453; H04L 5/0005; H04L 27/32; H04L 67/12; H04B 7/2606
See application file for complete search history.

(56) References Cited

U.S. PATENT DOCUMENTS

2017/0214414 A1 7/2017 Peng et al.

FOREIGN PATENT DOCUMENTS

CN 105680992 6/2016

*Primary Examiner* — Jung Liu
(74) *Attorney, Agent, or Firm* — JCIPRNET

(57) ABSTRACT

The disclosure discloses a method for constructing a TFDMA random self-organizing ad hoc network: the total spectrum bandwidth W is divided into N=W/Δf sub-channels, and Δf represents the bandwidth of one sub-channel. 24 hours a day is divided into U epochs, V time frames, S time slots, and E time chips. In an epoch of sub-channel bandwidth Δf, the last time slot is connected to the first time slot to form a time-frequency loop net. The N epoch-ring net corresponding to the N sub-channels are stacked together in a manner of time slot alignment to form a cylindrical web. A web is reused U times to cover the full spectrum bandwidth W and 24 hours a day, forming a time-frequency division multiple access self-organizing network.

9 Claims, 14 Drawing Sheets

CONSTRUCTION METHOD OF TFDMA RANDOM SELF-ORGANIZING AD HOC NETWORK

CROSS-REFERENCE TO RELATED APPLICATION

This application claims the priority benefit of China application no. 202010569496.X, filed on Jun. 20, 2020. The entirety of the above-mentioned patent application is hereby incorporated by reference herein and made a part of this specification.

BACKGROUND

Field of the Disclosure

The disclosure belongs to the technical field of wireless communication networks in communication transmission systems, and more specifically, relates to a construction method for TFDMA random self-organizing ad hoc networks. The method involves the framework structure design of time-frequency division multiple access (TFDMA) random access ad hoc networks, as well as the multi-dimensional dual-domain modulation signal modeling and multi-dimensional high-order dual-domain modulation signal permutation array constellation diagram architecture suitable for accessing TFDMA ad hoc networks, and their structural design methods.

Description of Related Art

In order to satisfy the application requirements that multiple robots can operate simultaneously in the future, such as the operation of multiple flying robots (UAVs) making turns simultaneously and carrying heavy objects jointly when flying in the air, it is required to measure the synchronous behavior of multiple robots and control signals to perform reliable (uninterrupted) transmission. To meet the above requirement, the inventor of the disclosure provides a time-frequency division multiple access self-organizing wireless access ad hoc network model, which is referred to as TFDMA ad hoc network, abbreviated as TFDMA network. The purpose of TFDMA network is to support the transmission requirement for measurement of simultaneous operation of multiple robots and signal control. In order for this TFDMA ad hoc network to operate normally, it is necessary to design a coded modulation access signal model for the physical layer of the transceiver that allows multiple users to access the TFDMA network, and construct a modulation signal constellation diagram that can access the TFDMA ad hoc network, thereby establishing a system structure of which the transceiver system can be designed based on the constellation diagram in the future. Another application is that the TFDMA network enables large-scale sensors or large-scale machines to access the network without mutual interference, so that the user access density can be increased significantly by 10 times or even 100 times that of the user density of existing technology Zigbee.

For a TFDMA transceiver running in a TFDMA network, its physical layer coding, modulation, and access signal models are established based on the permutation matrix, and a permutation matrix is isomorphic with a permutation codeword (permutation vector). At present, the permutation code set with application prospects is coset partition based (n,n(n−1), n−1) permutation group code. In other words, the constellation diagram having the coding, modulation, and access signal with TFDMA characteristics will consist of a subset of the coset partition based permutation group codes. In the early stage of the inventor's project, a coset partition based construction method for (n,n(n−1),n−1) permutation group code and code set generator thereof have been provided, and for which an disclosure patent was applied with the CNIPA (China National Intellectual Property Administration); the application or patent number of the disclosure is 201610051144.9. In the meantime, a oversea disclosure patent was filed for the above disclosure with the United States Patent and Trademark Office (USTPO, Application Number: 15060111) (Title of Disclosure: COSET PARTITION BASED CONSTRUCTION METHOD FOR (n,n(n−1),n−1) PERMUTATION GROUP CODE AND CODE SET GENERATOR THEREOF). Currently, the patent right of disclosure has been obtained.

SUMMARY OF THE DISCLOSURE

Based on the algebraic structure of the coset partition based (n,n(n−1), n−1) permutation group code, the inventor of the disclosure provides an n-dimensional dual-domain modulation signal model and n-dimensional high-order dual-domain modulation signal permutation array constellation diagram. Therefore, the disclosure seek to protect three core contents: the first one is the TFDMA random access ad hoc network framework, which is suitable for interference-free access of robots in high intensity, and can support simultaneous access and operation of multiple robots; the second one is permutation matrix based n-dimensional dual-domain modulation signal model; and the third one is a structure of permutation array constellation diagram of the n-dimensional high-order dual-domain modulation signal. In the disclosure, the time diversity and modulation domain diversity are simultaneously introduced into the permutation matrix based signal model. An encoding gain and a spread spectrum gain are introduced into the permutation modes based permutation array constellation diagram. All of the above advantages allow the signal model and its signal constellation diagram to have higher reliability, thus capable of resisting multipath interference, continuous narrow-band signal interference (such as the narrow pulse of the factory's FM equipment), wide-band pulse interference (such as noise from electronic ignition devices) and multi-user interference. In the disclosure, the permutation array constellation diagram framework can provide encoding, decoding and detection algorithm with ultra-low complexity due to its high algebraic structure characteristics. It can be predicted that a TFDMA transceiver equipped with an n-dimensional high-order dual-domain modulation signal permutation array constellation diagram can effectively access the TFDMA ad hoc network.

The disclosure provides a construction method for a TFDMA random self-organizing ad hoc network, which divides the spectrum resources of the full frequency domain as well as the full time domain resources in 24 hours a day occupied by the network system. First, the divided frequency domain and time domain units are constructed into a period-frequency slot epoch-ring net, and then N period-frequency slot epoch-ring nets are stacked into a cylindrical web according to the time slot alignment principle, and finally U cylindrical webs are formed into the time-frequency division multiple access random self-organizing ad hoc network that covers the full frequency domain and the full time domain. The specific steps of network construction are as follows.

The full frequency domain resource is the total frequency spectrum allocated to the TFDMA ad hoc network. W is set to represent the bandwidth of the total frequency spectrum, and the total frequency spectrum of the network system with bandwidth W is divided into N sub-channels. $\Delta f$ is set to represent the bandwidth of each sub-channel, which is equivalent to the interval between two adjacent center frequencies, $\Delta f=f_i-f_{i-1}$. Then, this TFDMA ad hoc network includes N frequency hopping points or N sub-channels center frequency. $N=W/\Delta f$, wherein $\Delta f$ is called frequency slot or frequency chip.

The full-time domain resource in 24 hours a day is divided as follows. 24 hours are divided into U epochs, each epoch determines a cylindrical web, thereby determining the minimum loop time of a TFDMA ad hoc network. Each epoch is divided into V time frames, each time frame is the basic time unit of the time division multiple access mode. A time frame is divided into S time slots, and each time slot is the basic time unit of the TFDMA ad hoc network which the user terminal can assess. A time slot is divided into E time chips, each time chip is the time occupied by a pulse symbol packet with a definite or adjustable duty cycle, which is also a duration of a symbol in a codeword in the permutation group code, and is also the duration of a single carrier waveform.

The epoch-frequency slot ring net, referred to as an epoch-ring net or a net, is determined by one of U epochs combined with a frequency slot $\Delta f$. Specifically, the last one of V·S time slots in an epoch is connected to the first time slot to form an epoch-frequency slot ring net formed by the V·S time slots and a frequency slot $\Delta f$, which is also called a time-slot-frequency-slot ring net, or epoch-ring net for short. The network system includes a total of N epoch-ring nets that can operate independently, each epoch-ring net is allocated a frequency hopping point or the center frequency of the sub-channel.

The cylindrical web is formed by stacking the N independently operable epoch-ring nets into a cylindrical web in a manner that time slots are aligned. When each corresponding time slot of the N epoch-ring nets is aligned, the web contains V·S time slices, and each time slice is composed of a time slot and N frequency slots.

The TFDMA ad hoc network is composed of U cylindrical webs, that is, one web is repeatedly used for U times, thereby forming a time-frequency division multiple access self-organizing network covering the full frequency domain and the full time domain.

The access signal model of the TFDMA ad hoc network is a dual-domain modulation signal composed of an n-dimensional time domain modeled by a permutation matrix and a modulation multi-domain. The permutation matrix set for constructing a multi-dimensional dual-domain modulation signal is isomorphic with the permutation group code. A subset of the permutation group code is used to construct the permutation array constellation diagram of the multi-dimensional dual-domain modulation signal running on the TFDMA network.

DESCRIPTION OF EMBODIMENTS

Figure 1:
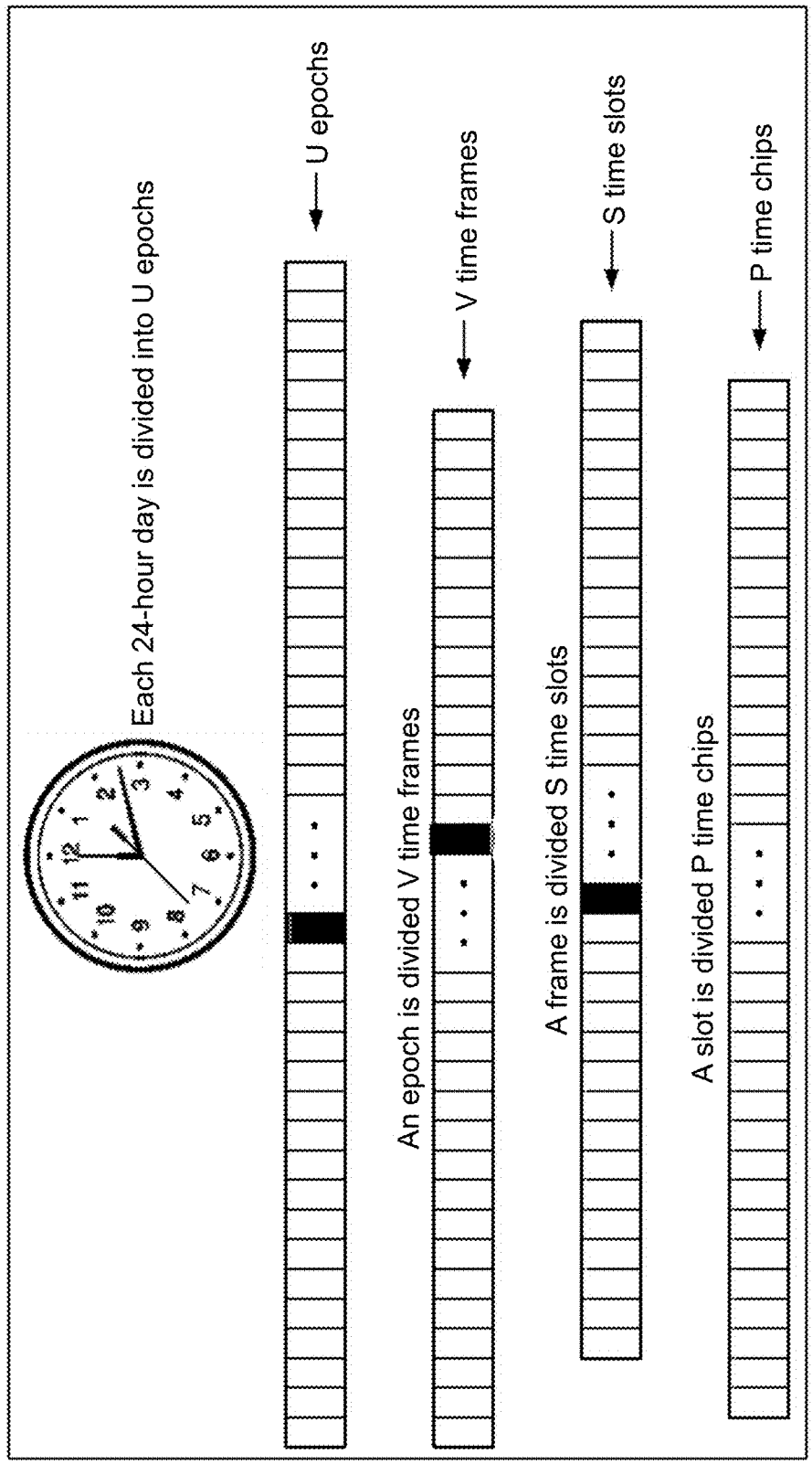
FIG. 1 is a diagram showing the division of time resource in 24 hours a day.

In order to make the objectives, technical solutions, and advantages of the present disclosure clearer, the following further describes the present disclosure in detail with reference to the accompanying drawings and embodiments. It should be understood that the specific implementation cases described here are only used to explain the present disclosure, but not to limit the present disclosure. In addition, the technical features involved in the various embodiments of the present disclosure described below can be combined with each other as long as they do not conflict with each other.

Basic Principle

The section basic principle describes the theoretical basis and mathematical model based on which the structure of the signal model and permutation array constellation diagram of the disclosure are designed, and mainly involves: the method of generating permutation group code.

The set formed by all n! permutations of n elements defined in a finite domain $Z_n=\{1, 2, \ldots, n\}$ of positive integers is called a symmetric group, which is expressed as $S_n=\{\pi_1, \ldots \pi_k, \ldots, \pi_{n!}\}$, wherein each element can be represented by a permutation vector $\pi_k=[a_1 \ldots a_i \ldots a_n]$, wherein $k=1, 2, \ldots, n!$ represents the index of the permutation vector contained in the symmetric group $S_n$. All elements of each permutation vector are different, wherein $a_1, \ldots, a_i, \ldots, a_n \in Z_n$. The degree (dimension, size) of each permutation is $|\pi_k|=n$, and the potential (order) of the symmetric group is expressed as $|S_n|=n!$. Set $\pi_0=e=[a_1 a_2 \ldots a_n]=[12 \ldots n]$, which represents the identity element of the symmetric group $S_n$. The general permutation group code is defined as a sub-group of the symmetric group $S_n$, and the four axioms of the permutation group code abstract algebraic group are: closure, associativity, identity, and inverse. A permutation group code can be expressed as $(n, \mu, d)$-PGC, wherein n represents the length of the codeword, $\mu$ represents the maximum potential (maximum size) of this code set, and d represents the minimum Hamming distance between any two permutation codewords in this code set. For example, $(n,n(n-1),n-1)$ permutation group code PGC is a group code with code length n, potential $n(n-1)$, and minimum Hamming distance $n-1$.

$(n,n(n-1), n-1)$ Coset partition structure of permutation group code:

The inventor's research results that have been published show that when any $n>1$ is a prime number, the code set $P_n$ of $(n,\mu,d)$ permutation group codes can be equivalently calculated by the following two algebraic calculation methods for each codeword to obtain:

$$P_n = \{p_1, p_2, \ldots, p_{n(n-1)}\}$$
$$= \{C_n \circ L_n\} = \{\{c_i \circ l_j\}_{i=1}^n\}_{j=1}^{n-1} \quad (1)$$
$$= \{al_1 + b \mid a \in Z_{n-1}, b \in Z_n, l_1 = p_1 = [1 \ldots n]\} \quad (2)$$
$$= \{L_n + b \mid b \in Z_n\}$$

In the expression, the expression (1) represents the first method of generating the code set $P_n$, indicating that $P_n$ is obtained by calculating two smaller sub-groups, namely the standard loop sub-group $C_n$ and the maximum single-fixed-point sub-group $L_n$ about the fixed-point $n \in Z_n$ through the composition operator "∘". The expression (2) represents the second method of generating the code set $P_n$, which shows that each permutation codeword of $P_n$ can be calculated by the affine transformation $f_{a,b}(l_1)=al_1+b$.

It can be seen from the two methods of generating $P_n$ that they all adopt the maximum single fixed point sub-group $L_n$. Therefore, the key problem is to first generate $L_n$, which is generated by the proportional transformation $f_a(x)=ax$, wherein $a \in Z_{n-1}$, $x \in S_n$. For the maximum single fixed point sub-group, the first requirement is that $n>1$ is a prime number to ensure that a and n are mutually exclusive, so that the set $\{ax|a \in Z_{n-1}\}$ reaches the maximum; the second requirement is that $x \in S_n$ must be the identity element to ensure that the set $\{ax|a \in Z_{n-1}\}$ is a permutation group, that is, the algebraic group must contain the identity element. Therefore, the specific calculation formula of $L_n$ is $$L_n=\{al_1|a \in Z_{n-1};l_1=[12 \ldots n]\}=\{1 \cdot l_1, 2 \cdot l_1, \ldots, a \cdot l_1, \ldots, (n-1) \cdot l_1\}\{l_1,l_2,\ldots,l_a \ldots,l_{n-1}\}$$

It can be seen that all permutation vectors in $L_n$ contain a fixed-point $n \in Z_n$, and other symbols are transferable. $L_n$ contains n−1 permutation vectors $l_1, l_2, \ldots, l_a, \ldots, l_{n-1}$, which is called coset leader permutation codeword or orbit leader permutation codeword, $L_n$ is also called coset leader set or orbit leader set.

The coset characteristics of the code set $P_n$ can be summarized as follows:

1) The code set $P_n$ is composed of n−1 $C_n$ right cosets $C_n l_1, C_n l_2, \ldots, C_n l_{n-1}$ under the condition of multiplication, and each coset contains n codewords. Another type of coset generating method is the translation group, that is, the maximum fixed-point subgroup $L_n$ is translated. Specifically, an equal element vector $$[\underbrace{bb \ldots b}_{n}] = [b]_n (b = 1, 2, \ldots, n)$$

of n length is adopted to translate $L_n$, that is, $P_n=\{L_n+b|b \in Z_n\}=\{L_n+[b]_n\}=\{l_1+[b]_n, l_2+[b]_n, \ldots, l_{n-1}+[b]_n\}$. It can be seen that $P_n$ consists of n−1 $L_n$ right cosets $l_1+[b]_n$, $l_2+[b]_n, \ldots, l_{n-1}+[b]_n$ under the add group condition, and each coset contains n codewords.

2) The code set $P_n$ can also be regarded as composed of n−1 orbits, and each orbit contains n codewords. There are two ways to form orbits, and they are equivalent. The first method is: the standard loop sub-group $C_n$ acts on the n−1 orbit leader permutation vectors $l_1, l_2, \ldots, l_a, \ldots, l_{n-1}$ in $L_n$ to obtain n−1 orbits $C_n l_1, C_n l_2, \ldots, C_n l_{n-1}$. The second method is: n-dimensional equal element vector $[b]_n$ is adopted to perform translation operations on n−1 orbit leader permutation vectors $l_1, l_2, \ldots, l_a, \ldots, l_{n-1}$ in $L_n$ to obtain n−1 orbits $l_1+[b]_n, l_2+[b]_n, \ldots, l_{n-1}+[b]_n$.

Permutation matrix and permutation matrix set isomorphic to $(n,n(n-1), n-1)$ permutation group code:

The permutation matrix is defined as an n×n square matrix with only one element "1" in each row and each column, and the remaining elements are "0".

Any permutation matrix can be represented by a permutation vector, vice versa, any permutation vector can also be represented by a permutation matrix. The corresponding relationship between the two is that the index coordinates of each element in the permutation vector give the column index of the permutation matrix, and the value of each element in the permutation vector gives the line number of each element "1" in the permutation matrix.

All n! permutation vectors in the symmetric group $S_n$ have a one-to-one corresponding permutation matrix. Therefore, $S_n$ can also be expressed as a set of n! permutation matrices. Similarly, the n(n−1) permutation vectors in the permutation group code $P_n$ can also be represented isomorphically as n(n−1) n×n permutation matrices.

In the first example, the permutation vector is generated by n=7, and the corresponding permutation matrix can be written. For example, take the unit permutation vector [1234567], it can be written that it corresponds to a 7×7 permutation matrix, which is an identity matrix.

$$[1234567] \to \begin{bmatrix} 1 & 0 & 0 & 0 & 0 & 0 & 0 \\ 0 & 1 & 0 & 0 & 0 & 0 & 0 \\ 0 & 0 & 1 & 0 & 0 & 0 & 0 \\ 0 & 0 & 0 & 1 & 0 & 0 & 0 \\ 0 & 0 & 0 & 0 & 1 & 0 & 0 \\ 0 & 0 & 0 & 0 & 0 & 1 & 0 \\ 0 & 0 & 0 & 0 & 0 & 0 & 1 \end{bmatrix} (n, n(n-1), n-1)$$

In another example, take any permutation vector with n=7 [3164275], and its corresponding permutation matrix is $$[3164275] \to \begin{bmatrix} 0 & 1 & 0 & 0 & 0 & 0 & 0 \\ 0 & 0 & 0 & 0 & 1 & 0 & 0 \\ 1 & 0 & 0 & 0 & 0 & 0 & 0 \\ 0 & 0 & 0 & 1 & 0 & 0 & 0 \\ 0 & 0 & 0 & 0 & 0 & 0 & 1 \\ 0 & 0 & 1 & 0 & 0 & 0 & 0 \\ 0 & 0 & 0 & 0 & 0 & 1 & 0 \end{bmatrix}$$

In the disclosure, the n×n permutation matrix is a mathematical model for establishing an n-dimensional dual-domain modulation signal, and the permutation group code $P_n$ is a mathematical tool for establishing an n-dimensional high-order dual-domain modulation signal permutation array constellation diagram.

Technical Solution

The technical solution is divided into three parts. The first part is the frame structure design of the TFDMA ad hoc network; the second part is the permutation matrix based n-dimensional dual-domain modulation signal structure design; and the third part is the structure design of permutation group code based n-dimensional high-order dual-domain modulation signal permutation array constellation diagram.

Part 1: TFDMA Random Access (Ad Hoc) Network Frame Structure Design

The frequency resource allocated to the TFDMA ad hoc network is divided. W is set to represent the bandwidth of the frequency spectrum allocated to the TFDMA ad hoc network in the disclosure. Δf is set to represent the minimum interval between any two adjacent sub-channels or adjacent hopping frequencies. Then the TFDMA network contains N=W/Δf hopping frequency points or N sub-channels with center frequency $f_c+i\cdot\Delta f$, wherein i=0, 1 . . . , N−1, and the frequency unit is hertz (Hz). If the bandwidth of a sub-channel is equal to the interval between two adjacent center frequencies, then Δf is also called the frequency slot (frequency chip) of the TFDMA network, or the bandwidth of the sub-channel.

The time resource in 24 hours a day is divided as follows. 24 hours may be divided into U epochs, each epoch determines the minimum loop time of a TFDMA ad hoc network. Each epoch is divided into V time frames, each time frame is the basic time unit of the time division multiple access of multiple users. Each time frame is divided into S time slots, and one time slot is the basic time unit of the TFDMA ad hoc network which the user terminal can assess. Each time slot is divided into E time chips. One time chip is a pulse symbol duration unit with a suitable duty cycle, and it is also the duration of one symbol in the permutation codeword. FIG. 1 shows the time resource division map of 24 hours a day. In the map, U, V, S, and E are all time-related parameters, and they are taken from positive integers, or a fraction of a power of 2. The maximum time unit is less than 15 minutes, which represents the duration of an epoch; the minimum time unit is nanoseconds, which represents the duration of a pulse symbol or a symbol.

T is set to denote the duration of a time slot. A time-frequency slot is defined as a square formed by the abscissa of a time slot and the ordinate of a frequency slot, expressed as T·Δf. The TFDMA network allows many user terminals to access the network in the manner of combination of time division multiple access and frequency division multiple access, thus a new concept of time-frequency division multiple access is introduced.

Definition 1: A multi-user network access scheme is called time-frequency division multiple access (TFDMA) access, if it satisfies the following operating conditions: 1) N user terminals access N sub-nets in the manner of frequency division multiple access and time division multiplexing without frequency interference, that is, N users respectively occupy N different frequencies and reuse the same time slot. 2) S user terminals access one sub-net in the manner of time division multiple access and frequency division multiplexing without symbol interference, that is, the S user terminals respectively occupy S different time slots and reuse the same frequency. 3) Each user terminal accessing a sub-net must occupy at least one time slot frequency slot T·Δf, in a sub-net, a user terminal can occupy at most V time slots from V different time frames. 4) In a time frame, the maximum number of users of N sub-nets is N·S, a sub-net (one time band) contains N time division multiple access frequency multiplexing time frames, and the maximum number of users is S·V.

Figure 2:
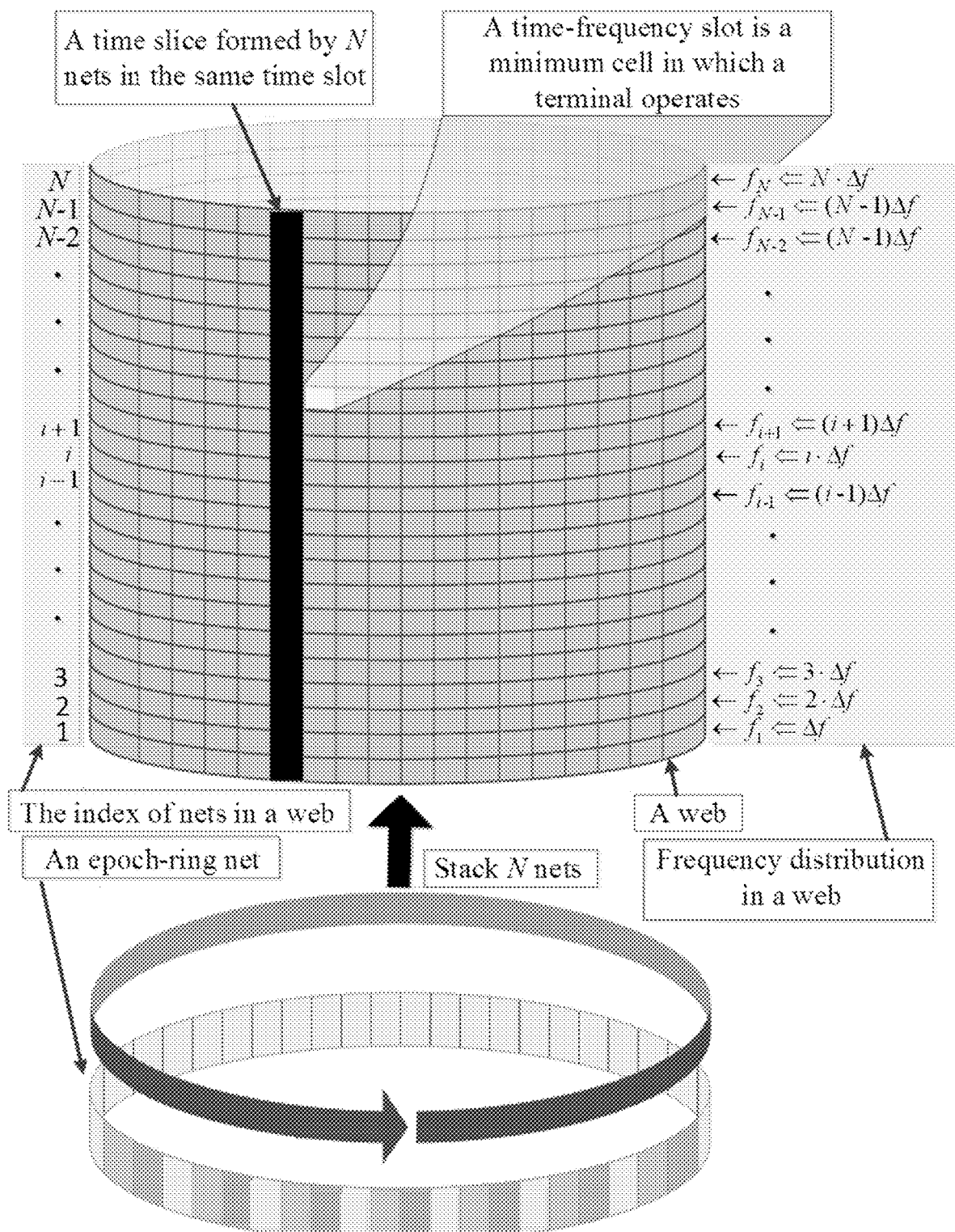
FIG. 2 shows the TFDMA ad hoc network, which is composed of U cylindrical webs, and can cover 24 hours a day and the full frequency domain W.

Each epoch occupies a sub-channel, that is, occupies a frequency slot with a center frequency of $f_i$ and a bandwidth of Δf, or occupies a hopping frequency $f_i$, i=1, . . . , N. An epoch related to a frequency slot is composed of V·S time slots. If the last time slot is connected to the first time slot, the V·S time slot forms a time-frequency loop, which is called an epoch-ring net, as shown in FIG. 2. A total of N time-frequency epoch-ring nets can be formed, and each epoch-ring net supports time division multiple access (TDMA) frequency multiplexing within one time frame, and a user can reuse up to V time frames. If the interval between two adjacent center frequencies or frequency points $f_i$ and $f_{i-1}$ $\Delta f=f_i-f_{i-1}$ is large enough, for example, greater than the coherent bandwidth of the channel, then there is absolutely no frequency interference between two adjacent epoch-ring nets, which allows N user terminals to access N epoch-ring nets determined by N different frequencies in the same time slot in a frequency division multiple access mode.

N epoch-ring nets corresponding to N center frequencies $f_1, f_2, \ldots, f_N$ are stacked in a slot-aligned form to form a cylindrical web, as shown in FIG. 2. If i·Δf is used to represent $f_i$, that is, $f_i\Leftarrow i\cdot\Delta f_i$, it represents the frequency band of the i-th epoch-ring net, and $f_i$ is embodied as the center frequency of the i-th epoch-ring net carrier, or it can be i-th hopping frequency points in the network system. A cylindrical web composed of U such stacked epoch-ring nets forms an ad hoc network, which covers the time domain in 24 hours a day and the full frequency domain with a bandwidth of W, which is called a TFDMA based ad hoc network.

It can be seen from FIG. 2 that the same time slots of the stacked N epoch-ring nets are aligned, and the same time slots of the N epoch-ring nets form a time slice. This time slice enables N robot terminals to independently and simultaneously access to the network with different frequencies in the case of no frequency interference. This time-frequency division multiple access (TFDMA ad hoc) network can provide the following multiple working modes.

N users respectively access to N independent epoch-ring nets, operating in frequency division multiple access and time division multiplexing modes, that is, N users use different N frequencies to multiplex the same time slot, enabling N robot terminals to operate simultaneously by accessing the network simultaneously in a time slot. S users access an epoch-ring net in a time frame, and operate in a time division multiple access mode and multiplexing one frequency. S·N users access N independent epoch-ring nets or access a web within a time frame. In each of the N epoch-ring nets, there are S users accessing the network in the time division multiple access mode and multiplexing the same frequency. Within the duration of one time frame of the web, in each of the S time slices, there are N users accessing the network in the frequency division multiple access mode and multiplexing the same time slot. A user accessing a epoch-ring net will occupy a time-frequency slot, namely T·Δf, wherein T represents the duration of a time slot. A user in the epoch-ring net can use V time slots from V different time frames, and can also use V time slots from V different time frames in the next epoch, and the same is continued in the next epoch. Therefore, a user can use up to V·U time slots in 24 hours. In the same time frame of N epoch-ring nets, the maximum number of users is N·S. A epoch-ring net contains V TDMA-time frames, and the maximum number of users accommodated is S·V. The maximum number of users accommodated in a web is N·S·V. In a time-frequency slot, a terminal can access the web, and a web is composed of N×V·S time-frequency slots. Therefore, the maximum number of users of a web is N·V·S, wherein each user terminal occupies a time slot.

From the above, it seems very easy to construct a TFDMA network. The key lies its feasibility, which requires solving two basic problems. The first is: what kind of signal model has access to the TFDMA network, so that such signal model can be used to construct a transceiver system running with the TFDMA network; the second is: how to design the structure of the time slot to consider the key technical factors. The time slot structure determines how to choose timing (time reference), synchronization strategy, anti-jitter mechanism and protection scheme. This disclosure does not take into consideration the design of the structure of time slot for the time being because it involves a specific application environment, and different applications require different time slot structures. Only the structural design of the signal model is taken into consideration below.

Part 2: The n-Dimensional Dual-Domain Modulation Signal Model that can Access the TFDMA Network This part uses permutation matrix as a mathematical tool to invent an n-dimensional dual-domain modulation signal model. The so-called "dual-domain" refers to: one domain is the time domain, and the other domain is the modulation single domain, or a joint domain of multiple domains, wherein the modulation single domain refers to the amplitude modulation domain, the phase modulation domain and the frequency modulation domain, and the modulation multi-domain refers to the two-by-two combination of three modulation domains or even the combination of three modulation domains.

The n-dimensional dual-domain modulation signal is modeled by a permutation matrix. The row index 1, 2, . . . , n of the permutation matrix is used to determine the specific value of the discrete modulation domain from bottom to top. $d_i$ is set to represent the i-th value among the n values of multi-domain modulation, its subscript gives the index of n discrete values, i=0, 1, 2, . . . , n, $d_0$=0 represents the starting value 0 of the modulation domain. Multi-domain modulation refers to amplitude modulation domain, phase modulation domain, frequency modulation domain, pulse position modulation domain, polarization modulation domain, spatial domain (antenna) modulation, and effective combinations of these modulation domains, such as joint multi-domain modulation of amplitude domain and phase domain. $\Delta d_b = d_i - d_{i-1}$ is set to represent the domain chip or domain slot of the modulation domain, which means a difference between two adjacent values among n values $d_1$, $d_2$, . . . , $d_n$ arranged from small to large, or the smallest difference between any two of the n modulation domain values, b=1, 2, . . . , n, giving the index of, $\Delta d_b$, the domain chip or domain slot of the modulation domain.

The column index 1, 2, . . . , n of the permutation matrix is processed from left to right into n discrete moments that appear at once in the time domain, expressed as $t_i$, which refers to the i-th moment of the n moments in the time domain, and gives the index of these moments, i=0, 1, 2, . . . , n, $t_0$=0 represents the starting moment 0 of the time domain. One domain of the dual-domain modulation signal is a modulation multi-domain determined by the row index of the permutation matrix, and the other domain is a time domain determined by the column index of the permutation matrix. The difference between two adjacent moments of n moments in the time domain is defined as a time chip, wherein n moments correspond to n time chips, and the duration of each time chip is $T_c = \Delta t_b = t_i - t_{i-1}$, b=1, 2, . . . , n gives the time chip index; $T_c = \Delta t_b$ is also the duration of one symbol in a permutation codeword. Then $T_w = nT_c$ is the duration of a codeword and the duration of an n-dimensional dual-domain modulation signal.

Figure 3:
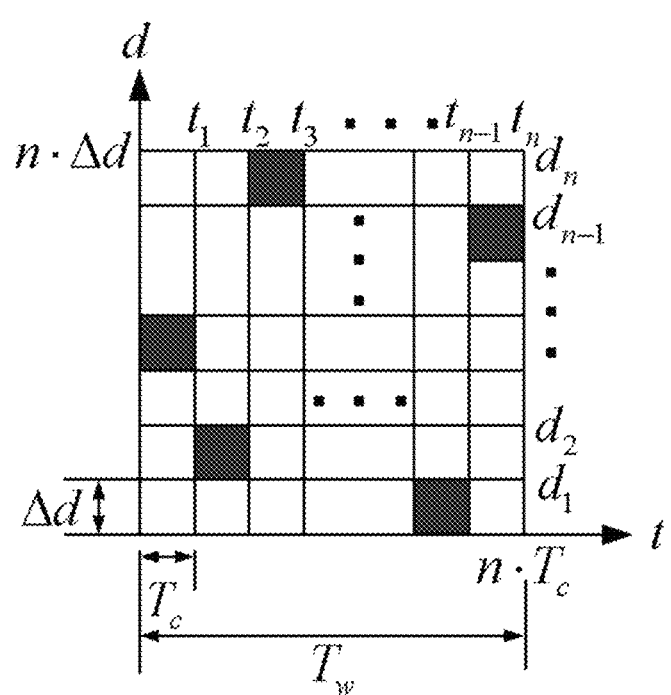
FIG. 3 is a generalized n-dimensional dual-domain modulation signal model, which is established on a permutation matrix. The abscissa is the time axis and the ordinate is the modulation domain axis.

The n domain chips $\Delta d_b$ of the modulation multi-domain and n time chips $\Delta t_b$ of the time domain define the n-dimensional dual-domain modulation signal model composed of the modulation multi-domain and the time domain, wherein b=1, 2, . . . , n. In the time interval of n time chips $\Delta t_b$ corresponding to n elements "1" in the permutation matrix, the carrier modulated by the b-th value of a permutation vector in the modulation domain is transmitted. In the permutation matrix, no signal is emitted at the position where each element "0" is located. FIG. 3 shows a schematic diagram of the generalized n-dimensional dual-domain modulation signal model generated by the permutation matrix, which is also called n-dimensional time-domain and n-dimensional modulation-domain signal patterns. The position where the element "1" is located in the permutation matrix is replaced by the modulation carrier signal corresponding to the modulation chip $\Delta d_b$ and the time chip $\Delta t_b$, and expressed as a square color block. The position where the element "0" is located in the permutation matrix is replaced by an unfilled square.

When the modulation domain is determined, a dual-domain signal composed of the determined time domain and modulation multi-domain can be obtained. This disclosure only invents six n-dimensional dual-domain modulation signal models for three parameters of the carrier, including amplitude, phase, and frequency, and including the mathematical expressions and signal patterns of the signal models. The mathematical symbols and equivalent expression used for modeling time domain and modulating multi-domain n-dimensional dual-domain modulation signals are described as follows.

A symbol $X_m(a; l_1; (t_{l1})^q)$ representing any permutation codeword in $P_n$ is constructed, which is equivalent to taking a permutation codeword from the permutation group code $P_n$, wherein $X \in \{A, P, F\}$, A represents the amplitude, P represents the phase, and F represents the frequency. The subscript m of $X_m$ gives the index or number of the number of signals in the n-dimensional dual-domain modulation signal set. The specific value of the codeword index m is determined by the coset number a and shift bit value index q, that is, m=f(a,q).

This symbol indicates: when $X_m=A_m$, the permutation codeword $A_m(a; l_1; (t_{l1})^q)$ is the n-dimensional permutation vector modulating the carrier amplitude; when $X_m=P_m$, the permutation codeword $P_m(a; l_1; (t_{l1})^q)$ is the n-dimensional permutation vector for modulating the carrier phase; when $X_m=F_m$, the permutation codeword $F_m(a; l_1; (t_{l1})^q)$ is the n-dimensional permutation vector for modulating the carrier frequency. The three symbols in parentheses, $(a; l_1; (t_{l1})^q)$, give the three elements that generate this permutation codeword. These three elements can form an expression $X_m(a; l_1; (t_{l1})^q)=(t_{l1})(a \cdot l_1)$ which calculates designated permutation codewords. The meaning of these three symbols is as follows: a is the index of the permutation codeword in the coset leader set $L_n$, as well as the number of the coset. The value range of a is $1 \leq a \leq n-1$. When n is a prime number, a is taken from the maximum value $a=|L_n|=n-1$, when n is not a prime number, the value of a should be mutually exclusive with any $n>1$, that is, all the values of a should satisfy GCD(a,n)=1 (the greatest common factor between a and n is 1). Under the circumstances, all the values of a are less than n−1; $l_1$ is a unit permutation codeword, $l_1=[12 \ldots n]$. $(t_{l1})^Q$ is set to denote a reduced-order function of cycle-left-shifted composite function $(t_{l1})^{n-1}$, wherein Q is the maximum value of the index q of the cycle-shifted bit number, and the value of q is $1 \leq q \leq Q < n-1$, so that $(t_{l1})^Q$ acts on the coset leader set $L_n=\{a \cdot l_1\}$, thereby generating permutation array code $\Gamma_n=\{(t_{l1})^Q L_n\}=\{(t)\{al_1\}\}$. When the specific values of q and a are provided, it is possible to accurately calculate the index or number of the corresponding codeword in the permutation array code $\Gamma_n$, $m=(a-1)Q+q$. The n-dimensional vector used for the amplitude, phase, and frequency modulation of the carrier must be the permutation codeword in the permutation array constellation $\Gamma_n=\{(t_{l1})^Q L_n\} \subset P_n$. The vector $u=A_m(a; l_1; (t_{l1})^{q1})=[u_1 u_2 \ldots u_n] \in \Gamma_n^1 \subset P_n$ represents the amplitude modulation permutation codeword. $\Gamma_n^1=\{(t_{l1})^{Q1} L_n\}=\{(t_{l1})^{Q1}\{al_1\}\}$ is the permutation array code for amplitude modulation. $v=P_m(a; l_1; (t_{l1})^{q2})=[v_1 v_2 \ldots v_n] \in \Gamma_n^2 \subset P_n$ represents the phase modulation permutation codeword. $\Gamma_n^2=\{(t_{l1})^{Q2} L_n\}=\{(t_{l1})^{Q2}\{al_1\}\}$ is the permutation array code used for phase modulation. $w=F_m(a; l_1; (t_{l1})^{q3})=[w_1 w_2 \ldots w_n] \in \Gamma_n^3 \subset P_n$ represents the frequency modulation permutation codeword. $\Gamma_n^3=\{(t_{l1})^{Q3} L_n\}=\{(t_{l1})^{Q3}\{al_1\}\}$ is a permutation array code for frequency modulation. $\Gamma_n^1$, $\Gamma_n^2$, $\Gamma_n^3$ are all subsets of $P_n$, and their sizes are all powers of 2. They can be the same or different; this difference is expressed as: the permutation codewords are different and the sizes are different; $1 \leq q_1 \leq Q_1$, $1 \leq q_2 \leq Q_2$, $1 \leq q_3 \leq Q_3$, $Q_1$, $Q_2$, $Q_3 \leq n-1$, they can be different values or the same value.

g(t) is set as a real-valued signal pulse with a duration of one codeword interval $T_w$, also called a baseband signal, and its shape will affect the frequency spectrum of the transmitted signal.

$f_c$ and $\omega_c$ are set as the carrier frequency and carrier angular frequency, respectively.

$T_c=\Delta t=t_i-t_{i-1}$ is set as a duration of a time chip, which is the duration of one symbol in the permutation codeword, and is also the duration of a waveform in an n-dimensional dual-domain modulation signal, wherein $i=1, 2, \ldots, n$, $t_0=0$ is the starting moment of a n-dimensional dual-domain modulation signal. $T_w=nT_c$ is the duration of a codeword, and is also the duration of an n-dimensional dual-domain modulation signal.

$e^{j2\pi f_c t}$ represents a complex carrier with a center frequency of $f_c$, it can be decomposed into in-phase component and quadrature component, i.e., $e^{j2\pi f_c t}=\cos 2\pi f_c t+j \sin 2\pi f_c t$.

n-TXP represents the abbreviation of the signal pattern formed by the time domain and modulated multi-domain of the n-dimensional dual-domain modulation signal. It is the n-dimensional dual-domain modulation signal pattern composed of the $n^2$ chips generated on the mathematical model of the n×n permutation matrix. The signal pattern is planar, and its x-axis is the moment (time point) index of the signal pattern, that is, $t_i$, $i=1, 2, \ldots, n$, which gives the value of n time points of the n-dimensional dual-domain modulation signal. The difference between any two adjacent time points $\Delta t=t_i-t_{i-1}$ gives the time chip value, and the time chip is also indexed, that is, $\Delta t_b$, $b=1, 2, \ldots, n$, giving the index of each time chip. Its y-axis is the specific value of the modulation domain (the magnitude of the modulation value) $d_1, d_2, \ldots, d_n$, which is determined by n symbols of a permutation codeword, and $\Delta d=d_i-d_{i-1}$ gives the domain chip of the modulation domain. The domain chip is also indexed, that is, $\Delta d_b$, $b=1, 2, \ldots$, n gives the index of domain chip of each modulation domain. In the n×n permutation matrix, each element "1" corresponds to a unit in the signal pattern. This unit is measured by $\Delta t_b \cdot \Delta d_b$. which forms a time-modulation-domain-chip. Each element 1 of the permutation matrix is replaced with the specific value $d_i$ of the modulation domain corresponding to the time chip $\Delta t_b$, b, $i=1, 2, \ldots, n$. When X=A, that is, when the modulation domain is amplitude, n-TAP represents the time and amplitude pattern of the dual-domain modulation signal formed by the n-dimensional time domain and the n-dimensional amplitude domain. When X=P, that is, when the modulation domain is phase, n-TPP represents the time-phase pattern of the dual-domain modulation signal formed by the n-dimensional time domain and the n-dimensional phase domain. When X=F, that is, when the modulation domain is frequency, n-TFP represents the time-frequency pattern of the dual-domain modulation signal formed by the n-dimensional time domain and the n-dimensional frequency domain. When X=AF is the amplitude-phase joint modulation domain, n-TAPP represents the time-amplitude-phase pattern of the dual-domain modulation signal formed by joint modulation domain of the n-dimensional time domain as well as n-dimensional amplitude and the n-dimensional phase. When X=AF is the amplitude-frequency joint modulation domain, n-TAFP represents the time-amplitude-frequency pattern of the dual-domain modulation signal formed by the joint modulation domain of the n-dimensional time domain as well as the n-amplitude and the n-dimensional frequency. When X=APF is the joint modulation domain of amplitude, phase and frequency, n-TAPFP represents the time-amplitude phase frequency pattern of the dual-domain modulation signal formed by the joint modulation domain of the n-dimensional time domain and the n-dimensional amplitude, as well as the n-dimensional phase and the n-dimensional frequency.

n-TXM represents the abbreviation of n-dimensional dual-domain modulation signal, wherein n-TAM represents n-dimensional time-amplitude dual-domain modulation signal, n-TPM represents n-dimensional time-phase dual-domain modulation signal, n-TFM represents n-dimensional time-frequency dual-domain modulation signal, n-TAPM represents n-dimensional time-amplitude-phase dual-domain modulation signal, n-TAFM represents n-dimensional time-amplitude-frequency dual-domain modulation signal, and n-TAPFM represents n-dimensional time-amplitude-phase-frequency dual-domain modulation signal.

Following the above description of symbols and simplified equivalent expression, the disclosure establishes the following six n-dimensional dual-domain modulation signal models.

Model 1: It is set that the modulation multi-domain is the carrier amplitude, that is, $d_i = A_i$, then the domain chip of the modulation multi-domain is the amplitude chip or the amplitude slot, that is, $\Delta d_b = d_i - d_{i-1} = \Delta A_b = A_i - A_{i-1}$, b=1, 2, . . . , n. This is, an n×n permutation matrix is adopted to construct a dual-domain modulation signal composed of an n-dimensional time domain and an n-dimensional amplitude domain, abbreviated as n-dimensional time-amplitude dual-domain modulation signal model (n-TAM). The element "1" in the permutation matrix is replaced by the amplitude value $A_i$ corresponding to the time chip $\Delta t_b$ in the corresponding permutation vector. $A_i$ is a symbol value in the permutation codeword $A_m(a; l_1; (t_{l1})^{q1}) = (t_{l1})^{q1}(al_1) = [u_1 u_2 \ldots u_n]$, for each determined $r_1$ and a, there is $A_i = u_i (i=1, 2, \ldots, n)$. If, a n-bit binary message sequence selects a codeword $[u_1 u_2 \ldots u_n]$ among $[u_1 u_2 \ldots u_n]$, $Q_1 \le n-1$, $1 \le q_1 \le Q_1$, $a \le |L_n|$, then the n-dimensional time amplitude modulation signal n-TAM of the carrier can be modeled into the following mathematical expressions, including the overlying signal model and the real signal model.

$$s_m(t) = \text{Re}[A_m(a; l_1; (t_{l1})^{q1})g(t)e^{j2\pi f_c t}] =$$

$$A_m(a; l_1; (t_{l1})^{q1})g(t)\cos\omega_c t = [u_{t_1} u_{t_2} \ldots u_{t_n}]g(t)$$

$$\cos\omega_c t = [(u_{t_1} g(t_1)\cos\omega_c t_1)(u_{t_2} g(t_2)\cos\omega_c t_2)\ldots$$

$$(u_{t_n} g(t_n)\cos\omega_c t_n)] = [(u_1 g(t)\cos\omega_c t)(u_2 g(t)\cos\omega_c t)\ldots$$

$$(u_n g(t)\cos\omega_c t)] = [u_1 u_2 \ldots u_n]g(t)\cos\omega_c t 0 \le t \le T_w,$$

$$0 \le t_1, t_2 \ldots, t_n \le T_c, m = 1, 2, \ldots, |\Gamma_n^1|$$

Figure 4:
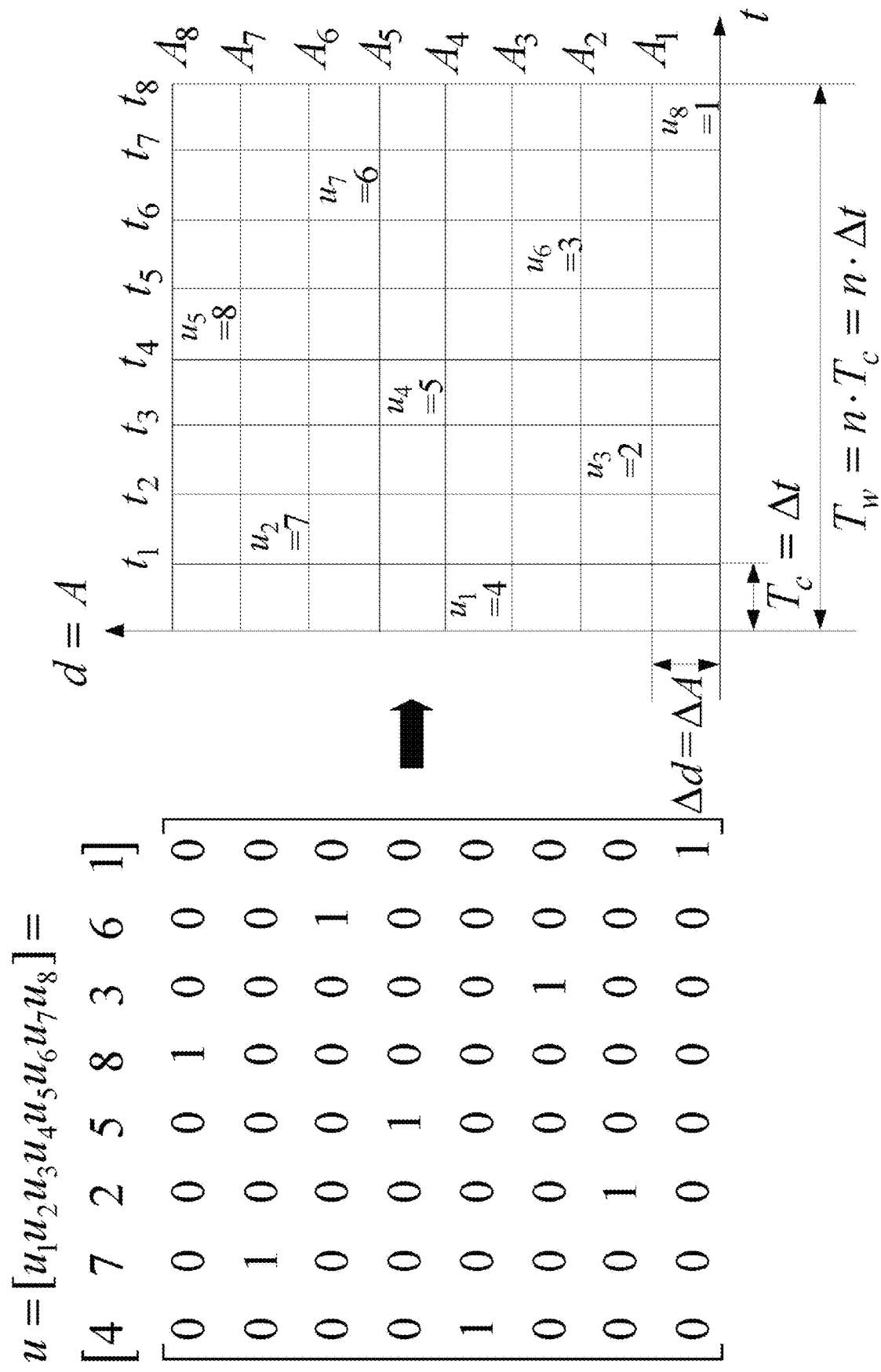
FIG. 4 is a dual-domain modulation signal pattern composed of an 8-dimensional time domain and an 8-dimensional amplitude domain, n-TAP, each time chip corresponds to a carrier amplitude.

FIG. 4 shows a modulation signal pattern 8-TAP of an 8-dimensional time domain and an 8-dimensional amplitude domain. Generally speaking, the signal pattern consists of a plane pattern of $n^2$ squares. The abscissa of this pattern is the time chip $\Delta t_b = t_i - t_{i-1} = 1$ (one time unit) sequence $\Delta t_b = t_i - t_{i-1} = 1$ and the ordinate is the amplitude chip or the amplitude slot $\Delta d_b = \Delta A_b = A_i - A_{i-1} = 1$ (one amplitude unit) sequence $\Delta A_1, \Delta A_2, \ldots, \Delta A_b, \ldots, \Delta A_n$. Each square is the product of $\Delta A_b$ and $\Delta t_b$, $\Delta A_b \cdot \Delta t_b = 1$, b=1, 2, . . . , n. Each element 1 in the permutation matrix can be replaced with the amplitude value $A_i = u_i$ corresponding to the time chip $\Delta t_b$ in the corresponding permutation vector, for i=1, 2, . . . , n. This is equivalent to replacing the element "1" of the n×n permutation matrix with every symbol value corresponding to the time chip $\Delta t_b$ of one permutation codeword $u = A_m(a; l_1; (t_{l1})) = [u_1 u_2 \ldots u_n] \in \Gamma_n^1 \subset P_n$, for b=1, 2, . . . , n. FIG. 4 is exemplified by using the codeword $u = [u_2 u_2 u_3 u_4 u_5 u_6 u_7 u_8] = [47258361]$ in row 4, column 2 of the expression (5) when n=8 in the following example 3 providing the conversion relationship of 8×8 permutation matrix to signal pattern 8-TAP.

Model 2: It is set that the modulation multi-domain is the carrier phase, i.e., $d_i = p_i$, then the value chip of the modulation domain is the phase chip or the phase slot, i.e., $\Delta d_b = d_i - d_{i-1} = \Delta p_b = p_i - p_{i-1}$, b, i=1, 2, . . . , n. That is, an n×n permutation matrix can be used to construct an n-dimensional dual-domain modulation signal composed of the n-dimensional time domain and the n-dimensional phase domain, which is referred to as n-dimensional time-phase dual-domain modulation signal model (n-TPM) for short. The element "1" in the permutation matrix is replaced by the phase value $p_i$ corresponding to the time chip $\Delta t_b$ in the permutation vector, and $p_i$ is determined by a symbol value v in the permutation codeword $v = P_m(a; l_1; (t_{l1})^{q2}) = (t_{l1})^{q2}(al_1) = [v_1 v_2 \ldots v_n] \in \Gamma_n^2 \subset P_n$. When $r_2$ and a are determined, the specific $$p_i = \frac{2\pi}{n} \cdot v_i$$

can be obtained. If a k-bit binary message sequence selects a codeword $[v_1 v_2 \ldots v_n]$ in the permutation array code $\Gamma_n^2 = \{(t_{l1})^{Q_2}\{al_1\}\}$. $Q_2 \le n-1$, $1 \le q_2 \le Q_2$, $a \le |L_n|$. Then the n-dimensional time phase modulation signal n-TPM of the carrier can be modeled into the following mathematical expressions, including the overlying signal model and the real signal model.

$$s_m(t) = \text{Re}\left[g(t)e^{j(2\pi f_c t + \frac{2\pi}{n} P_m(a; l_1; (t_{l1})^{q2}))}\right] =$$

$$\text{Re}\left[g(t)\cos\left(\omega_c t + \frac{2\pi}{n} P_m(a; l_1; (t_{l1})^{q2})\right) +\right.$$

$$\left. jg(t)\sin\left(\omega_c t + \frac{2\pi}{n} P_m(a; l_1; (t_{l1})^{q2})\right)\right] =$$

$$\text{Re}\left[g(t)\cos\left(\omega_c t + \frac{2\pi}{n}[v_1 v_2 \ldots v_n]\right) +\right.$$

$$\left. jg(t)\sin\left(\omega_c t + \frac{2\pi}{n}[v_1 v_2 \ldots v_n]\right)\right] =$$

$$\text{Re}\left[\left(g(t_1)\cos\left(\omega_c t_1 + \frac{2\pi}{n}v_1\right) + jg(t_1)\sin\left(\omega_c t_1 + \frac{2\pi}{n}v_1\right)\right)\right.$$

$$\left(g(t_2)\cos\left(\omega_c t_2 + \frac{2\pi}{n}v_2\right) + jg(t_2)\sin\left(\omega_c t_2 + \frac{2\pi}{n}v_2\right)\right)\ldots\ldots$$

$$\left.\left(g(t_n)\cos\left(\omega_c t_n + \frac{2\pi}{n}v_n\right) + jg(t_n)\sin\left(\omega_c t_n + \frac{2\pi}{n}v_n\right)\right)\right] =$$

$$g(t) \cdot \text{Re}\left[\left(\cos\left(\omega_c t_1 + \frac{2\pi}{n}v_1\right) + j\sin\left(\omega_c t_1 + \frac{2\pi}{n}v_1\right)\right)\right.$$

$$\left(\cos\left(\omega_c t_2 + \frac{2\pi}{n}v_2\right) + j\sin\left(\omega_c t_2 + \frac{2\pi}{n}v_2\right)\right)\ldots$$

$$\left.\left(\cos\left(\omega_c t_n + \frac{2\pi}{n}v_n\right) + j\sin\left(\omega_c t_n + \frac{2\pi}{n}v_n\right)\right)\right] =$$

$$g(t)\cos\left(\omega_c t + \frac{2\pi}{n}[v_1 v_2 \ldots v_n]\right) = \left[\left(g(t_1)\cos\left(\omega_c t_1 + \frac{2\pi}{n}v_1\right)\right)\right.$$

$$\left.\left(g(t_2)\cos\left(\omega_c t_2 + \frac{2\pi}{n}v_2\right)\right)\ldots\left(g(t_n)\cos\left(\omega_c t_n + \frac{2\pi}{n}v_n\right)\right)\right] =$$

$$g(t)\left[\cos\left(\omega_c t_1 + \frac{2\pi}{n}v_1\right)\cos\left(\omega_c t_2 + \frac{2\pi}{n}v_2\right)\ldots\right.$$

$$\left.\cos\left(\omega_c t_n + \frac{2\pi}{n}v_n\right)\right] 0 \le t \le T_w,$$

$$0 \le t_1, t_2 \ldots, t_n \le T_c, m = 1, 2, \ldots, M$$

Figure 5:
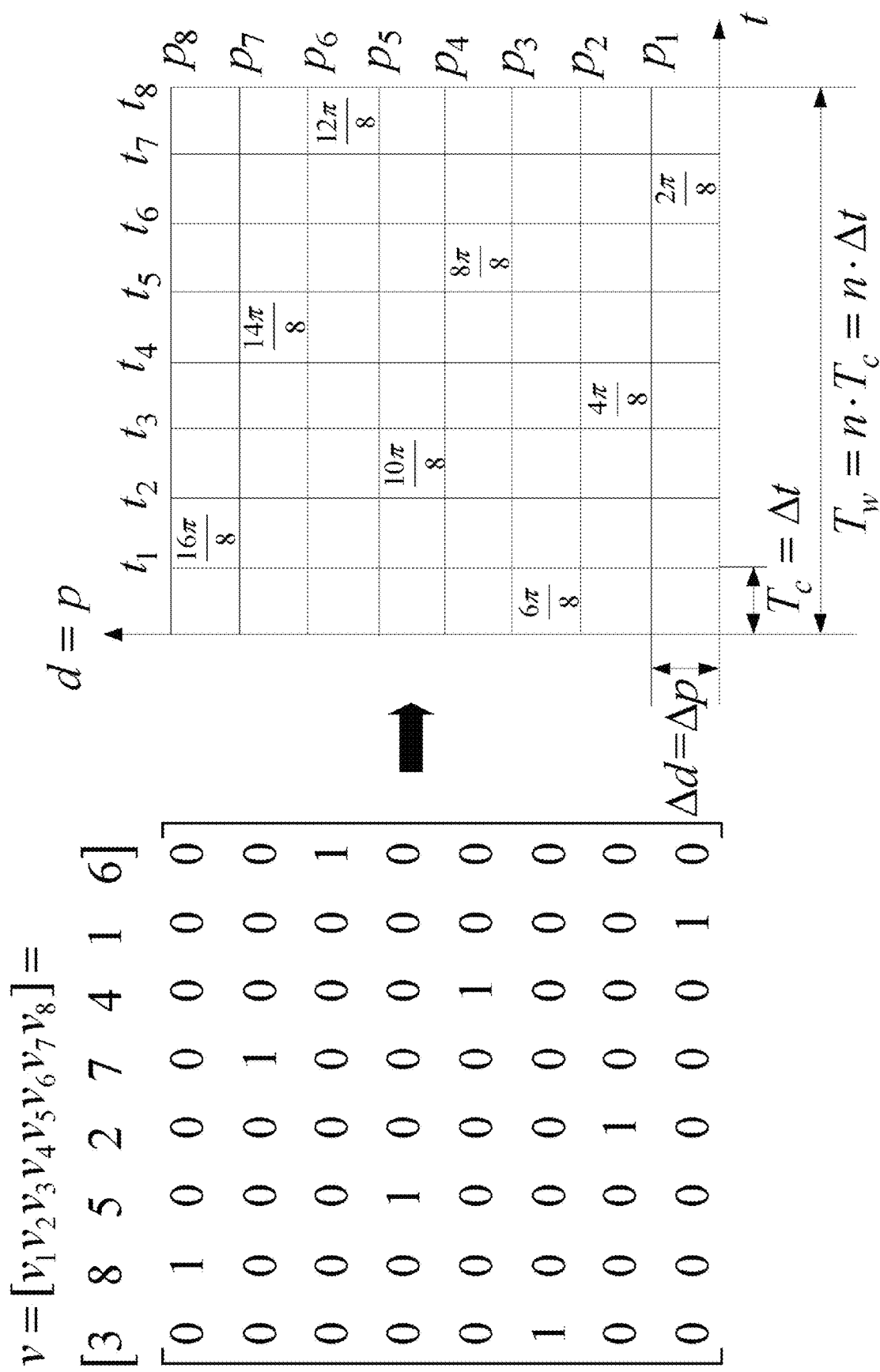
FIG. 5 is a dual-domain modulation signal pattern composed of an 8-dimensional time domain and an 8-dimensional phase domain, n-TPP, each time chip corresponds to a carrier phase.

FIG. 5 shows a dual-domain modulation signal pattern 8-TPP composed of an 8-dimensional time domain and an 8-dimensional phase domain. Generally speaking, the signal pattern consists of a plane pattern of $n^2$ squares. The abscissa of this pattern is the time chip $\Delta t_b = t_i - t_{i-1} = 1$ (a time unit) sequence $\Delta t_1, \Delta t_2, \ldots, \Delta t_b, \ldots, \Delta t_n$ and the ordinate is the phase chip or the phase slot $$\Delta d_b = \Delta p_b = p_i - p_{i-1} = \frac{2\pi}{n}$$

(a phase unit) sequence $\Delta p_1, \Delta p_2, \ldots, \Delta p_b, \ldots, \Delta p_n$, each square is the product $$\Delta p_b \cdot \Delta t_b = \frac{2\pi}{n}$$

of $\Delta p_b$ and $\Delta t_b$, b=1, 2, ..., n. Each element 1 in the permutation matrix is replaced with the phase value $$p_i = \frac{2\pi}{n}.$$

$v_i$ corresponding to the time chip $\Delta t_b$ in the corresponding permutation vector, which is equivalent to using a phase value $$\frac{2\pi}{n} v_i$$

generated by a symbol value $v_i$ of each corresponding time chip $\Delta t_b$ of a permutation codeword $v = P_m(a; 1_1; (t_{l1})^{q_2}) = [v_1 v_2 \ldots v_n] \in \Gamma_n^2 \subset P_n$ to replace the element "1" in the n×n permutation matrix. FIG. 5 is exemplified by using the codeword $v = [v_1 v_2 v_3 v_4 v_5 v_6 v_7 v_8] = [38527416]$ in row 7, column 3 of the expression (5) when n=8 in the following example 3 providing the conversion relationship of 8×8 permutation matrix to signal pattern 8-TPP.

Model 3: It is set that the modulation multi-domain is the carrier frequency, i.e., $d_i = f_i$. Then the domain chip of the modulation multi-domain is frequency chip or frequency slot, i.e., $\Delta d_b = d_i - d_{i-1} = \Delta f_b = f_i - f_{i-1}$, b, i=1, 2, ..., n. That is, an n×n permutation matrix can be used to construct an n-dimensional dual-domain modulation signal of the n-dimensional time-domain and n-dimensional frequency domain, which is referred to as n-dimensional time-frequency dual-domain modulation signal model (n-TFM).

Since spectrum is a scarce natural resource, the spectrum bandwidth allocated to the TFDMA network is W. In the method of dividing the total system frequency W in this disclosure, two issues need to be considered: one is the design scheme of the sub-channel bandwidth $\Delta f$; the other is the allocation scheme of allocating n frequencies of the number of total system frequency N to each user. Specifically, the first method is $\Delta f = f_i - f_{i-1}$, which is the coherent bandwidth, and is defined as the minimum bandwidth that does not cause frequency interference. This frequency allocation method makes it possible that the number of sub-channels $N = W/\Delta f$ without frequency interference reaches the maximum, and which is the design scheme for sub-channel bandwidth $\Delta f$ under the condition where the number of users reaches the maximum. The second method is $\Delta f = f_i - f_{i-1}$, which is much larger than the coherent bandwidth. The number of frequency points of the system is still calculated through $N = W/\Delta f$, but the total number of frequency points of the system is much smaller than the first method. Each user still uses n frequency points to access the TFDMA network, but the way of taking n frequency points is random hopping, and the n frequency points taken each time are different, forming a fast frequency hopping system, which is the design scheme with the strongest anti-interference ability but the reasonable minimum sub-channel bandwidth $\Delta f$ for the number of users. It is further required that the design scheme of the sub-channel bandwidth $\Delta f$ can be changed in the above-mentioned maximum and minimum scheme.

The way each user obtains n frequencies from the N frequencies of the system is specifically as follows. The first method is a continuous n discrete frequency allocation scheme, and the sub-channel bandwidth $\Delta f$ is the coherent bandwidth. $f_0$ is set as the minimum center frequency of the system, and other center frequencies can be calculated through $f_0$ and $\Delta f$, that is, $f_{lc} = f_0 + (l-1) \cdot \Delta f$, l=1, 2, ..., N, l=1, 2, ..., N. If each user is assigned n different frequencies, the n frequencies of the first user can be calculated by using the expression $f_{1c,i-1} = f_0 + (i-1) \cdot \Delta f$, i=1, 2, ..., n. The n frequencies of the first user can be calculated by using the expression $f_{2c,i-1} = f_{1c,n-1} + (i-1) \cdot \Delta f$, i=1, 2, ..., n; ...; the n frequencies of the Nth user can be calculated by using the expression $f_{Nc,i-1} = f_{(N-1)c,n-1} + (i-1) \Delta f$, i=1, 2, ..., n. The maximum number of users of frequency division multiple access that the system can operate in a time slot is N/n. The second method is n hopping frequency allocation scheme, the sub-channel bandwidth $\Delta f = f_i - f_{i-1}$ is much larger than the coherent bandwidth, and the number of frequency points of the system is still calculated through $N = W/\Delta f$. Each user still uses n frequency points to access the TFDMA network, but the way to take n frequency points is random hopping. After each user gets n frequency points, they can use permutation codeword $[w_1 w_2 \ldots w_n]$ to number n frequency points, that is, the n hopping frequency points of each user can be expressed as $f_{w_1}, f_{w_2}, \ldots, f_{w_n}$, so that the n frequency points can be encoded. It can be set that after a certain duration, the user can change n frequency points, such as changing n frequency points after an epoch. The third method is the expansion allocation scheme of n frequencies. j is set as the expansion coefficient, which means that the minimum frequency interval between the n frequency points of each user is j times the coherent bandwidth $\Delta f$. The value range of the expansion coefficient j is $2 \leq j \leq N/n$. It is set that the minimum center frequency of the system is still $f_0$. The minimum center frequency and n frequencies of other users can be calculated through $f_0$, $\Delta f$ and j, that is, $f_{1c} = f_0 + (l-1) \cdot j \cdot \Delta f$, l=1, 2, ..., N, $N = W/\Delta f$ The n frequencies of the first user can be calculated by using the expression $f_{1c,i-1} = f_0 + (i-1) \cdot j \cdot \Delta f$, i=1, 2, ..., n. The n frequencies of the second user can be calculated by using the expression $f_{2c,i-1} = f_{1c,n-1} + (i-1) \cdot j \cdot \Delta f$, i=1, 2, ..., n; ...; the n frequencies of the Nth user can be calculated by using the expression $f_{Nc,i-1} = f_{(N-1)c,n-1} + (i-1) \cdot j \cdot \Delta f$, i=1, 2, ..., n. In the above three methods of allocating frequency points, the same permutation matrix can be used to model signal models of the time domain and frequency domain. The maximum number of users for the system to run frequency division multiple access in a time slot is N/n. For the first and third methods, this codeword completes the calculation of the frequency value, and n symbols of the codeword is used to control a user's n frequency generators to generate n frequencies $f_{w_1}, f_{w_2}, \ldots, f_{w_n}$ and control the transmission of these n frequency signals. The second method is to use the n symbols of the codeword $[w_1 w_2 \ldots w_n]$ to number the n frequencies allocated to a user, and transmit the same n frequencies each time. However, the order of the n frequencies is different each time it is transmitted. After an epoch, the frequency hops to a new n frequency, and then is renumbered by the codeword $[w_1 w_2 \ldots w_n]$. If a k-bit binary message sequence selects a codeword $[w_1 w_2 \ldots w_n]$ of the permutation array code $\Gamma_n^3 = \{(t_{l1})^{Q_3} \{al_1\}\}$, $Q_3 \leq n-1$, $1 \leq q_3 \leq Q_3$, $a \leq |L_n|$, then the n-dimensional time-frequency modulation signal n-TFM of the carrier can be modeled as the following mathematical expressions, including the overlying signal model and the real signal model.

$$s_m(t) = \text{Re}\left[g(t)e^{j\left(2\pi f_{Fm(a;l_1;(t_{l1})^{q3})^t}\right)}\right] =$$

$$\text{Re}\left[g(t)\cos\left(2\pi f_{Fm(a;l_1;(t_{l1})^{q3})^t}\right) + jg(t)\sin\left(2\pi f_{Fm(a;l_1;(t_{l1})^{q3})^t}\right)\right] =$$

$$\text{Re}[(g(t_1)\cos(2\pi f_{w_1}t_1) + jg(t_1)\sin(2\pi f_{w_1}t_1))(g(t_2)\cos(2\pi f_{w_2}t_2) +$$

$$jg(t_2)\sin(2\pi f_{w_2}t_2)) \ldots (g(t_n)\cos(2\pi f_{w_n}t_n) + jg(t_n)\sin(2\pi f_{w_n}t_n))] =$$

$$[(g(t_1)\cos(2\pi f_{w_1}t_1))(g(t_2)\cos(2\pi f_{w_2}t_2)) \ldots (g(t_1)\cos(2\pi f_{w_n}t_n))] =$$

$$g(t)[(\cos(2\pi f_{w_1}t_1))(\cos(2\pi f_{w_2}t_2)) \ldots (\cos(2\pi f_{w_n}t_n))]$$

$$0 \leq t \leq T_w, 0 \leq t_1, t_2 \ldots, t_n \leq T_c, m=1, 2, \ldots, M$$

Figure 6:
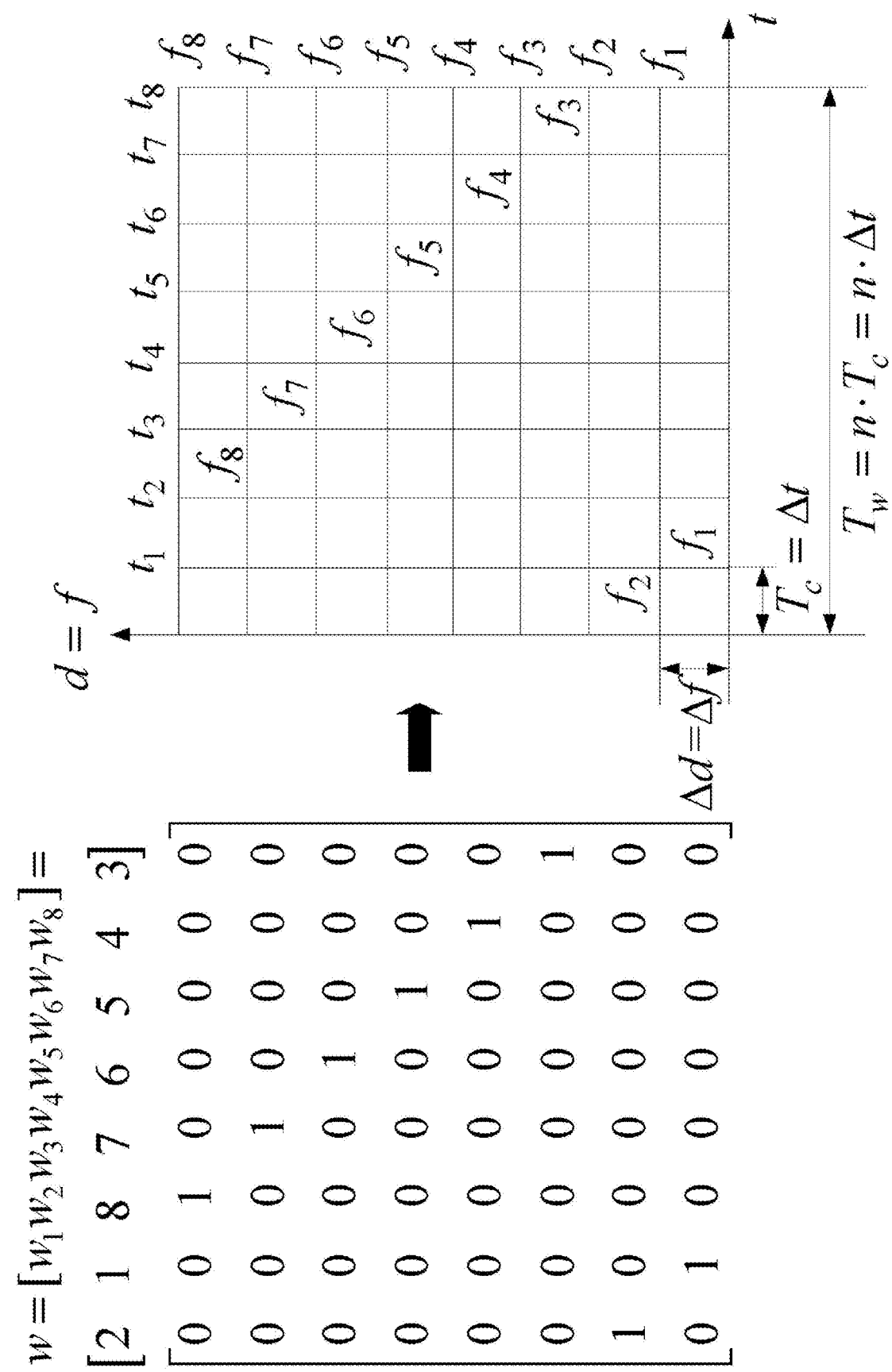
FIG. 6 is a dual-domain modulation signal pattern composed of an 8-dimensional time domain and an 8-dimensional frequency domain, n-TFP, each time chip corresponds to a carrier frequency.

FIG. 6 is a dual-domain modulation signal pattern 8-TFP composed of an 8-dimensional time domain and an 8-dimensional frequency domain. Generally speaking, the signal pattern consists of a plane pattern of $n^2$ squares. The abscissa of this pattern is the time chip $\Delta t_b = t_i - t_{i-1}$ (a time unit) sequence $\Delta t_1, \Delta t_2, \ldots, \Delta t_b, \ldots, \Delta t_n$ and the ordinate is frequency chip or frequency slots $$\Delta d_b = \Delta f_b = f_i - f_{i-1} = \frac{W}{N}$$

(a frequency unit) sequence $\Delta f_1, \Delta f_2, \ldots, \Delta f_b, \ldots, \Delta f_n$. Each square is the product $\Delta f_b \cdot \Delta t_b$ of $\Delta f_b$ and $\Delta t_b$, $m=1, 2, \ldots, M$. Each element 1 of the permutation matrix is replaced with the frequency value $f_i = f_{w_i}$ corresponding to the time chip $\Delta t_b$ in the corresponding permutation vector, which is equivalent to using a frequency value $f_{w_i}$ generated by a control frequency generator of a symbol value $w_i$ of each corresponding time chip $\Delta t_b$ of a permutation codeword $w = F_m(a; l_1; (t_{l1})^{q3}) = [w_1 w_2 \ldots w_n] \in \Gamma_n^3 \subset P_n$ to replace the element "1" in the n×n permutation matrix. FIG. 6 is exemplified by using the codeword $w=[w_1 w_2 w_3 w_4 w_5 w_6 w_7 w_8]=[54321876]$ in row 3, column 4 of the expression (5) when n=8 in the following example 3 providing the conversion relationship of 8×8 permutation matrix to signal pattern 8-TFP.

Model 4: It is set that the modulation multi-domain is the joint modulation domain of the amplitude domain and phase domain of the carrier, set $d_i = A_i$ and $d_i = p_i$, then the domain chip of the modulation multi-domain is the combination of the amplitude chip and the phase chip, that is, $\Delta d_b = d_i - d_{i-1} = \Delta A_b = A_i - A_{i-1}$ and $\Delta d_b = d_i - d_{i-1} = \Delta p_b = p_i - p_{i-1}$, b,i=1, 2, ..., n. That is, two different n×n permutation matrices can be used to construct an n-dimensional dual-domain modulation signal composed of a joint modulation multi-domain composed of the n-dimensional time domain and n-dimensional amplitude as well as n-dimensional phase, which is referred to as n dimensional time-amplitude-phase dual-domain modulation signal model (n-TAPM). The element "1" in the two permutation matrices are respectively replaced by the amplitude value $A_i$ and the phase value $p_i$ corresponding to the time chip $\Delta t_b$. $A_i$ is a symbol value of the permutation codeword $A_m(a; l_1; (t_{l1})^{q_1}) = (t_{l1})^{q_1}(al_1) = [u_1 u_2 \ldots u_n]$, $p_i$ is determined by a symbol value $v_i$ of the permutation codeword $v = P_m(a; l_1; (t_{l1})^{q_2}) = (t_{l1})^{q_2}(al_1) = [v_1 v_2 \ldots v_n] \in {}^{q_2} \subset P_n$. When $q_1, q_2$ and a are determined, $A_i = u_i$ and $$p_i = \frac{2\pi}{n} \cdot v_i$$

can be obtained. If a k-bit binary message sequence selects a codeword $[u_1 u_2 \ldots u_n]$ of $[u_1 u_2 \ldots u_n]$, $Q_1 \leq n-1$, $1 \leq q_1 \leq Q_1$, and another k-bit binary message sequence selects a codeword $[v_1 v_2 \ldots v_n]$ of $\Gamma_n^2 = \{(t_{l1})^{Q_2}\{al_1\}\}$, then the permutation matrix based carrier amplitude and phase signal n-TAPM will carry 2 k bits of binary message, which can be modeled into the following mathematical expressions, including the overlying signal model and the real signal model.

$$s_m(t) = \text{Re}\left[A_m(a; l_1; (t_{l1})^{r_1}) g(t) e^{j\left(2\pi f_c t + \frac{2\pi}{n} P_m(a;l_1;(t_{l1})^r)\right)}\right] =$$

$$\text{Re}\left[A_m(a; l_1; (t_{l1})^{r_1}) g(t) \cos\left(\omega_c t + \frac{2\pi}{n} P_m(a; l_1; (t_{l1})^r)\right) + \right.$$

$$\left. jA_m(a; l_1; (t_{l1})^{r_1}) g(t) \sin\left(\omega_c t + \frac{2\pi}{n} P_m(a; l_1; (t_{l1})^r)\right)\right] =$$

$$\text{Re}\left[[u_1 u_2 \ldots u_n] g(t) \cos\left(\omega_c t + \frac{2\pi}{n}[v_1 v_2 \ldots v_n]\right) + \right.$$

$$\left. j[u_1 u_2 \ldots u_n] g(t) \sin\left(\omega_c t + \frac{2\pi}{n}[v_1 v_2 \ldots v_n]\right)\right] =$$

$$\text{Re}\left[\left(u_1 g(t) \cos\left(\omega_c t + \frac{2\pi}{n} v_1\right) + ju_1 g(t) \sin\left(\omega_c t + \frac{2\pi}{n} v_1\right)\right) \right.$$

$$\left(u_2 g(t) \cos\left(\omega_c t + \frac{2\pi}{n} v_2\right) + ju_2 g(t) \sin\left(\omega_c t + \frac{2\pi}{n} v_2\right)\right) \ldots$$

$$\left. \ldots \left(u_n g(t) \cos\left(\omega_c t + \frac{2\pi}{n} v_n\right) + ju_n g(t) \sin\left(\omega_c t + \frac{2\pi}{n} v_n\right)\right)\right] =$$

$$[u_1 u_2 \ldots u_n] g(t) \cos\left(\omega_c t + \frac{2\pi}{n}[v_1 v_2 \ldots v_n]\right) =$$

$$\left[\left(u_1 g(t_1) \cos\left(\omega_c t_1 + \frac{2\pi}{n} v_1\right)\right)\right.$$

$$\left. \left(u_2 g(t_2) \cos\left(\omega_c t_2 + \frac{2\pi}{n} v_2\right)\right) \ldots \left(u_n g(t_n) \cos\left(\omega_c t_n + \frac{2\pi}{n} v_n\right)\right)\right] =$$

$$g(t)\left[\left(u_1 \cos\left(\omega_c t + \frac{2\pi}{n} v_1\right)\right)\left(u_2 \cos\left(\omega_c t + \frac{2\pi}{n} v_2\right)\right) \ldots \left(u_n \cos\left(\omega_c t + \frac{2\pi}{n} v_n\right)\right)\right]$$

Figure 7A:
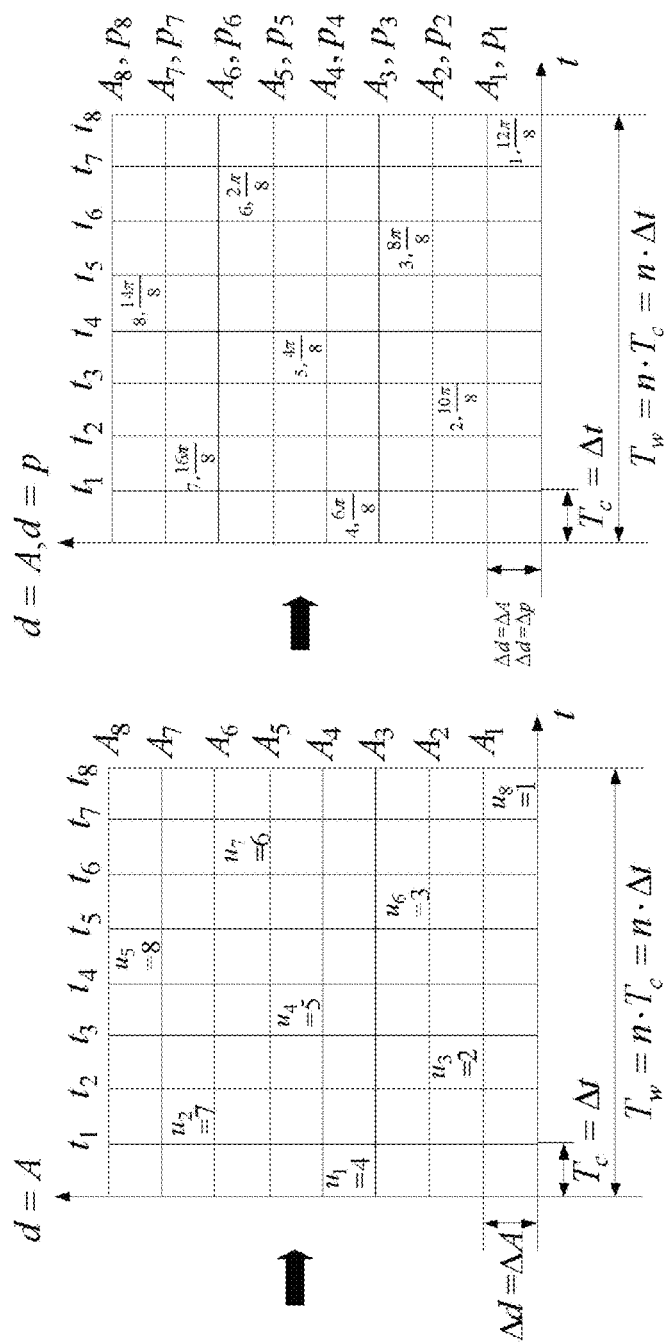
FIGS. 7a and 7b illustrate a dual-domain modulation signal pattern composed of an 8-dimensional time domain as well as 8-dimensional amplitude and an 8-dimensional phase joint modulation domain, n-TAPP, each time chip corresponds to the amplitude and phase of a carrier.
Figure 7B:
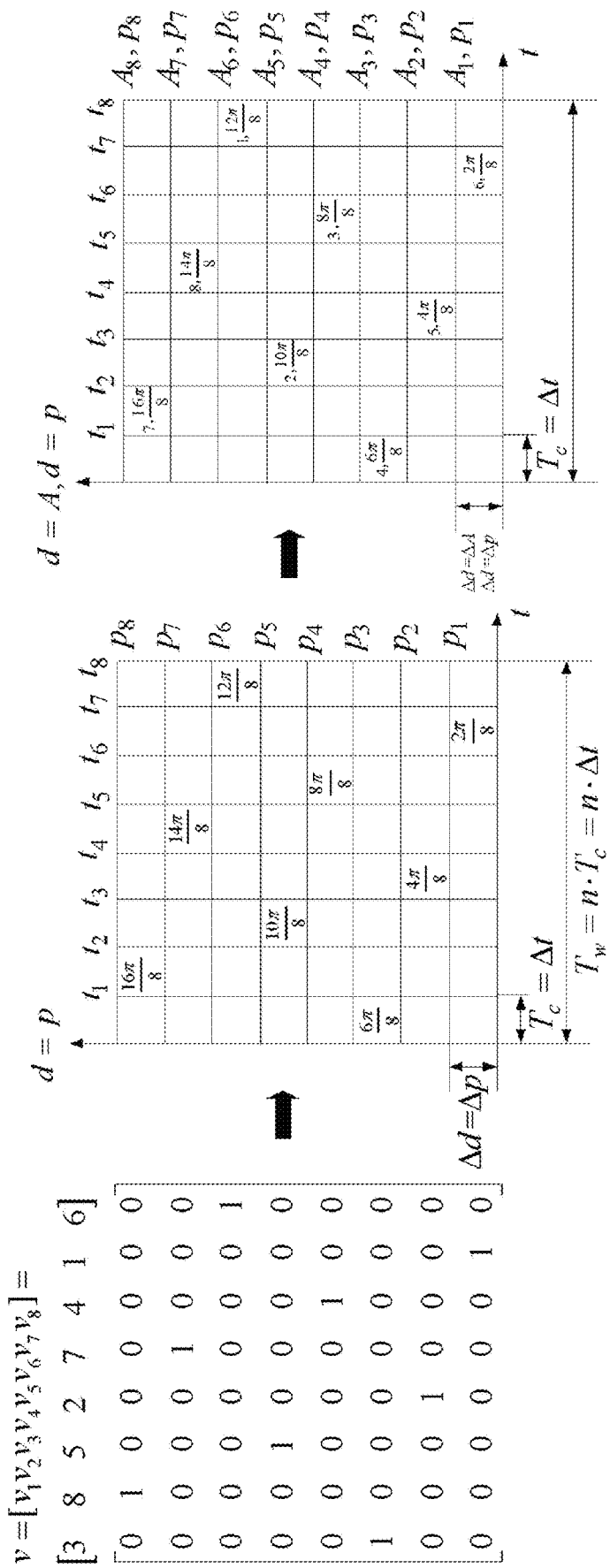

FIGS. 7a and 7b illustrate a dual-domain modulation signal pattern 8-TAPP formed by joint modulation multi-domain of 8-dimensional time domain and 8-dimensional amplitude as well as 8-dimensional phase. Generally speaking, the n-dimensional time-amplitude-phase modulation signal pattern n-TAPP is a plane pattern composed of $n^2$ squares, and each square is composed of a mix of carrier amplitude modulation and phase modulation in the square of two patterns—n-TAP and n-TPP. If in the n-TAPP pattern, the codeword $u = A_m(a; l_1; (t_{l1})^{q_1}) = [u_1 u_2 \ldots u_n]$ of the amplitude signal pattern n-TAP comes from $\Gamma_n^1 = \Gamma_n$ (but $\Gamma_n^2 \neq \Gamma_n$), and the n-TAPP pattern has the same structure as the n-TAP pattern, then the multi-domain modulation value in the square is replaced by the joint value of the amplitude value and the phase value. If in the n-TAPP pattern, the codeword $v = P_m(a; l_1; (t_{l1})^{q_2}) = [v_1 v_2 \ldots v_n]$ of the phase signal pattern n-TPP comes from $\Gamma_n^2 = \Gamma_n$ (but $\Gamma_n^1 \neq \Gamma_n$), and n-TAPP pattern has the same structure as the n-TPP pattern, then the multi-domain modulation value in the square is replaced by the joint value of the amplitude value and the phase value. FIGS. 7a and 7b are exemplified by using the codeword u=[$u_1u_2u_3u_4u_5u_6u_7u_8$]=[47258361] and the codeword v=[$v_1v_2v_3v_4v_5v_6v_7v_8$]=[38527416] of the expression (5) when n=8 in the following example 3 providing the conversion relationship of 8×8 permutation matrix to the two signal patterns 8-TAPP.

Model 5: It is set that the modulation domain is the joint modulation of the amplitude and frequency of the carrier, set $d_i=A_i$ and $d_i=f_i$, then the domain chip of the modulation domain are the amplitude slot and frequency slot, namely $\Delta d_b=d_i-d_{i-1}=\Delta A_b=A_i-A_{i-1}$ and $\Delta d_b=d_i-d_{i-1}=\Delta f_b=f_i-f_{i-1}$, b, i=1, 2, . . . , n. That is, two different n×n permutation matrices can be used to construct an n-dimensional dual-domain modulation signal composed of the joint modulation multi-domain of the n-dimensional time domain and the n-dimensional amplitude domain as well as the n-dimensional frequency, which is referred to as n-dimensional time-amplitude frequency dual-domain modulation signal model (n-TAFM). The elements "1" in the two permutation matrices are respectively replaced by the amplitude value $A_i$ and the frequency value $f_i$ corresponding to the time chip $\Delta t_b$. $A_i$ is the i-th symbol value of the permutation codeword $A_m(a; l_1; (t_{l1})^{q1})=(t_{l1})^{q1}(al_1)=[u_1u_2 \ldots u_n]$, $f_i$ is numbered by the i-th symbol value $w_i$ in the permutation codeword $w=F_m(a; l_1; (t_{l1})^{q3})=(t_{l1})^{q3}(al_1)=[w_1w_2 \ldots w_n]\in\Gamma_n^3\subset P_n$. When $q_1$, $q_3$ and a are determined, $A_i=u_i$ and $f_i=f_{w_i}$ can be obtained. If a k-bit binary message sequence selects a codeword $[u_1u_2 \ldots u_n]$ in the permutation array code $\Gamma_n^1=\{(t_{l1})^{Q1}\{al_1\}\}$, $Q_1\leq n-1$, $0\leq q_1\leq Q_1$, and another k-bit binary message sequence selects a codeword $[w_1w_2 \ldots w_n]$ in $\Gamma_n^3=\{(t_{l1})^{Q3}\{al_1\}\}$, $Q_3\leq n-1$, $0\leq q_3\leq Q_3$, $a=|L_n|$, then the permutation matrix based carrier amplitude and frequency signal n-TAFM will carry 2 k bits of binary message, which can be modeled into the following mathematical expressions, including the overlay signal model and the real signal model.

$$s_m(t) = \text{Re}\left[A_m(a; l_1; (t_{l1})^{q1})g(t)e^{j\left(2\pi f_{Fm(a;l_1;(t_{l1})^{q3})}t\right)}\right] = \text{Re}[A_m(a; l_1; (t_{l1})^{q1})$$

$$g(t)\cos(2\pi f_{Fm(a;l_1;(t_{l1})^{q3})}t) + jA_m(a; l_1; (t_{l1})^{q1})g(t)\sin(2\pi f_{Fm(a;l_1;(t_{l1})^{q3})}t)] =$$

$$\text{Re}[[u_1u_2 \ldots u_n]g(t)\cos(2\pi f_{[w_1w_2 \ldots w_n]}t) + j[u_1u_2 \ldots u_n]g(t)$$

$$\sin(2\pi f_{[w_1w_2 \ldots w_n]}t)] = \text{Re}[[u_1g(t)\cos(2\pi f_{w_1}t) + ju_1g(t)\sin(2\pi f_{w_1}t)$$

$$(u_2g(t)\cos(2\pi f_{w_2}t) + ju_2g(t)\sin(2\pi f_{w_2}t)) \ldots \ldots (u_ng(t)\cos(2\pi f_{w_n}t) +$$

$$ju_ng(t)\sin(2\pi f_{w_n}t)]] = [u_1u_2 \ldots u_n]g(t)\cos(2\pi f_{[w_1w_2 \ldots w_n]}t) =$$

$$g(t)[(u_1\cos(2\pi f_{w_1}t_1))(u_2\cos(2\pi f_{w_2}t_2)) \ldots (u_n\cos(2\pi f_{w_n}t_n))]$$

Figure 8A:
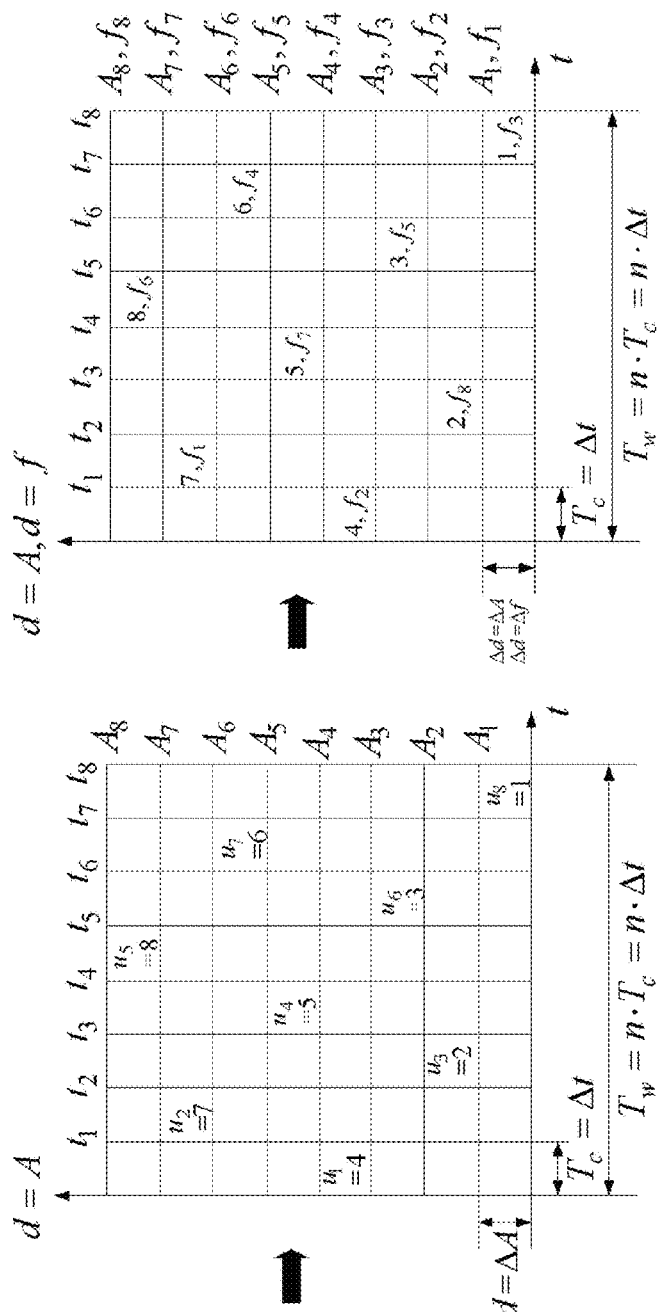
FIGS. 8a and 8b illustrate a dual-domain modulation signal pattern composed of an 8-dimensional time domain as well as 8-dimensional amplitude and an 8-dimensional frequency joint modulation domain, n-TAFP, each time chip corresponds to the amplitude and frequency of a carrier.
Figure 8B:
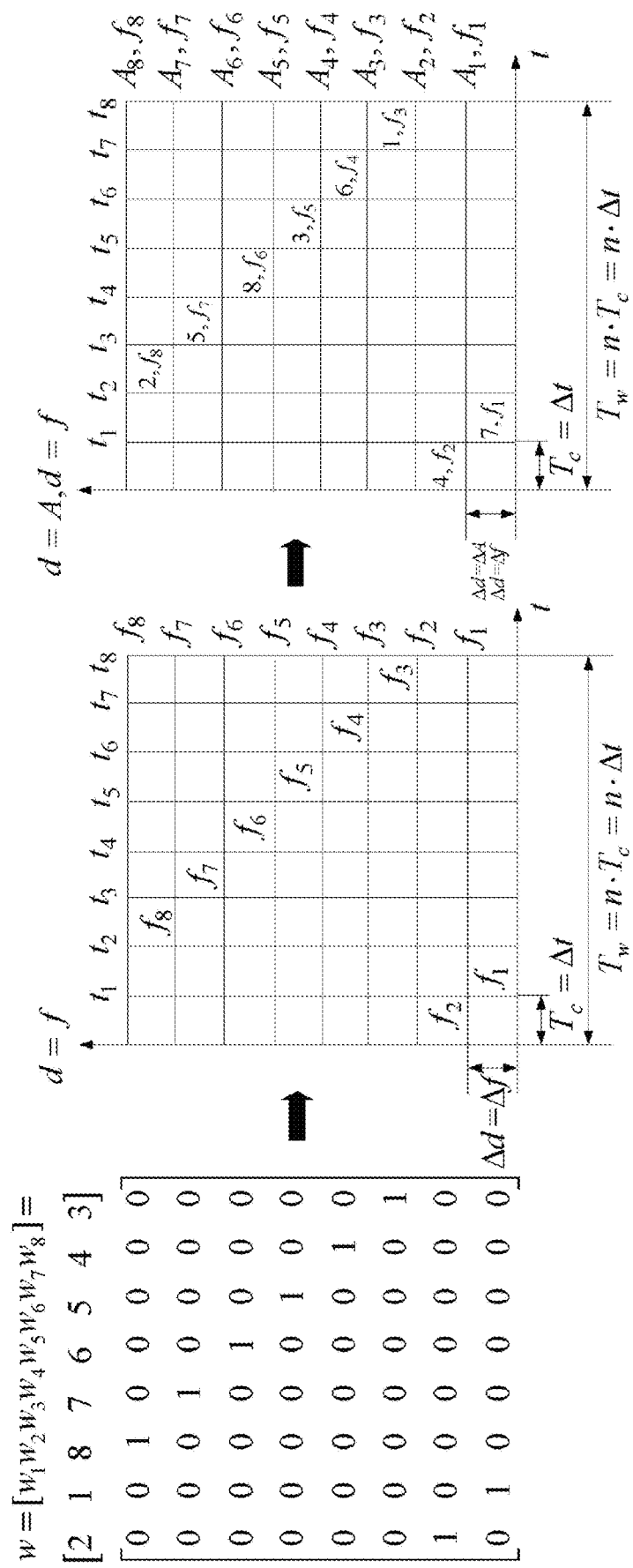

FIGS. 8a and 8b illustrate a dual-domain modulation signal pattern 8-TAFP formed by a joint modulation multi-domain of 8-dimensional time domain and 8-dimensional amplitude as well as 8-dimensional frequency. Generally speaking, the n-dimensional time-amplitude frequency modulation signal pattern n-TAFP is a plane pattern composed of $n^2$ squares, and each square is composed of a mix of carrier amplitude modulation and frequency modulation in the square of two patterns-n-TAP and n-TFP. If in the n-TAPP pattern, the codeword u=$A_m(a; l_1; (t_{l1})^{q1})$=[$u_1u_2 \ldots u_n$] of the amplitude signal pattern n-TAP comes from $\Gamma_n^1=\Gamma_n$ (but $\Gamma_n^2\neq\Gamma_n$), and the n-TAFP pattern has the same structure as the n-TFP pattern, then the multi-domain modulation value in the square is replaced by the joint value of the amplitude value and the frequency value. FIGS. 8a and 8b are exemplified by using the codeword u=[$u_1u_2u_3u_4u_5u_6u_7u_8$]=[47258361] and the codeword w=[$w_1w_2w_3w_4w_5w_6w_7w_8$]=[54321876] of the expression (5) when n=8 in the following example 3 providing the conversion relationship of 8×8 permutation matrix to the two signal patterns 8-TAPP.

Model 6: It is set that the modulation multi-domain is the joint modulation domain of the amplitude, phase and frequency of the carrier, set $d_i=A_i$, $d_i=p_i$ and $d_i=f_i$, then the domain chip of the modulation multi-domain are the amplitude chip $\Delta d_b=d_i-d_{i-1}=\Delta A_b=A_i-A_{i-1}$, phase chip $\Delta d_b=d_i-d_{i-1}=\Delta p_b=p_i-p_{i-1}$ and frequency chip $\Delta d_b=d_i-d_{i-1}=\Delta f_b=f_i-f_{i-1}$, b, i=1, 2, . . . , n. That is, three different n×n permutation matrices can be used to construct a dual-domain modulation signal model (n-TAPFM) composed of the n-dimensional time domain and the amplitude-phase-frequency joint modulation multi-domain. The elements "1" in the three permutation matrices are respectively replaced by the amplitude value $A_i$, the phase value $p_i$ and the frequency value $f_i$ corresponding to the time chip $\Delta t_b$ in the permutation vector. $A_i$ is the i-th symbol value of the permutation codeword $A_m(a; l_1; (t_{l1})^{q1})=(t_{l1})^{q1}(al_1)=[u_1u_2 \ldots u_n]$, $p_i$ is determined by the i-th symbol value of the permutation codeword $v=P_m(a; l_1; (t_{l1})^{q2})(t_{l1})^{q2}(al_1)=[v_1v_2 \ldots v_n]\in\Gamma_n^2\subset P_n$, $f_i$ is numbered by the i-th symbol value $w_i$ in the permutation codeword $w=F_m(a; l_1; (t_{l1})^{q3})=(t_{l1})^{q3}(al_1)=[w_1w_2 \ldots w_n]\in\Gamma_n^3\subset P_n$. When $q_1$, $q_2$, $q_3$ and a are determined, $A_i=u_i$, $$p_i = \frac{2\pi}{n} \cdot v_i$$

and $f_i=f_{w_i}$ can be obtained. If a first k-bit binary message sequence selects a codeword $[u_1u_2 \ldots u_n]$ in the permutation array code $\Gamma_n^1=\{(t_{l1})^{Q1}\{al_1\}\}$, $Q_1\leq n-1$, $1\leq q_1\leq Q_1$, a second k-bit binary message sequence selects a codeword $[v_1v_2 \ldots v_n]$ of $\Gamma_n^2=\{(t_{l1})^{Q2}\{al_1\}\}$, $Q_2\leq n-1$, $1\leq q_2\leq Q_2$, and a third k-bit binary message sequence selects a codeword $[w_1w_2 \ldots w_n]$ in $\Gamma_n^3=\{(t_{l1})^{Q3}\{al_1\}\}$, $Q_3\leq n-1$, $1\leq q_3\leq Q_3$, $a=|L_n|$, then the three permutation matrices based n-dimensional time-amplitude phase frequency modulation signal n-TAPFM will carry 3 k bits of binary message, which can be modeled into the following mathematical expressions, including the overlay signal model and the real signal model.

$$s_m(t) = \text{Re}\left[A_m(a; l_1; (t_{l1})^{q1})g(t)e^{j\left(2\pi f_{Fm(a;l_1;(t_{l1})^{q3})}t+\frac{2\pi}{n}P_m(a;l_1;(t_{l1})^{q2})\right)}\right] =$$

$$\text{Re}\left[A_m(a; l_1; (t_{l1})^{q1})g(t)\cos\left(2\pi f_{Fm(a;l_1;(t_{l1})^{q3})}t+\frac{2\pi}{n}P_m(a; l_1; (t_{l1})^{q2})\right) +\right.$$

$$\left. jA_m(a; l_1; (t_{l1})^{q1})g(t)\sin\left(2\pi f_{Fm(a;l_1;(t_{l1})^{q3})}t+\frac{2\pi}{n}P_m(a; l_1; (t_{l1})^{q2})\right)\right] =$$

$$\text{Re}\left[[u_1u_2 \ldots u_n]g(t)\cos\left(2\pi f_{[w_1w_2 \ldots w_n]}t+\frac{2\pi}{n}[v_1v_2 \ldots v_n]\right) +\right.$$

$$\left. j[u_1u_2 \ldots u_n]g(t)\sin\left(2\pi f_{[w_1w_2 \ldots w_n]}t+\frac{2\pi}{n}[v_1v_2 \ldots v_n]\right)\right] =$$

$$\text{Re}\left[\left(u_1g(t)\cos\left(2\pi f_{w_1}t+\frac{2\pi}{n}v_1\right) + ju_1g(t)\sin\left(2\pi f_{w_1}t+\frac{2\pi}{n}v_1\right)\right)u_2\right.$$

$$g(t)\cos\left(2\pi f_{w_2}t+\frac{2\pi}{n}v_2\right) + ju_2g(t)\sin\left(2\pi f_{w_2}t+\frac{2\pi}{n}v_2\right)\right) \ldots \ldots$$

$$\left.\left(u_ng(t)\cos\left(2\pi f_{w_n}t+\frac{2\pi}{n}v_n\right) + ju_ng(t)\sin\left(2\pi f_{w_n}t+\frac{2\pi}{n}v_n\right)\right)\right] =$$

-continued $$[u_1 u_2 \ldots u_n]g(t)\cos\left(2\pi f_{[w_1 w_2 \ldots w_n]}t\right) + \frac{2\pi}{n}[v_1 v_2 \ldots v_n]\right) =$$

$$\left[\left(u_1 g(t_1)\cos\left(2\pi f_{w_1} t_1 + \frac{2\pi}{n}v_1\right)\right)\right.$$

$$\left(u_2 g(t_2)\cos\left(2\pi f_{w_2} t_2 + \frac{2\pi}{n}v_2\right)\right) \ldots \left(u_n g(t_n)\cos\left(2\pi f_{w_n} t_n + \frac{2\pi}{n}v_n\right)\right)\right] =$$

$$g(t)\left[\left(u_1 \cos(2\pi f_{w_1} t_1) + \frac{2\pi}{n}v_1\right)\right)\left(u_2 \cos(2\pi f_{w_2} t_2) + \frac{2\pi}{n}v_2\right)\right)$$

$$\ldots \left(u_n \cos(2\pi f_{w_n} t_n) + \frac{2\pi}{n}v_n\right)\right)\right]$$

Figure 9A:
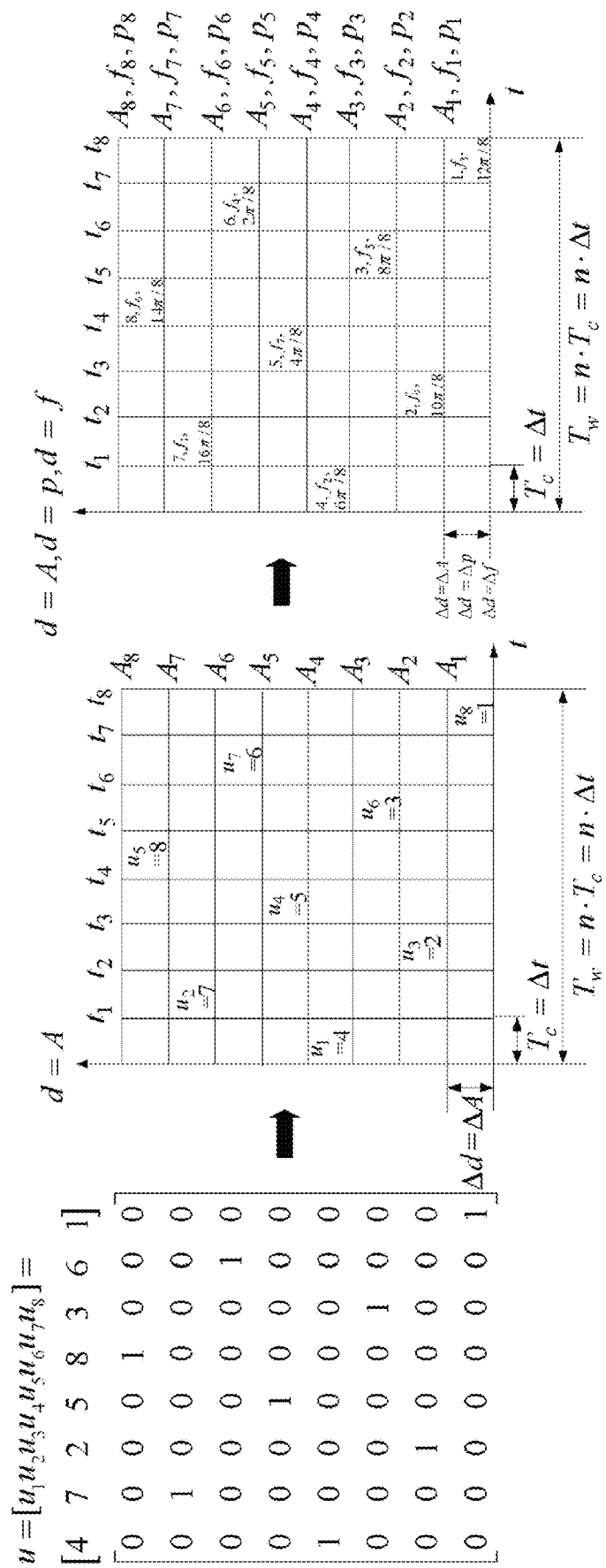
FIGS. 9a, 9b, and 9c illustrate a dual-domain modulation signal pattern composed of an 8-dimensional time domain and 8-dimensional amplitude, an 8-dimensional phase and an 8-dimensional frequency joint modulation domain, n-TAPFP, each time chip corresponds to the amplitude, phase and frequency of a carrier.
Figure 9B:
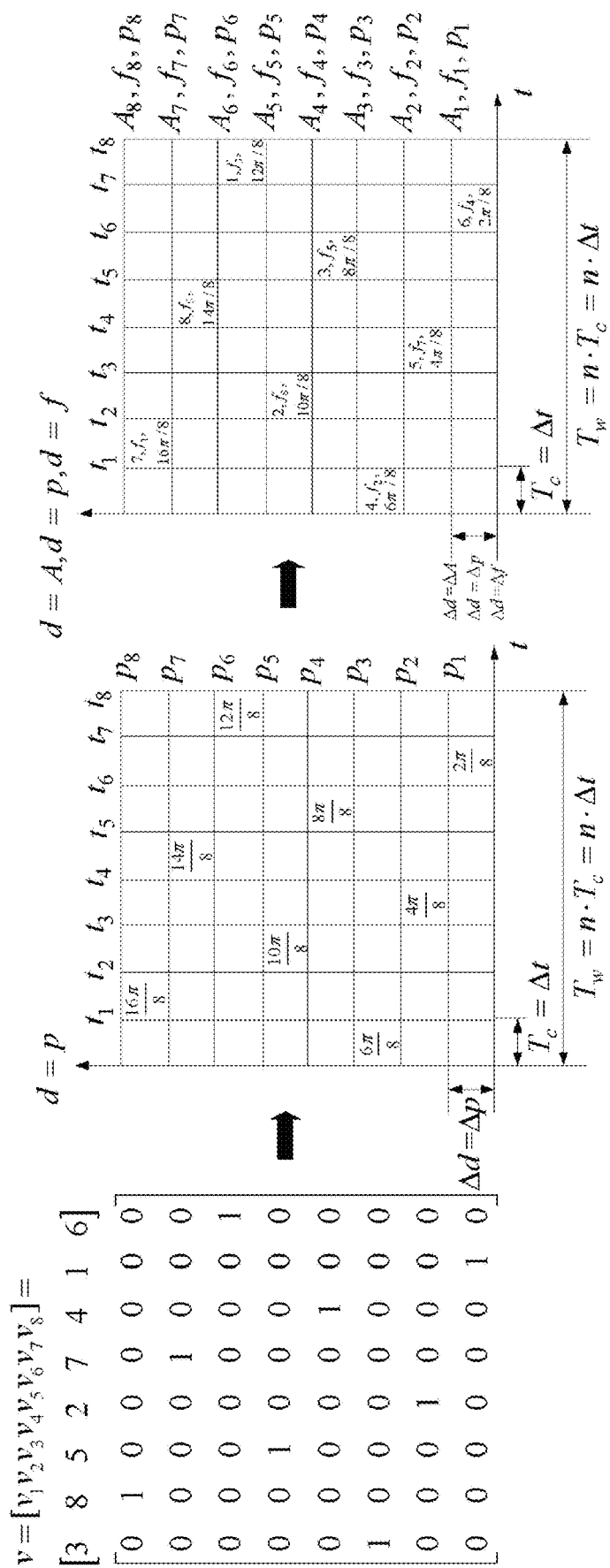
Figure 9C:
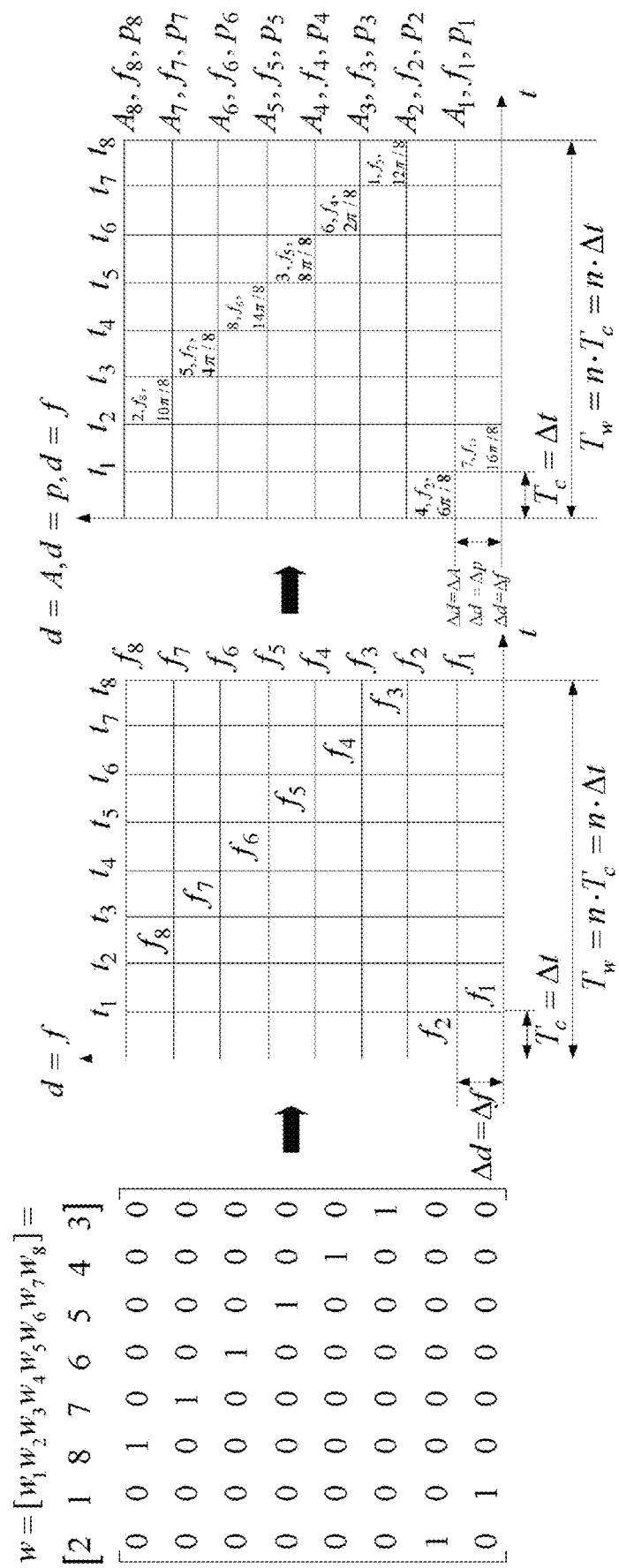

FIGS. 9a, 9b, and 9c illustrate a dual-domain modulation signal pattern 8-TAPFP formed by a joint multi-domain of 8-dimensional time domain and 8-dimensional amplitude as well as 8-dimensional frequency. Generally speaking, the n-TAPFP signal pattern is composed by mixing the carrier amplitude modulation, phase modulation and frequency modulation through three patterns —n-TAP, n-TPP and n-TFP. The n-dimensional time-amplitude-phase-frequency modulation signal pattern n-TAPFP is a plane pattern composed of $n^2$ squares, and each square is composed by mixing the carrier amplitude modulation, phase modulation and frequency modulation in the square through three patterns—n-TAP, n-TPP and n-TFP. If in the n-TAPP pattern, the codeword $u=A_m(a; l_1; (t_{l1})^{q1})=[u_1 u_2 \ldots u_n]$ of the amplitude signal pattern n-TAP comes from $\Gamma_n^{\ 1}=\Gamma_n$ (but $\Gamma_n^{\ 2} \neq \Gamma_n$), and the n-TAPFP pattern has the same structure as the n-TAP pattern, then the multi-domain modulation value in the square is replaced by the joint value of the amplitude value, the phase value and the frequency value. If in the phase signal pattern n-TPP, the codeword $v=P_m(a; l_1; (t_{l1})^{q2})=[v_1 v_2 \ldots v_n]$ comes from $\Gamma_n^{\ 2}=\Gamma_n$ (but $\Gamma_n^{\ 1} \neq \Gamma_n$), and n-TAPFP pattern has the same structure as the n-TPP pattern, then the multi-domain modulation value in the square is replaced by the joint value of the amplitude value, the phase value and the frequency value. If in the frequency signal pattern n-TFP, the codeword $w=F_m(a; l_1; (t_{l1})^{q3})=[w_1 w_2 \ldots w_n]$ comes from $\Gamma_n^{\ 3}=\Gamma_n$ (but $\Gamma_n^{\ 1} \neq \Gamma_n$), and n-TAPFP pattern has the same structure as the n-TFP pattern, then the multi-domain modulation value in the square is replaced by the joint value of the amplitude value, the phase value and the frequency value. FIGS. 9a, 9b, and 9c are exemplified by using the codeword $u=[u_1 u_2 u_3 u_4 u_5 u_6 u_7 u_8]=[47258361]$, the codeword $v=[v_1 v_2 v_3 v_4 v_5 v_6 v_7 v_8]=[38527416]$ and the codeword $w=[w_1 w_2 w_3 w_4 w_5 w_6 w_7 w_8]=[54321876]$ of the expression (5) when n=8 in the following example 3 providing the conversion relationship of three 8×8 permutation matrices to the three signal patterns 8-TAPFP.

Part 3: Multi-Dimensional High-Order Dual-Domain Modulation Signal Permutation Array Constellation Diagram The main purpose of this section is to invent a constructing method for an n-dimensional high-order dual-domain modulation signal permutation array constellation method based on the permutation group code $P_n$. That is, the n-dimensional dual-domain modulation signal model in Part 2 is used as the signal point, and the $2^k$ codewords in a subset of the permutation group code $P_n$ are used to control the transmission of this signal point, thereby forming the permutation array constellation diagram of an n-dimensional $2_k$ order dual-domain modulation signal.

This section will describe three points. One is related to the method of selecting $2^k$ codewords from p codewords of (n,μ,d) permutation group code $P_n$ to form a permutation array code $\Gamma_n$ when n>1 is any positive integer, which involves the method of using the cycle-shifted technology to generate the permutation array code $\Gamma_n$. The second is related to an disclosure of a method for constructing coset leader set $L_n$ in the case of any n. The third is related to a structure and design method of the permutation array constellation architecture of n-dimensional high-order dual-domain modulation signal by using the six n-dimensional dual-domain modulation signal models in Part 2 based on the structural design of the permutation array code $\Gamma_n$.

First, when n>1 is any positive integer, the design method of the coset leader set $L_n$ is invented. From the method of generating expressions (1) and (2), it can be found that the key to enumerating the permutation group code $P_n$ is to first calculate the coset leader set $L_n$. This disclosure uses a scale transformation $f_a(x)=ax$(wherein $a \in Z_{n-1}$ and $x \in S_n$) to calculate $L_n=\{al_1|a \in Z_{n-1}; l_1=[12 \ldots n] \in S_n\} \cup S_n$. $\varphi(n)$ is set to denote the number of numbers in a=1, 2, . . . , n−1 that do not have a common factor with n, $\{\varphi\}$ denotes the set of numbers in a that do not have a common factor with n. The value range of a is $a \in \{\varphi\}$, which determines the size of the coset leader set, that is, $|L\_n|=|\{\varphi\}|=\varphi(n)$. The maximum number of fixed-points of any permutation vector except the unit permutation vector in $L_n$ is expressed as δ, which gives the minimum Hamming distance of $L_n$, that is, $d_{L_n}=n-\delta$. The following divides n into three cases to calculate $L_n$.

1. When n is a prime number, all the values of a=1, 2, . . . , n−1 and n are mutually prime numbers, that is, GCD(a,n)=1, there is no common factor of all values of a with n. Therefore, $\varphi(n)=n-1$, $a \in \{\varphi\}=\{1, 2, \ldots, n-1\}=Z_{n-1}$, then $L_n$ is referred to as the maximum single fixed point subgroup. A simple calculation expression $L=\{al_1|a \in Z_{n-1}; l_1=[12 \ldots n] \in S_n\}$ can be used to enumerate all permutation codewords in $L_n$. When the size of $L_n$ is $|L\_n|=|\{\varphi\}|=\varphi(n)=n-1$, it reaches the maximum. Since each permutation of the maximum single fixed point subgroup $L_n$ contains only single-fixed-point, that is, δ=1, the minimum Hamming distance is $d_{L_n}=n-\delta=n-1$. It can be seen that $L_n$ is a (n, n−1, n−1) permutation group code. The calculation expression of $L_n$ is $L=\{al_1|a \in Z_{n-1}; l_1=[12 \ldots n] \in S_n\}$, which can be used to calculate the maximum single fixed point subgroup $L_5=\{al_1|a \in \{1,2,3,4\}; l_1=[x_1 x_2 x_3 x_4 x_5]\}0$ and $L_{17}=\{al_1|a \in \{1, 2, \ldots, 16\}; l_1=[x_1 x_2 \ldots x_{16} x_{17}]\}$ with code length n=5,17.

2. When n is not a prime number but a power of 2, that is, when $n=2^q$ is a power of 2, and q≥2 is a positive integer, the size of $L_n$ is $|L_n|=2^{q-1}$, the maximum fixed-point is $\delta=2^{q-1}$, the minimum Hamming distance of $L_n$ is $d_{L_n}=2^{q-1}$. $L_n$ is a $(2^q, 2^{q-1}, 2^{q-1})$ permutation group code, the calculation expression of $L_n$ is $L_n=\{al_1|a \in \{\text{all odd numbers from 1 to } 2^q\}; l_1=[12 \ldots n] \in S_n\}$, which can be used to calculate the fixed-point subgroup $L_4=\{al_1|a \in \{1,3\}; l_1=[x_1 x_2 x_3 x_4]\}$, $L_8=\{al_1|a \in \{1,3,5,7\}; l_1=[x_1 x_2 \ldots x_7 x_8]\}$, $L_{16}=\{al_1|a \in \{1, 3,5,7,9,11,13,15\}; l_1=[x_1 x_2 \ldots x_{15} x_{16}]\}$, $L_{32}=\{al_1|a \in \{1, 3, 5, 7, \ldots, 29,31\}; l_1=[x_1 x_2 \ldots x_{31} x_{32}]\}$ with a code length of n=4,8,16,32,64. $L_{64}=\{al_1|a \in \{\text{all odd numbers from 1 to } 64\}; l_1=[x_1 x_2 \ldots x_{63} x_{64}]\}$.

3. When n>1 is the product of two prime numbers and contains 3, let h be another prime number, and the size of $L_n$ is $|L_n|=\varphi(n)=|\{$From 1 to n−1, the set of numbers that do not contain multiples of 3 and multiples of h$\}|$. The maximum fixed-point of $L_n$ is δ=the number of co-values of all 3 from 1 to n−1. The minimum Hamming distance of $L_n$ is $d_{L_n}=n \cdot \delta$. $L_n$ is a permutation group code of(n, $\varphi$(n), n−δ), the calculation expression of $L_n$ is $L_n=\{al_1|a \in \{$The set of all numbers from 1 to n−1 that do not contain multiples of 3 and multiples of h$\}$; $l\_1=[x\_1 \ldots x\_n] \in S\_n\}$, which can be used to calculate the fixed-point subgroup $L_{15}=\{al_1|a\in\{1,2,4,7,8,11,13,14\}$; $l_1=[x_1x_2 \ldots x_{15}]\}$ and $L_{51}=\{al_1|a\in\}$ {remove multiples of 3 and 17 from natural numbers from 1 to 51}; $l\_1=[x\_1\ x\_2\ \ldots\ x\_50\ x\_51]\}$ with a code length of n=15, 51.

In summary, for any positive integer n>1, the design method for $L_n$ is: i) calculating the set $\{\varphi\}$ formed by a=1, 2, ..., n−1 and the value a which has no common factor with n, determining the number of the set $|\{\varphi\}|=\varphi(n)=|L_n|$; ii) calculating $L=\{al_1|a\in\{\varphi\}; GCD(a, n)=1; l_1=[12 \ldots n]\}$, obtaining the coset leader set $L_n$ or listing $L_n$ through observation; iii) using the method of observation or analysis to find the maximum fixed-point codeword from the set $L_n$, obtaining $\delta$, and obtaining the minimum Hamming distance $d_{L_n}$n−$\delta$ of $L_n$. In this way, it can be obtained that the coset leader set $L_n$ is (n,μ(n),n−$\delta$) permutation group code.

Secondly, when n>1 is any positive integer, the design method of (n, μ, d) permutation group code $P_n$ is provided first, and then the permutation array code $\Gamma_n$ is generated from $P_n$. Specifically, the cycle-shifted technique is used to generate the permutation group code $P_n$. In the basic principle, it describes the algebraic generating method of permutation group code (n,n(n−1),n−1) when n is a prime number, and the permutation synchronous operation method (such as (1) calculation operation expression) and the calculation method of affine transformation (such as (2) calculation operation expression) are adopted. In the calculation operation expression (1), it is difficult to enumerate the code set $P_n$ in the form of hardware and software, and the complexity in time calculation is quite high. In the calculation operation expression (2), it is required to use modulo-n addition and modulo-n multiplication operations, which has certain time complexity. Cycle-shifted technology is an effective method to reduce time complexity. For this purpose, the following cycle-shifted operator is defined, and a composition function based on the cycle-shifted operator is constructed.

The cycle-right-shifted operator $t_{rn}$ is defined, when it acts on any permutation vector $x=[x_1x_2 \ldots x_n]$, the rightmost element of this vector is moved to the leftmost, and the remaining n−1 elements are moved to the right in turn, namely $t_{rn}x=t_{rn}[x_1x_2 \ldots x_n]=[x_nx_1x_2 \ldots x_{n-1}]$. The cycle-left-shifted operator $t_{l1}$ is defined, when it acts on any permutation vector $x=[x_1x_2 \ldots x_n]$, the leftmost element of this vector is moved to the rightmost, and the remaining n−1 elements are moved to the left in turn, namely $t_{l1}x=t_{l1}[x_1 x_2 \ldots x_n]=[x_2x_3 \ldots x_{n-1}x_nx_1]$.

A composition function of the cycle-right-shifted operator and the left-shifted operator are constructed. The composition function $(t_{rn})^{n-1}$ of the right-shifted operator $t_{rn}$ is constructed, when it acts on any permutation codeword $x=[x_1x_2 \ldots x_n]$, n permutation codeword including this permutation codeword x are obtained, thereby constituting a loop Latin square, and constituting an orbit set of permutation codewords with x as the leader of the orbit, or constituting a coset with x as the leader of the coset, thereby obtaining a set $\{(t_{rn})^{n-1}x\}=\{x,\ (t_{rn})^1x,\ (t_{rn})^2x,\ \ldots,\ (t_{rn})^{n-1}x\}=\{(t_{rn})^{n-1}[x_1x_2 \ldots x_n])\}=\{[x_1x_2 \ldots x_n],\ (t_{rn})^1[x_1 x_2 \ldots x_n],\ (t_{rn})^2[x_1x_2 \ldots x_n],\ [x_1x_2 \ldots x_n]\}=\{[x_1x_2 \ldots x_n], [x_nx_1 x_2 \ldots x_{n-1}], [x_{n-1}x_nx_1x_2 \ldots x_{n-2}], \ldots, [x_2x_3 \ldots x_nx_1]\}$ constituted by n permutation codewords containing the permutation codeword x. The composition function $(t_{l1})^{n-1}$ of the left-shifted operator $t_{l1}$ is constructed, when it acts as any permutation codeword $x=[x_1x_2 \ldots x_n]$, n permutation codewords including this permutation codeword x is obtained, thereby constituting a loop Latin square, and constituting an orbit set of permutation codewords with x as the leader of the orbit, or constituting a coset with x as the leader of the coset, thereby obtaining a set $\{(t_{l1})^{n-1}x\}=\{x, (t_{l1})^1x, (t_{l1})^2x, \ldots, (t_{l1})^{n-1}x\}=\{(t_{l1})^{n-1} [x_1x_2 \ldots x_n]\}=\{[x_1 \ldots x_n], (t_{l1})^1[x_1 \ldots x_n], (t_{l1})^2[x_1 \ldots x_n], \ldots, (t_{l1})^{n-1} [x_1 \ldots x_n]\}=\{[x_1 \ldots x_n], [x_nx_1 \ldots x_{n-1}], [x_{n-1}x_nx_1 \ldots x_{n-2}], \ldots, [x_2 \ldots x_nx_1]\}$ constituted by n permutation codewords containing the permutation codeword x. These two composition functions act on the same permutation codeword x, and get the same code set $\{(t_{rn})^{n-1}x\}=\{(t_{l1})^{n-1}x\}$, but the order of the codewords in these two sets is different.

If the cycle-right-shifted composition function $(t_{rn})^{n-1}$ and the cycle-left-shifted composition function $(t_{l1})^{n-1}$ both act on the maximum single-fixed-point subgroup $L_n$, the permutation group code $P_n=\{(t_{rn})^{n-1}L_n\}=\{(t_{l1})^{n-1}L_n\}$ can be obtained. More specifically, the cycle-left-shifted composition function $(t_{l1})^{n-1}$ and the cycle-right-shifted composition function $(t_{rn})^{n-1}$ are used to act on the orbit leader permutation vector $l_1, l_2, \ldots, l_a, \ldots, l_{|L_n|}$ respectively to get $|L_n|$ sets of orbits $\{(t_{l1})^{n-1}l_1\}, \{(t_{l1})^{n-1}l_2\}, \ldots, \{(t_{l1})^{n-1}l_{|L_n|}\}$ or $\{(t_{rn})^{n-1}l_1\}, \{(t_{rn})^{n-1}l_2\}, \ldots, \{(t_{rn})^{n-1}l_{|L_n|}\}$.

The method of generating permutation group code $P_n$ in different situations is given below.

1) When n is a prime number, $L_n=\{al_1|a\in Z_{n-1}; l_1=[12 \ldots n]\in S_n\}$ is the maximum single fixed point subgroup of $S_n$, and $P_n$ is calculated as follows.

$$P_n = \{(t_{rn})^{n-1}L_n\} = \{(t_{rn})^{n-1}\{al_1|a \in Z_{n-1}; l_1 = [12 \ldots n] \in S_n\}\} =$$
$$\{(t_{rn})^{n-1}\{l_1, l_2, \ldots, l_{n-1}\}\} = \{(t_{rn})^{n-1}l_1\}, \{(t_{rn})^{n-1}l_2\}, \ldots, \{(t_{rn})^{n-1}l_{n-1}\} \text{ Or}$$

$$P_n = \{(t_{l1})^{n-1}L_n\} = \{(t_{l1})^{n-1}\{al_1|a \in Z_{n-1}; l_1 = [12 \ldots n] \in S_n\}\} =$$
$$\{(t_{l1})^{n-1}\{l_1, l_2, \ldots, l_{n-1}\}\} = \{(t_{l1})^{n-1}l_1\}, \{(t_{l1})^{n-1}l_2\}, \ldots, \{(t_{l1})^{n-1}l_{n-1}\}$$

$P_n$ is a (n,n(n−1),n−1) permutation group code. This generating method has been protected in the patent "communication channel encoding method and permutation code set generator (Patent No.: ZL 2016 1 0051144.9, patent right obtained on Jan. 26, 2019)". Here, the above disclosure is described again in different ways, and the description is easier to understand and clearer for operation.

2) When n is not a prime number, $L=\{al_1|a\in Z_{n-1}$; GCD (a,n)=1; $l_1=[12 \ldots n]\in S_n\}$ is a fixed-point subgroup of $S_n$, and $P_n$ is calculated as follows.

$$P_n = \{(t_{nr})^{n-1}L_n\} = \{(t_{rn})^{n-1}\{al_1|a \in \varphi\}; l_1 = [12 \ldots n] \in S_n\}\} = \{(t_{nr})^{n-1}l_1\},$$
$$\ldots, \{(t_{nr})^{n-1}l_a\}, \ldots, \{(t_{nr})^{n-1}l_{\varphi(n)}\}\}$$

Or $$P_n = \{(t_{l1})^{n-1}L_n\} = \{(t_{l1})^{n-1}\{al_1|a \in \varphi\}; l_1 = [12 \ldots n] \in S_n\}\} = \{(t_{l1})^{n-1}l_1\},$$
$$\ldots, \{(t_{l1})^{n-1}l_a\}, \ldots, \{(t_{l1})^{n-1}l_{\varphi(n)}\}\}$$

$P_n$ is a (n,n·φ(n),n−$\delta$) permutation group code, wherein $\delta$ is the maximum fixed-points in all permutation vectors of $L_n$, and $\delta$ can be used to determine the minimum Hamming distance $d_{L_n}$ of $L_n$, and the minimum Hamming distance of $P_n$ is the same as the minimum Hamming distance of $L_n$. Therefore, $d_{P_n}=d_{L_n}=n-\delta$ is incorporated.

Example 2

Set n=8 as a power of 2, not a prime number. The value of a in $a\in Z_{n-1}=Z_7=\{1,2,3,4,5,6,7\}$ which has no common factor with n=8 can be taken from $\{\varphi\}=\{1,3,5,7\}'$ $\varphi(n)=\varphi(8)=4'$ $|\{\varphi\}|=\varphi(8)=|L_8|=4$. First of all, $L_8$ is calculated.

$L_8$ $\{al_1|a\in Z_{n-1}; GCD(a,n); l_1=[12 \ldots n]\}=\{al_1|a\in\{1,3,5,7\}; l_1=$
$=\{l_1, l_3, l_5, l_7\}=\{[12345678], [36147258], [52741638], [76543218]\}$ It can be verified that the three vectors in the set $\{al_1|a\in\{2,4,6\}; l_1=[12345678]\}=\{l_2, l_4, l_6\}=\{[24682468], [48484848], [64286428]\}$ are all constituted by positive numbers, but none of them is permutation vector. The cycle-left-shifted composition function $(t_{l1})^{n-1}$ can be used to act on $L_8$ to generate $P_8$.

$$P_8 = \{(t_{l1})^7 L_8\} = \{(t_{l1})^7 l_1, (t_{l1})^7 l_3, (t_{l1})^7 l_5, (t_{l1})^7 l_7\} =$$
$$\{(t_{l1})^7[12345678], (t_{l1})^7[36147258], (t_{l1})^7[52741638],$$

$$(t_{l1})^7[76543218]\} = \begin{Bmatrix} 12345678, & 36147258, & 52741638, & 76543218, \\ 23456781, & 61472583, & 27416385, & 65432187 \\ 34567812, & 14725836, & 74163852, & 54321876 \\ 45678123, & 47258361, & 41638527, & 43218765 \\ 56781234, & 72583614, & 16385274, & 32187654 \\ 67812345, & 25836147, & 63852741, & 21876543 \\ 78123456, & 58361472, & 38527416, & 18765432 \\ 81234567, & 83614725, & 85274163, & 87654321 \end{Bmatrix}$$

(5)

In digital communication systems, since binary sequences are used to control the emission of signal points in the constellation diagram, which requires the size of the constellation diagram to be a power of 2, and the size of the permutation group code $P_n$ is not necessarily a power of 2, so the permutation array code $\Gamma_n$ needs to be incorporated.

The limiting condition for constructing permutation array code $\Gamma_n$ is: i) $\Gamma_n$ must be a subset of $P_n$, so $|\Gamma_n|\leq|P_n|$ is incorporated; ii) $\Gamma_n$ must have a coset structure similar to $P_n$, and be able to use the reduced order functions $(t_{l1})^Q$ and $(t_{rn})^Q$ of the cycle-shifted bit composition function $(t_{l1})^{n-1}$ and $(t_{rn})^{n-1}$ to act on $L_n$, wherein $Q\leq n-1$, and the value of $Q$ must be a power of 2 minus 1; iii) since the size of the permutation array constellation diagram is a power of 2, this requires that the size of the permutation array code $\Gamma_n$ must be a power of 2, wherein the number of cosets in $\Gamma_n$ is also a power of 2, and the number of codewords in each coset is also a power of 2; iv) under the condition that $|\Gamma_n|$ is a power of 2, $\Gamma_n$ should be as large as possible to obtain a larger data rate.

According to the above limiting conditions of the permutation array code $\Gamma_n$ set in the disclosure, a design criterion for $\Gamma_n$ can be determined as follows: For $\Gamma_n=\{(t_{l1})^Q L_n\}\subset P_n$ or $\Gamma_n=\{(t_{rn})^Q L_n\}\subset P_n$, the size $|L_n|$ of $L_n$ is preferably a power of 2, as set in the above condition iii).

In the limiting condition i) of permutation array code $\Gamma_n$, $|\Gamma_n|\leq|P_n|$, which implies that codewords need to be discarded when obtaining $\Gamma_n$ from $P_n$, and the above design criterion ensures that, when $\Gamma_n$ is obtained from $P_n$, none of coset in $P_n$ should be discarded. Therefore, this design criterion ensures that the number of cosets of $\Gamma_n$ is equal to the number of cosets of $P_n$, and both need to be a power of 2, which also ensures that $|\Gamma_n|$ is as large as possible, so as to obtain the most codewords from $P_n$ to reach the maximum data rate, therefore, $\Gamma_n$ is the optimal permutation array code.

$P_n=\{(t_{rn})^{n-1}L_n\}=\{(t_{l1})^{n-1}L_n\}$ is the permutation group, but $\Gamma_n=\{(t_{rn})^Q L_n\}=\{(t_{rn})^Q l_1, (t_{rn})^Q l_2, \ldots, (t_{rn})^Q l_{n-1}\}$ or $\Gamma_n=\{(t_{l1})^Q L_n\}=\{(t_{l1})^Q l_1, (t_{l1})^Q l_2, \ldots, (t_{l1})^Q l_{n-1}\}$ is no longer the permutation group because there is $Q=2^p-1\leq n-1$ from $P_n$ to $\Gamma_n$. In other words, at least $n-2^Q$ codewords must be deleted from each coset of $P_n$ to form $\Gamma_n$. The deletion of these codewords from $P_n$ destroys the group structure of $\Gamma_n$, making it not satisfy the four axioms of the group, that is, some codewords in $\Gamma_n$ do not have inverses, and not all codewords satisfy the associative law. Therefore, $\Gamma_n$ is called permutation array code. Additionally, each subset $\{(t_{l1})^Q l_a\}$ in $\Gamma_n=\{(t_{l1})^Q L_n\}=\{(t_{l1})^Q l_1, (t_{l1})^Q l_2, \ldots, (t_{l1})^Q l_{n-1}\}$ is still a coset, but is no longer the orbit of the permutation codeword of the coset leader, because every orbit in original $P_n$ can migrate from the last orbit back to the orbit leader permutation, and every coset in $\Gamma_n$ no longer has orbit characteristics. It is set that the binary sequence to be transmitted is decomposed into segments of length k, then the size of the permutation array code is $|\Gamma_n|=2^k$.

Table 1 shows the generating expression and related parameters of the permutation array codes. The disclosure seeks to protect 9 permutation array codes.

In the expression, n is the code length, and the code length of the permutation array code sought to be protected is n=4, 5, 8, 15, 16, 17, 32, 51, 64, refer to the first column of Table 1.

The length of the binary message sequence carried by the 9 permutation array codes is k=3, 4, 5, 6, 7, 8, 9, 10, 11 bits, as shown in the second column of Table 1.

The number of cosets contained in these 9 permutation array codes are $|L_n|=2^{k_1}=2, 4, 4, 8, 8, 16, 16, 32, 32$, see column 6 of Table 1. The cosets are indexed by $k_1$-bit binary numbers. Parameters $k_1=1, 2, 2, 3, 3, 4, 4, 5, 5$ respectively give the bit length of the binary index of $2^{k_1}$ cosets of 9 permutation array codes. The maximum number of codewords selected in each coset of the 9 permutation array codes is $r=2^{k_2}$. The corresponding parameter $k_2=2, 2, 3, 3, 4, 4, 5, 5, 6$ respectively gives the bit length of the codeword binary index selected in each coset of the 9 permutation array codes. Here it is required that $k=k_1+k_2$.

The size of the 9 permutation array codes is $|\Gamma_n|=2^k=8, 16, 32, 64, 128, 256, 512, 1024, 2048$, see the fifth column of Table 1.

Among all the codewords of the 9 permutation array codes, the corresponding maximum fixed-points are $\delta=2, 1, 4, 5, 8, 1, 16, 17, 32$, as shown in the second last column of Table 1.

The minimum Hamming distances of the 9 permutation array codes are $d_{\Gamma_n}=d_{P_n}=d_{L_n}=2, 4, 4, 10, 8, 16, 16, 34, 32$, see the last column of Table 1.

The expression for generating 9 permutation array codes is $\Gamma_4=\{(t_{l1})^3 L_4\}=\{(t_{l1})^3\{al_1\}|a\in\{1,3\}; l_1=[x_1 x_2 x_3 x_4]\}$ $\Gamma_5=\{(t_{l1})^3 L_5\}=\{(t_{l1})^3\{al_1\}|a\in\{1,2,3,4\}; l_1=[x_1 x_2 x_3 x_4 x_5]\}$ $\Gamma_8=\{(t_{l1})^7 L_8\}=\{(t_{l1})^7\{al_1\}|a\in\{1,3,5,7\}; l_1=[x_1 x_2 \ldots x_7 x_8]\}$ $\Gamma_{15}=\{(t_{l1})^7 L_{15}\}=\{(t_{l1})^7\{al_1\}|a\in\{1,2,4,7,8,11,13,14\}; l_1=[x_1 x_2 \ldots x_{14} x_{15}]\}$ $\Gamma_{16}=\{(t_{l1})^{15} L_{16}\}=\{(t_{l1})^{15}\{al_1\}|a\in\{1,3,5,7,9,11,13,15\}; l_1=[x_1 x_2 \ldots x_{15} x_{16}]\}$ $\Gamma_{17}=\{(t_{l1})^{15} L_{17}\}=\{(t_{l1})^{15}\{al_1\}|a\in\{1,2,\ldots,15\}; l_1=[x_1 x_2 \ldots x_{16} x_{17}]\}$ $\Gamma_{32}=\{(t_{l1})^{31} L_{32}\}=\{(t_{l1})^{31}\{al_1\}|a\in\{1,3,5,7,\ldots,29,31\}; l_1=[x_1 x_2 \ldots x_{31} x_{32}]\}$ $\Gamma_{51}=\{(t_{l1})^{31}L_{51}\}=\{(t_{l1})^{31}\{al_1\}|a\in\{$Remove multiples of 3 and multiples of 17 from natural numbers from $i$ to 51$\}; l_1=[x_1x_2\ldots x_{50}x_{51}]\}$ $\Gamma_{64}=\{(t_{l1})^{63}L_{64}\}=\{(t_{l1})^{63}\{al_1\}|a\in\{$All odd numbers from 1 to 64$\}; l_1\,[x_1x_2\ldots x_{63}x_{64}]\}\}$ Specifically, in order to make each codeword well represented when the codeword length n>9, the unit vector $l_1=[123\ldots n]$ of each permutation array code is expressed as $l_1=[x_1x_2x_3\ldots x_n]$, that is, the subscript value of each element in the vector is used to represent the permutation codeword of the long code.

From $P_n$ to $\Gamma_n$, the number of discarded codewords for 9 permutation array codes is described as follows: codeword is not discarded from $\Gamma_4$, $\Gamma_8$, $\Gamma_{16}$, $\Gamma_{32}$, $\Gamma_{64}$, four codewords are discarded from $P_5$ to $\Gamma_5$, 56 codewords are discarded from $P_{15}$ to $\Gamma_{15}$, 16 codewords are discarded from $P_{17}$ to $\Gamma_{17}$, 608 codewords are discarded from $P_{51}$ to $\Gamma_{51}$, see the last third column in Table 1.

$$\left\{s_m(t)|m=1,2,\ldots,2^k;\right.$$

$$s_m(t)=g(t)\left[\cos\left(\omega_c t_1+\frac{2\pi}{n}v_1\right)\cos\left(\omega_c t_2+\frac{2\pi}{n}v_2\right)\ldots\cos\left(\omega_c t_n+\frac{2\pi}{n}v_n\right)\right];$$

$$\left.[v_1v_2\ldots v_n]\in\Gamma_n\right\}$$

constituted by $2^k$ signal points $s_m(t)$, which is a constellation diagram constituted by $2^k$ "phase signals sequentially controlled by n time chips".

3) The n-dimensional $2^k$-order time-frequency dual-domain modulation signal permutation array constellation diagram is a set $\{s_m(t)|m=1, 2, \ldots, 2^k;\ s_m(t)=g(t)[(\cos 2\pi f_{w_1}t_1)(\cos 2\pi f_{w_2}t_2)\ldots(\cos 2\pi f_{w_n}t_n)];\ [w_1w_2\ldots w_n]\in\Gamma_n\}$ constituted by signal points $s_m(t)$, which is a constellation diagram constituted by $2^k$ "frequency signals sequentially controlled by n time chips".

TABLE 1

Permutation array code $\Gamma_n$ generating method and related parameters

| n | k | $k_1$ | $k_2$ | $|\Gamma_n|$ | $|L_n|$ | $\alpha\in\{\varphi\}$ | Permutation array code $\Gamma_n$ | $|P_n|$ | Fixed points $\delta$ | Minimum Hamming Distance $n-\delta$ |
|---|---|---|---|---|---|---|---|---|---|---|
| 4 | 3 | 1 | 2 | 8 | 2 | $\alpha\in\{1,3\}$ | $\Gamma_4=\{(t_{l1})^3\{al_1\}\}$ | $|P_4|=|\Gamma_4|$ | 2 | 2 |
| 5 | 4 | 2 | 2 | 16 | 4 | $\alpha\in\{1,2,3,4\}$ | $\Gamma_5=\{(t_{l1})^3\{al_1\}\}$ | $|P_5|=|\Gamma_5|+4$ | 1 | 4 |
| 8 | 5 | 2 | 3 | 32 | 4 | $\alpha\in\{1,3,5,7\}$ | $\Gamma_8=\{(t_{l1})^7\{al_1\}\}$ | $|P_8|=|\Gamma_8|$ | 4 | 4 |
| 15 | 6 | 3 | 3 | 64 | 8 | $\alpha\in\{1,2,4,7,8,11,13,14\}$ | $\Gamma_{15}=\{(t_{l1})^7\{al_1\}\}$ | $|P_{15}|=|\Gamma_{15}|+56$ | 5 | 10 |
| 16 | 7 | 3 | 4 | 128 | 8 | $\alpha\in\{1,3,5,7,9,11,13,15\}$ | $\Gamma_{16}=\{(t_{l1})^{15}\{al_1\}\}$ | $|P_{16}|=|\Gamma_{16}|$ | 8 | 8 |
| 17 | 8 | 4 | 4 | 256 | 16 | $\alpha\in\{\{1,2,3,4,5,6,7,8,9,10,11,12,13,14,15\}$ | $\Gamma_{17}=\{(t_{l1})^{15}\{al_1\}\}$ | $|P_{17}|=|\Gamma_{17}|+16$ | 1 | 16 |
| 32 | 9 | 4 | 5 | 512 | 16 | $\alpha\in\{\{1,3,5,7,9,11,13,15,17,19,21,23,25,27,29,31\}$ | $\Gamma_{32}=\{(t_{l1})^{31}\{al_1\}\}$ | $|P_{32}|=|\Gamma_{32}|$ | 16 | 16 |
| 51 | 10 | 5 | 5 | 1024 | 32 | $\alpha\in\{\{1,2,4,5,7,8,10,11,13,14,16,19,20,22,23,25,26,28,29,31,32,35,37,38,40,41,43,44,46,47,49,50\}$ | $\Gamma_{51}=\{(t_{l1})^{31}\{al_1\}\}$ | $|P_{51}|=|\Gamma_{51}|+608$ | 17 | 34 |
| 64 | 11 | 5 | 6 | 2048 | 32 | $\alpha\in\{\{1,3,5,7,9,11,13,15,17,19,21,23,25,27,29,31,33,35,37,39,41,43,45,47,49,51,53,55,57,61,63\}$ | $\Gamma_{64}=\{(t_{l1})^{63}\{al_1\}\}$ | $|P_{64}|=|\Gamma_{64}|$ | 32 | 32 |

From the n-dimensional dual-domain modulation signal model in Part 2, it can be seen that the n-dimensional vector modulating the amplitude, phase, and frequency of n carriers is derived from the permutation codewords in the permutation array code set $\Gamma_n$. Then, the six signal models $s_m(t)$ are controlled by the subscript $m=1, 2, \ldots, |\Gamma_n|$ to form signal points generated by $|\Gamma_n|=2^k$ permutation codewords. This $|\Gamma_n|$ signal points form a high-order permutation array constellation diagram of an n-dimensional dual-domain modulation signal, and represented as a set $\{s_m(t)|m=1, 2, \ldots, |\Gamma_n|;\ s_m(t)=$n-TAM, n-TPM, n-TFM, n-TAPM, n-TAFM, n-TAPFM$\}$. For these 6 permutation array constellations, the specific structure design is as follows:

1) The permutation array constellation diagram of the n-dimensional $2^k$ order time-amplitude dual-domain modulation signal is a set $\{s_m(t)|m=1, 2, \ldots, 2^k;\ s_m(t)=[u_1 u_2\ldots u_n]g(t)\cos\omega_c t;\ [u_1u_2\ldots u_n]\in\Gamma_n\}$ of $2^k$ signal points $s_m(t)$, which is a constellation diagram constituted by $2^k$ "amplitude signals sequentially controlled by n time chips".

2) The n-dimensional $2^k$ order time-phase dual-domain modulation signal permutation array constellation diagram is a set 4) The permutation array constellation diagram of the dual-domain modulation signal composed of n-dimensional $2^k$-order time-amplitude-phase joint modulation multi-domain is a set $$\left\{s_m(t)|m=1,2,\ldots,2^k; s_m(t)=g(t)\left[\right.\right.$$

$$\left(u_1\cos\left(\omega_c t_1+\frac{2\pi}{n}v_1\right)\right)\left(u_2\cos\left(\omega_c t_2+\frac{2\pi}{n}v_2\right)\right)\ldots\left(u_n\cos\left(\omega_c t_n+\frac{2\pi}{n}v_n\right)\right)\right];$$

$$\left.[u_1\ldots u_n]\in\Gamma_n^1; [v_1v_2\ldots v_n]\in\Gamma_n^2; \Gamma_n^1, \Gamma_n^2\subseteq\Gamma_n\right\}$$

constituted by $2^k$ signal points $s_m(t)$, which is a constellation diagram constituted by $2^k$ "joint modulation domain signals of amplitude and phase sequentially controlled by n time chips", wherein $\Gamma_n^1=\{(t_{l1})^{Q_1}\{al_1\}|a\in\{\varphi\};\ Q_1\ Q=2^{k_1}-1;\ l_1=[12\ldots n]\}$, $\Gamma_n^2=\{(t_{l1})^{Q_2}\{al_1\}|a\in\{\varphi\};\ Q_2\leq Q=2^{k_1}-1;\ l_1=[12\ldots n]\}$.

5) The permutation array constellation diagram of the dual-domain modulation signal composed of n-dimensional $2^k$-order time-amplitude-frequency joint modulation multi-domain is a set $\{s_m(t)|m=1, 2, \ldots, 2^k;\ s_m(t)=g(t)[(u_1\cos(2\pi f_{w_1}t_1))(u_2\cos(2\pi f_{w_2}t_2))\ldots(u_n\cos(2\pi f_{w_n}t_n))]; [u_1$ $u_2 \ldots u_n] \in \Gamma_n^1$; $[w_1 w_2 \ldots w_n] \in \Gamma_n^3$; $\Gamma_n^1, \Gamma_n^3 \subseteq \Gamma_n\}$ composed of $2^k$ signal points $s_m(t)$, which is a constellation diagram constituted by $2^k$ "variable power frequency modulation signals sequentially controlled by n time chips", wherein $\Gamma_n^1 = \{(t_{l1})^{Q_1}\{al_1\} | a \in \{\varphi\}; Q_1 \leq Q = 2^{k_1} - 1; l_1 = [12 \ldots n]\}$, $\Gamma_n^3 = \{(t_{l1})^{Q_3}\{al_1\} | a \in \{\varphi\}; Q_3 \leq Q = 2^{k_1} - 1; l_1 = [12 \ldots n]\}$.

6) The permutation array constellation diagram of the dual-domain modulation signal composed of n-dimensional $2^k$-order time-amplitude-phase-frequency joint modulation multi-domain is a set $$\left\{ s_m(t) | m = 1, 2, \ldots, 2^k; s_m(t) = g(t) \left[ \left( u_1 \cos\left(2\pi f_{w_1} + t_1 + \frac{2\pi}{n} v_1\right) \right) \right. \right.$$
$$\left. \left( u_2 \cos\left(2\pi f_{w_2} + t_2 + \frac{2\pi}{n} v_2\right) \right) \ldots \left( u_n \cos\left(2\pi f_{w_n} + t_n + \frac{2\pi}{n} v_n\right) \right) \right];$$
$$[u_1 u_2 \ldots u_n] \in \Gamma_n^1; [v_1 v_2 \ldots v_n] \in \Gamma_n^2; [w_1 w_2 \ldots w_n] \in \Gamma_n^3;$$
$$\left. \Gamma_n^1, \Gamma_n^2, \Gamma_n^3 \subseteq \Gamma_n \right\}$$

composed of $2^k$ signal points $s_m(t)$, which is a constellation diagram composed of $2^k$ "variable power phase modulation-frequency modulation joint modulation domain signal sequentially controlled by n time chips", wherein $\Gamma_n^1 = \{(t_{l1})^{Q_1}\{al_1\} | a \in \{\varphi\}; Q_1 \leq Q = 2^{k_1} - 1; l_1 = [12 \ldots n]\}$, $\Gamma_n^2 = \{(t_{l1})^{Q_2}\{al_1\} | a \in \{\varphi\}; Q_2 \leq Q = 2^{k_1} - 1; l_1 = [12 \ldots n]\}$, $\Gamma_n^3 = \{(t_{l1})^{Q_3}\{al_1\} | a \in \{\varphi\}; Q_3 \leq Q = 2^{k_1} - 1; l_1 = [12 \ldots n]\}$.

Figure 10:
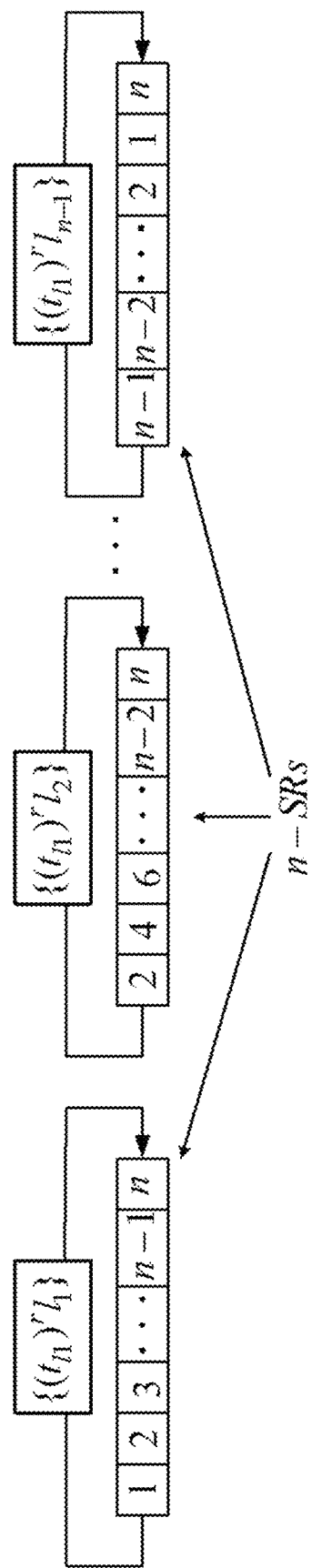
FIG. 10 shows the method of using n-dimensional cycle-shift register (n-SR) to generate permutation array code $\Gamma_n$. The n−1 permutation codewords $l_1, l_2, \ldots, l_{n-1}$ in the coset first set Ln are respectively stored into n-SRs in n−1, so that the cycle-left-shifted composite function $(t_{/1})^r$ acts on each shift register for r times.

Permutation array code $\Gamma_n = \{(t_{l1})^Q\{al_1\}\}$ and its subset $\Gamma_n^1 = \{(t_{l1})^{Q_1}\{al_1\}\}$, $\Gamma_n^2 = \{(t_{l1})^{Q_2}\{al_1\}\}$ and $\Gamma_n^3 = \{(t_{l1})^{Q_3}\{al_1\}\}$ both can be generated by the shift register array in FIG. 10. The number of shift registers n-SR is determined through the value of parameter $a \in \{\varphi\}$, and the number of cycle-shifts of $|\{\varphi\}| = |L_n|$ n-SRs is determined through the design of the parameters Q, $Q_1$, $Q_2$ and $Q_3$.

It is worth noting that the permutation array constellation diagrams of the 6 kinds of n-dimensional $2^k$-order dual-domain modulation signals constructed above is described and exhibited in a different form as compared with conventional or currently adopted constellation diagrams of the 2-dimensional $2^k$-order modulation signals. For example, the commonly adopted QAM constellation diagram is defined as a two-dimensional plane quadrature amplitude phase modulation constellation diagram. Because QAM constellation diagram is two-dimensional, the points on the two-dimensional plane can be adopted to represent the signal points. The discrete dots on the plane represent the signal constellation diagram. The permutation array code is a hyperball code of equal power, which means that the n-dimensional $2^k$-order dual-domain modulation signal of the hyperball code based on the permutation array code cannot visually display the geometric shape of the signal point in the 2-dimensional plane and the 3-dimensional space. Therefore, the permutation array constellation diagram of the n-dimensional $2^k$-order dual-domain modulation signal can only be described by the above-mentioned calculation expression at present. It should be emphasized that the permutation array constellation diagrams of the above-mentioned 6 kinds of n-dimensional $2^k$-order dual-domain modulation signals are represented by mathematical symbols and operation expressions formed by them, but it neither belongs to any mathematical category, nor is it universal or natural mathematical tools and laws of nature. All signal expressions and constellation diagram expressions are constructed by the inventor by borrowing mathematical symbols.

What is claimed is:

1. A time-frequency division multiple access (TFDMA) random self-organizing ad hoc network construction method, comprising:
dividing spectrum resources of full frequency domain and full time domain resources in 24 hours a day occupied by a network system, wherein first, the divided frequency domain and time domain units are constructed into a period-frequency slot epoch-ring net, and then N period-frequency slot epoch-ring nets are stacked into a cylindrical web according to a time slot alignment principle, and finally U cylindrical webs are formed into the time-frequency division multiple access random self-organizing ad hoc network that covers the full frequency domain and the full time domain, the specific steps of network construction are as follows:
the full frequency domain resources are a total frequency spectrum allocated to the TFDMA ad hoc network, W is set to represent a bandwidth of the total frequency spectrum, and the total frequency spectrum of the network system with bandwidth W is divided into N sub-channels, $\Delta f$ is set to represent a bandwidth of each sub-channel, $\Delta f = f_i - f_{i-1}$, $i = 1, 2, \ldots, N$, then, the TFDMA ad hoc network comprises N hopping points $f_i$ or N sub-channels center frequency $f_{ci} = f_c + i \cdot \Delta f$, $N = W/\Delta f$, wherein $\Delta f$ is called a frequency slot or a frequency chip, and a first center frequency is $f_c = f_0 = f_{c0}$;
the full-time domain resources in 24 hours a day is divided as follows, 24 hours are divided into U epochs, each epoch determines one cylindrical web, thereby determining the minimum loop time of one TFDMA ad hoc network; one epoch is divided into V time frames, each of the time frames is a basic time unit of a time division multiple access mode, one time frame is divided into S time slots, and each of the time slots is a basic time unit of the TFDMA ad hoc network which one user terminal can assess, one time slot is divided into E time chips, each of the time chips is time occupied by a pulse symbol packet with a definite or adjustable duty cycle, which is also a duration of a symbol in a codeword in a permutation group code,
the period-frequency slot epoch-ring net, referred to as an epoch-ring net or a subnet, is determined by a period of the U epochs combined with a frequency slot $\Delta f$, specifically, a last time slot of $V \cdot S$ time slots in an epoch is connected to a first time slot to form a period-frequency slot epoch-ring net formed by the $V \cdot S$ time slots and the frequency slot $\Delta f$, which is also called a time slot-frequency slot epoch-ring net, or epoch-ring net for short, the network system comprises a total of N epoch-ring nets that can operate independently, each epoch-ring net is allocated a determined frequency hopping point or a center frequency of a sub-channel;
the cylindrical web is formed by stacking the N independently operable epoch-ring nets into a cylindrical web in a manner that time slots are aligned; when each corresponding time slot of the N epoch-ring nets is aligned, the web contains $V \cdot S$ time slices, and each of the time slices is composed of a time slot and N frequency slots;
the TFDMA ad hoc network is composed of U cylindrical webs, that is, one web is repeatedly used for U times, thereby forming a time-frequency division multiple access self-organizing network covering the full frequency domain and the full time domain.

2. The TFDMA random self-organizing ad hoc network construction method according to claim 1, wherein a method for multiple users to access the TFDMA random self-organizing ad hoc network comprises:

method 1: N users respectively access to N independent epoch-ring nets, operating in frequency division multiple access and time division multiplexing modes, that is, the N users use different N frequencies to multiplex the same time slot, enabling N robot terminals to operate simultaneously by accessing the N independent epoch-ring nets simultaneously in a time slot;

method 2: S users access an epoch-ring net within a time frame, accessing a network in a mode of time division multiple accessing and multiplexing the same frequency;

method 3: S·N users access N independent epoch-ring nets or access a web within a time frame, wherein in each of the N epoch-ring nets, there are S users accessing the network in a mode of time division multiple accessing and multiplexing the same frequency; within a duration of one time frame of the web, in each of the S time slices, there are N users accessing the network in a mode of frequency division multiple accessing and multiplexing the same time slot;

method 4: a user accessing an epoch-ring net will occupy a time-frequency slot, namely T·Δf, wherein T represents a duration of a time slot, T=E·Δt; a user in the epoch-ring net can use V time slots from V different time frames, and can also use V time slots from V different time frames in the next epoch, and the same is continued in the next epoch, therefore, a user can use up to V·U time slots in 24 hours;

method 5: in the same time frame of the N epoch-ring nets, the maximum number of users is N·S; one epoch-ring net contains V TDMA-time frames, and the maximum number of users accommodated is S·V; the maximum number of users accommodated in the one web is N·S·V;

thereby forming the TFDMA ad hoc network covering the full frequency domain and the full time domain.

3. The TFDMA random self-organizing ad hoc network construction method according to claim 1, wherein a transceiver terminal that can access the network should be equipped with an n-dimensional dual-domain modulation signal with time-frequency division multiple access characteristics; a construction method of the n-dimensional dual-domain modulation signal is to use an n×n permutation matrix to form a signal pattern, the permutation matrix is taken from the codeword of the permutation group code, a row index and a column index of the permutation matrix are respectively adopted to establish an index of a domain chip or a domain slot of a modulation multi-domain and a time index of a time domain, which makes the modulation multi-domain and the time domain to work together to form the n-dimensional dual-domain modulation signal, n-dimensional dual-domain modulation signal pattern, which is also called a signal point, and the construction method is as follows:

the n-dimensional dual-domain modulation signal is modeled by the permutation matrix, a row index 1, 2, . . . , n of the permutation matrix is used to determine a specific value of a continuous modulation multi-domain on a vertical axis from bottom to top, $d_i$ is set to represent the i-th value among n values of the modulation multi-domain, and gives an index of values, i=0, 1, 2, . . . , n, $d_0$=0 represents a starting value 0 of the modulation multi-domain, a multi-domain modulation refers to amplitude modulation domain, phase modulation domain, frequency modulation domain, pulse position modulation domain, polarization modulation domain, spatial modulation domain, and effective combinations of these modulation domains, such as joint multi-domain modulation of amplitude domain and phase domain, $\Delta d_b = d_i - d_{i-1}$ is set to represent a value chip or a value slot of the modulation multi-domain, which means in a domain of the modulation multi-domain, a difference between two adjacent values among n values $d_1, d_2, \ldots$, do arranged from small to large, or the smallest difference between any two of the n modulation domain values, b=1, 2, . . . , n, giving an index of, $\Delta d_b$, the value chip or the value slot of the modulation multi-domain;

a column index 1, 2, . . . , n of the permutation matrix is processed from left to right into n moments in a continuous time domain on a horizontal axis, expressed as $t_i$, which refers to the i-th moment of the n moments in the time domain, and gives an index of continuous moments, i=0, 1, 2, . . . , n, $t_0$=0 represents a starting moment 0 of the time domain; one domain of the dual-domain modulation signal is a modulation multi-domain determined by the row index of the permutation matrix, and the other domain is a time domain determined by the column index of the permutation matrix; a difference between two adjacent moments of the n moments in the time domain is defined as a time chip, wherein the n moments correspond to n time chips, and a duration of each time chip is $T_c = \Delta t_b = t_i - t_{i-1}$, b=1, 2, . . . , n gives a time chip index; $T_c = \Delta t_b$ is also a duration of one symbol in a permutation codeword; then $T_w = nT_c$ is a duration of a codeword and a duration of an n-dimensional dual-domain modulation signal;

n domain chips $\Delta d_b$ of the modulation multi-domain and the n time chips $\Delta t_b$ of the time domain define a n-dimensional dual-domain modulation signal model composed of the modulation multi-domain and the time domain, wherein b=1, 2, . . . , n; in a time interval of the n time chips $\Delta t_b$ corresponding to n elements "1" in the permutation matrix, n carriers modulated by n values of a permutation vector are transmitted respectively in each time chip $\Delta t_b$, in the permutation matrix, no signal is emitted at a position where each element "0" is located; in n-dimensional time-domain and n-dimensional modulation-domain signal patterns, a position where an element "1" is located in the permutation matrix is replaced by a modulation carrier signal formed by the modulation domain chip $\Delta d_b$ and the time chip $\Delta t_b$, and expressed as a square color block; in the position where the element "0" is located in the permutation matrix is replaced by an unfilled square.

4. The TFDMA random self-organizing ad hoc network construction method according to claim 3, wherein the n-dimensional dual-domain modulation signal is specifically as follows: one domain of the dual-domain modulation refers to the time domain, and the other is the modulation multi-domain, which is determined as the amplitude modulation domain, the phase modulation domain, and the frequency modulation domain of a carrier, and the n-dimensional dual-domain modulation signal is a signal model composed of the time domain and the modulation multi-domain (mainly refers to the multi-domain of amplitude domain, phase domain, frequency domain, or a combination of two of the above or a combination of the three), a general expression structure of the signal model is as follows:

a symbol $X_m(a; l_1; (t_{l1})^q)$ representing any permutation codeword in $P_n$ is constructed, wherein $X \in \{A, P, F\}$, A represents an amplitude, P represents a phase, and F represents a frequency, the subscript m of $X_m$ gives an index or number of the number of signals in a n-dimensional dual-domain modulation signal set, a value of m is determined by a coset number a and a shifted bit number q, that is, m=f(a,q);

when $X_m=A_m$, a permutation codeword $A_m(a; l_1; (t_{l1})^q)$ is a n-dimensional permutation vector for modulating a carrier amplitude; when $X_m=P_m$, a permutation codeword $P_m(a; l_1; (t_{l1})^q)$ is a n-dimensional permutation vector for modulating a carrier phase; when $X_m=F_m$, a permutation codeword $F_m(a; l_1; (t_{l1})^q)$ is a n-dimensional permutation vector for modulating a carrier frequency;

the three symbols in parentheses, (a; $l_1$; $(t_{l1})^q$), giving three elements that generate this permutation codeword, these three elements can form an expression $X_m(a; l_1; (t_{l1}))=(t_{l1})^q(a \cdot l_1)$ which calculates a designated permutation codeword when a and q are determined; the meaning of these three symbols is as follows: a is an index of a permutation codeword in a coset leader set $L_n$, as well as a number of a coset, a value range of a is 1≤a≤n−1, when n is a prime number, a is taken from the maximum value a=|$L_n$|=n−1, when n is not the prime number, a value of a is mutually exclusive with any n>1, that is, all values of a should satisfy GCD(a, n)=1 (a greatest common factor between a and n is 1), under the circumstances, all the values of a are less than n−1; $l_1$ is a unit permutation codeword, $l_1$=[12 . . . n]; $(t_{l1})^Q$ is set to denote a reduced-order function of cycle-left-shifted composition function $(t_{l1})^{n-1}$, wherein Q is the maximum value of the index q of a cycle-shifted bit number, the reason for order reduction is that digital communication requires Q must be a power of 2, and a value of q is 1≤q≤Q≤n−1, so that Q makes $(t_{l1})^Q$ act on the coset leader set $L_n$={a·$l_1$}, thereby generating a permutation array code $\Gamma_n$={$(t_{l1})^Q L_n$}={$(t_{l1})^Q${a$l_1$}}, when specific values of q and a are provided, it is possible to accurately calculate an index or number of a corresponding codeword in the permutation array code $\Gamma_n$, m=(a−1)(Q+1)+q; a n-dimensional vector used for the amplitude, phase, and frequency modulation of the carrier must be a permutation codeword in the permutation array constellation $\Gamma_n$={$(t_{l1})^Q L_n$} ⊂ $P_n$;

the symbol $X_m(a; l_1; (t_{l1})^q)$ of the any permutation codeword and the cycle-left-shifted operator $t_{l1}$ in the generated permutation array code $\Gamma_n$={$(t_{l1})^Q L_n$}={$(t_{l1})^Q${a$l_1$}} may also be replaced by a cycle-right-shifted operator $t_{r1}$, and the permutation applies to other parts of the disclosure, a vector u=$A_m(a; l_1; (t_{l1}))$=[$u_1 u_2$ . . . $u_n$]∈$\Gamma_n^1$ ⊂ $P_n$ represents an amplitude modulation permutation codeword, $\Gamma_n^1$={$(t_{l1})^{Q_1} L_n$}={$(t_{l1})^{Q_1}${a$l_1$}} is a permutation array constellation diagram for amplitude modulation; v=$P_m$(a; $l_1$; $(t_{l1})^{q_2}$)=[$v_1 v_2$ . . . $v_n$]∈$\Gamma_n^2$ ⊂ $P_n$ represents a phase modulation permutation codeword, $\Gamma_n^2$={$(t_{l1})^{Q_2} L_n$}={$(t_{l1})^{Q_2}${a$l_1$}} is a permutation array constellation diagram used for phase modulation; w=$F_m(a; l_1; (t_{l1})^{q_3})$=[$w_1 w_2$ . . . $w_n$]∈$\Gamma_n^3$ ⊂ $P_n$ represents a frequency modulation permutation codeword, r={$(t_{l1})^{Q_3} L_n$}={$(t_{l1})^{Q_3}${a$l_1$}} is a permutation array constellation diagram for frequency modulation; $\Gamma_n^1$, $\Gamma_n^2$, $\Gamma_n^3$ are all subsets of the permutation group code $P_n$, and their sizes are all powers of 2, they can be the same or different; this difference is expressed as: permutation codewords included in the subsets are different and the sizes are different; 1≤$q_1$≤$Q_1$, 1≤$q_2$≤$Q_2$, 1≤$q_3$≤$Q_3$, $Q_1$, $Q_2$, $Q_3$≤n−1, they can be different values or the same value, a general model of the n-dimensional dual-domain modulation signal is to simultaneously modulate the amplitude of the carrier wave with the permutation codeword $A_m(a; l_1; (t_{l1})^{q_1})$, the phase of the carrier with the permutation codeword $P_m(a; l_1; (t_{l1})^{q_2})$, and the frequency of the carrier with the permutation vector $F_m(a; l_1; (t_{l1})^{q_3})$, a general expression of the n-dimensional dual-domain modulation signal model is as follows:

$$s_m(t) = \text{Re}\left[A_m(a; l_1; (t_{l1})^{q_1})g(t)e^{\frac{j2\pi f}{F_m(a;l_1;(t_{l1})^{q_3})}t + P_m(a;l_1;(t_{l1})^{q_2})\frac{2\pi}{n}}\right] =$$

$$\text{Re}\left[[u_1 u_2 \ldots u_n]g(t)e^{j2\pi f[w_1 w_2 \ldots w_n]t + [v_1 v_2 \ldots v_n]\frac{2\pi}{n}}\right].$$

5. The TFDMA random self-organizing ad hoc network construction method according to claim 3, wherein the n-dimensional dual-domain modulation signal is specifically: the "dual domain" of the n-dimensional dual-domain modulation signal refers to: one domain is the time domain, and the other domain is a modulation single domain or a joint domain of multiple domains, wherein the modulation single domain refers to the amplitude modulation domain, the phase modulation domain, and the frequency modulation domain, the modulation multi-domain refers to the two-by-two combination of the three modulation domains or even a combination of the three modulation domains, which specifically constitutes the expressions and the signal patterns of six types of n-dimensional dual-domain modulation signal models:

model 1: it is set that a n-dimensional modulation domain is the carrier amplitude, $d_i$=$A_i$, a row index 1, 2, . . . , n of the permutation matrix is used to determine a amplitude value $A_1, A_2, \ldots, A_n$ from bottom to top, wherein i=0, 1, 2, . . . , n is an index of the amplitude value, a starting value of the amplitude value is $A_0$=0, a difference between two adjacent amplitude values constitutes an amplitude chip or the amplitude slot, $\Delta d_b$=$d_i$−$d_{i-1}$=$\Delta A_b$=$A_i$−$A_{i-1}$, b,i=1, 2, . . . , n is an index of the amplitude chip or the amplitude slot, that is to use an n×n permutation matrix to construct a dual-domain modulation signal model with n-dimensional time domain and n-dimensional amplitude domain, abbreviated as n-dimensional time amplitude modulation signal (n-TAM); the i-th element "1" from left to right in the permutation matrix is replaced by the amplitude value $A_i$ corresponding to the b-th time chip $\Delta t_b$, $A_i$ is a symbol value in the permutation codeword $A_m$(a; $l_1$; $(t_{l1})^{q_1}$)=$(t_{l1})^{q_1}$(a$l_1$)=[$u_1 u_2 \ldots u_n$], for each determined $q_1$ and a, $A_i$=$u_i$(i=1, 2, . . . , n) is obtained; if, a k-bit binary message sequence selects a codeword [$u_1 u_2 \ldots u_n$] in the permutation array code $\Gamma_n^1$={$(t_{l1})^{Q_1}${a$l_1$}}, $Q_1$≤n−1, 1≤$q_1$≤$Q_1$, a≤|$L_n$|, then the carrier's n-dimensional time amplitude modulation signal n-TAM will carry k bits of binary message, the following mathematical expression can be modeled, comprising an overlay signal model and a real signal model:

$$s_m(t) = \text{Re}\left[A_m(a; l_1; (t_{l1})^{q_1})g(t)e^{j2\pi f_c t}\right]$$
$$= \text{Re}[A_m(a; l_1; (t_{l1})^{q_1})g(t)(\cos\omega_c t + j\sin\omega_c t]$$
$$= A_m(a; l_1; (t_{l1})^{q_1})g(t)\cos\omega_c t =$$
$$= [(u_1 g(t)\cos\omega_c t)(u_2 g(t)\cos\omega_c t) \ldots (u_n g(t)\cos\omega_c t)]$$
$$= [u_1 u_2 \ldots u_n]g(t)\cos\omega_c t$$

$$0 \leq t \leq T_w, 0 \leq t_1, t_2, t_n \leq T_c, m = 1, 2, \ldots, |\Gamma_n^1|$$

a n-dimensional time-amplitude modulation signal pattern n-TAP is a plane pattern composed of $n^2$ squares, an abscissa of this pattern is the time chip $\Delta t_b = t_i - t_{i-1}$ sequence $\Delta t_1, \Delta t_2, \ldots, \Delta t_b, \ldots, \Delta t_n$, an ordinate is the amplitude chip or the amplitude slot $\Delta d_b = \Delta A_b = A_i - A_{i-1} = 1$ sequence $\Delta A_1, \Delta A_2, \ldots, \Delta A_b, \ldots, \Delta A_n$, each square is a product $\Delta A_b \cdot \Delta t_b$ of $\Delta A_b$ and $\Delta t_b$, b=1, 2, ..., n; in the permutation codeword $u = A_m(a; l_1; (t_{l1})^{q_1}) = [u_1 u_2 \ldots u_n] \in \Gamma_n^1 \subset P_n$, the symbol value $A_i$ of each corresponding time chip $\Delta t_b$ replaces the i-th element "1" from left to right in the n×n permutation matrix;

model 2: it is set that the n-dimensional modulation domain is the carrier phase, $d_i = p_i$, the row index 1, 2, ..., n of the permutation matrix is used to determine a phase value $p_1, p_2, \ldots, p_n$ from bottom to top, wherein i=0, 1, 2, ..., n is the index of the phase value, a starting value of the phase value is $p_0 = 0$, a difference between two adjacent phase values constitutes an phase chip or the phase slot, $\Delta d_b = d_i - d_{i-1} = \Delta p_b = p_i - p_{i-1}$, b, i=1, 2, ..., n is an index of the phase chip or the phase slot; that is to use an n×n permutation matrix to construct a dual-domain modulation signal model with n-dimensional time domain and n-dimensional phase domain, abbreviated as n-dimensional time phase modulation signal (n-TPM); the i-th element "1" from left to right in the permutation matrix is replaced by the phase value $p_i$ corresponding to the b-th time chip $\Delta t_b$, $p_i$ is determined by a symbol value $v_i$ in the permutation codeword $v = P_m(a; l_1; (t_{l1})^{q_2}) = (t_{l1})^{q_2}(al_1) = [v_1 v_2 \ldots v_n] \in \Gamma_n^2 \subset P_n$, when $q_2$ and a are determined, the specific phase value $$p_i = \frac{2\pi}{n} \cdot v_i$$

(i=1, 2, ..., n) is obtained; if, a k-bit binary message sequence selects a codeword $[v_1 v_2 \ldots v_n]$ in the permutation array code $\Gamma_n^2 = \{(t_{l1})^{Q_2}\{al_1\}\}$, $Q_2 \leq n-1$, $1 \leq q_2 \leq Q_2$, $a \leq |L_n|$, then the carrier's n-dimensional time phase modulation signal n-TPM will carry k bits of binary message, the following mathematical expression can be modeled, comprising an overlay signal model and a real signal model:

$$s_m(t) = \text{Re}\left[g(t)e^{j\left(2\pi f_c t + \frac{2\pi}{n} P_m(a; l_1; (t_{l1})q_2)\right)}\right]$$
$$g(t) \cdot \text{Re}\left[\left(\cos\left(\omega_c t_1 + \frac{2\pi}{n}v_1\right) + j\sin\left(\omega_c t_1 + \frac{2\pi}{n}v_1\right)\right)\right.$$
$$\left(\cos\left(\omega_c t_2 + \frac{2\pi}{n}v_2\right) + j\sin\left(\omega_c t_2 + \frac{2\pi}{n}v_2\right)\right) \ldots$$
$$\left.\left(\cos\left(\omega_c t_n + \frac{2\pi}{n}v_n\right) + j\sin\left(\omega_c t_n + \frac{2\pi}{n}v_n\right)\right)\right]$$
$$= g(t)\cos\left(\omega_c t + \frac{2\pi}{n}[v_1 v_2 \ldots v_n]\right)$$
$$= g(t)\left[\cos\left(\omega_c t_1 + \frac{2\pi}{n}v_1\right)\cos\left(\omega_c t_2 + \frac{2\pi}{n}v_2\right) \ldots \cos\left(\omega_c t_n + \frac{2\pi}{n}v_n\right)\right]$$

$$0 \leq t \leq T_w, 0 \leq t_1, t_2, \ldots, t_n \leq T_c, m = 1, 2, \ldots, M$$

a n-dimensional time-phase modulation signal pattern n-TPP is a plane pattern composed of $n^2$ squares, an abscissa of this pattern is the time chip $\Delta t_b = t_i - t_{i-1}$ sequence $\Delta t_1, \Delta t_2, \ldots, \Delta t_b, \ldots, \Delta t_n$, an ordinate is the phase chip or the phase slot $\Delta d_b = \Delta p_b = p_i - p_{i-1}$ sequence $\Delta p_1, \Delta p_2, \ldots, \Delta p_b, \ldots, \Delta p_n$, each square is a product $\Delta p_b \cdot \Delta t_b$ of $\Delta p_b$ and $\Delta t_b$, b=1, 2, ..., n; in the permutation codeword $v = P_m(a; l_1; (t_{l1})^{q_2}) = (t_{l1})^{q_2}(al_1) = [v_1 v_2 \ldots v_n] \in \Gamma_n^2 \subset P_n$, the phase value $$p_i = \frac{2\pi}{n} \cdot v_i$$

determined by the symbol value $v_i$ of each corresponding time chip $\Delta t_b$ replaces the i-th element "1" from left to right in the n×n permutation matrix;

model 3: it is set that the n-dimensional modulation domain is the carrier frequency, $d_i = f_i$, the row index 1, 2, ..., n of the permutation matrix is used to determine a number $f_1, f_2, \ldots, f_n$ for n frequencies that the system assigns to a user from bottom to top, that is i=0, 1, 2, ..., n is an index of the frequency value, a starting value of the frequency value is $f_0 \neq 0$, which is a previous frequency of the smallest frequency of n frequencies assigns to a user; a difference between two adjacent frequency values constitutes an frequency chip or frequency slot, $\Delta d_b = d_i - d_{i-1} = \Delta p_b = p_i - p_{i-1}$, b, i=1, 2, ..., n is an index of the frequency chip or the frequency slot; that is to use an n×n permutation matrix to construct a dual-domain modulation signal model with n-dimensional time domain and n-dimensional frequency domain, abbreviated as n-dimensional time frequency dual-domain modulation signal (n-TFM); the i-th element "1" from left to right in the permutation matrix is replaced by the phase value $f_i$ corresponding to the b-th time chip $\Delta t_b$, the subscript number i of $f_i$ is determined by the i-th symbol value $w_i$ in the permutation codeword $w = F_m(a; l_1; (t_{l1})^{q_3}) = (t_{l1})^{q_3}(al_1) = [w_1 w_2 \ldots w_n] \in \Gamma_n^3 \subset P_n$, when $q_3$ and a are determined, the specific phase value $f_i = f_{w_i}$ (i=1, 2, ..., n) is obtained; if, a k-bit binary message sequence selects a codeword $[w_1 w_2 \ldots w_n]$ in the permutation array code $\Gamma_n^3 = \{(t_{l1})^{Q_3}\{al_1\}\}$, $Q_3 \leq n-1$, $1 \leq q_3 \leq Q_3$, $a \leq |L_n|$, then the carrier's n-dimensional time frequency modulation signal n-TFM will carry k bits of binary message, the following mathematical expression can be modeled, comprising an overlay signal model and a real signal model:

$$s_m(t) =$$

$$\text{Re}\left[g(t)e^{j\left(2\pi f_{F_m(a;l_1;(t_{l1})^{q_3})}t\right)}\right] = \text{Re}[(g(t_1)\cos(2\pi f_{w_1}t_1) + jg(t_1)\sin(2\pi f_{w_1}t_1))$$

$$(g(t_2)\cos(2\pi f_{w_2}t_2) + jg(t_2)\sin(2\pi f_{w_2}t_2))$$

$$\ldots (g(t_n)\cos(2\pi f_{w_n}t_n) + jg(t_n)\sin(2\pi f_{w_n}t_n))] =$$

$$g(t)[(\cos(2\pi f_{w_1}t_1))(\cos(2\pi f_{w_2}t_2)) \ldots (\cos(2\pi f_{w_n}t_n))]$$

$$0 \le t \le T_w, 0 \le t_1, t_2 \ldots, t_n \le T_c, m = 1, 2, \ldots, M$$

a n-dimensional time-frequency modulation signal pattern n-TFP is a plane pattern composed of $n^2$ squares, an abscissa of this pattern is the time chip $\Delta t_b = t_i - t_{i-1}$ sequence $\Delta t_1, \Delta t_2, \ldots, \Delta t_n$, an ordinate is the frequency chip or the frequency slot $\Delta d_b = \Delta f_b - f_i - f_{i-1}$ sequence $\Delta d_b = \Delta f_b - f_i - f_{i-1}$, each square is a product $\Delta f_b \cdot \Delta t_b$ of $\Delta f_b$ and $\Delta t_b$, b=1, 2, ..., n; in the permutation codeword $w = F_m(a; \; 1_1; \; (t_{l1})^{q_3}) = (t_{l1})^{q_3}(al_1) = [w_1 w_2 \; . \; . \; . \; w_n] \in \Gamma_n^3 \subset P_n$, the phase value $f_i = f_{w_i}$ determined by the symbol value $w_i$ of each corresponding time chip $\Delta t_b$ replaces the i-th element "1" from left to right in the n×n permutation matrix;

model 4: it is set that the n-dimensional modulation multi-domain is a combination of the amplitude domain and the phase domain of the carrier, $d_i = A_i$ and $d_i = p_i$, the row index 1, 2, ..., n of the permutation matrix is used to determine a combination of the amplitude values $A_1, A_2, \ldots, A_n$ and the phase values $p_i, p_2, \ldots, p_n$ from bottom to top, wherein i=0, 1, 2, ..., n is an index of the amplitude value and the frequency value after combination, which can be indexed by the amplitude value or by the phase value; the amplitude chip or the amplitude slot and the phase chip or the phase slot, $\Delta d_b = d_i - d_{i-1} = \Delta A_b - A_i - A_{i-1}$ and $\Delta d_b = d_i - d_{i-1} = \Delta p_b = p_i - p_{i-1}$, the i-th carrier is formed by the i-th amplitude value and the i-th phase value, b, i=1, 2, ..., n can be an index of the amplitude chip or the amplitude slot, or can be the index of the phase chip or the phase slot; that is to use two n×n permutation matrices to construct a dual-domain modulation signal model composed of a joint multi-domain with n-dimensional time domain and n-dimensional amplitude domain and n-dimensional phase domain, abbreviated as n-dimensional time amplitude phase modulation signal (n-TAPM); the element "1" in the two permutation matrices is replaced by the amplitude value $A_i$ and the phase value $p_i$ corresponding to the time chip $\Delta t_b$, $A_i$ is a symbol value in the permutation codeword $A_m(a; \; 1_1; \; (t_{l1})^{q_1}) = (t_{l1})^{q_1}(al_1) = [u_1 u_2 \ldots u_n]$, $p_i$ is determined by the symbol value $v_i$ in the permutation codeword $v = P_m(a; \; 1_1; \; (t_{l1})^{q_2}) = (t_{l1})^{q_2}(al_1) = [v_1 v_2 \; . \; . \; . \; v_n] \in \Gamma_n^2 \subset P_n$, when $q_1, q_2$ and a are determined, $A_i = u_i$ and $$p_i = \frac{2\pi}{n} \cdot v_i$$

can be obtained; if, a k-bit binary message sequence selects a codeword $[u_1 u_2 \ldots u_n]$ in the permutation array code $\Gamma_n^1 = \{(t_{l1})^{Q_1}\{al_1\}\}$, $Q_1 \le n-1$, $1 \le q_1 \le Q_1$, $a = |L_n|$, another k-bit binary message sequence selects a codeword $[v_1 v_2 \ldots v_n]$ in the permutation array code $\Gamma_n^2 = \{(t_{l1})^{Q_2}\{al_1\}\}$, $Q_2 \le n-1$, $1 \le q_2 \le Q_2$, $a = |L_n|$, then the signal n-TAPM based on the n-dimensional time, amplitude and phase of the carrier of the permutation matrix will carry 2 k bits of binary message, the following mathematical expression can be modeled, comprising an overlay signal model and a real signal model:

$$s_m(t) = \text{Re}\left[A_m(a; l_1; (t_{l1})^{q_1})g(t)e^{j\left(2\pi f_c t + \frac{2\pi}{n}P_m(a;l_1;(t_{l1})^{q_2})\right)}\right]$$

$$= \text{Re}\left[[u_1 u_2 \ldots u_n]g(t)\cos\left(\omega_c t + \frac{2\pi}{n}[v_1 v_2 \ldots v_n]\right) + \right.$$

$$\left. j[u_1 u_2 \ldots u_n]g(t)\sin\left(\omega_c t + \frac{2\pi}{n}[v_1 v_2 \ldots v_n]\right)\right]$$

$$= \text{Re}\left[\left(u_1 g(t)\cos\left(\omega_c t + \frac{2\pi}{n}v_1\right) + ju_1 g(t)\sin\left(\omega_c t + \frac{2\pi}{n}v_1\right)\right)\right.$$

$$\left(u_2 g(t)\cos\left(\omega_c t + \frac{2\pi}{n}v_2\right) + ju_2 g(t)\sin\left(\omega_c t + \frac{2\pi}{n}v_2\right)\right) \ldots$$

$$\left. \ldots \left(u_n g(t)\cos\left(\omega_c t + \frac{2\pi}{n}v_n\right) + ju_n g(t)\sin\left(\omega_c t + \frac{2\pi}{n}v_n\right)\right)\right]$$

$$= [u_1 u_2 \ldots u_n]g(t)\cos\left(\omega_c t + \frac{2\pi}{n}[v_1 v_2 \ldots v_n]\right)$$

$$= g(t)\left[\left(u_1 \cos\left(\omega_c t + \frac{2\pi}{n}v_1\right)\right)\left(u_2 \cos\left(\omega_c t + \frac{2\pi}{n}v_2\right)\right) \ldots \left(u_n \cos\left(\omega_c t + \frac{2\pi}{n}v_n\right)\right)\right]$$

a n-dimensional time-amplitude phase modulation signal pattern n-TAPP is a plane pattern composed of $n^2$ squares, each square is composed of a mix of carrier amplitude modulation and phase modulation in the square of two patterns-n-TAP and n-TPP; if the codeword $u = A_m(a; \; 1_1; \; (t_{l1})) = [u_1 u_2 \ldots u_n]$ of the amplitude signal pattern n-TAP comes from $\Gamma_n^2 = \Gamma_n$ (but $\Gamma_n^2 \ne \Gamma_n$), then the n-TAPP pattern has the same structure as the n-TAP pattern, but a multi-domain modulation value in the square is replaced by a joint value of the amplitude value and the phase value; if the codeword $v = P_m(a; \; 1_1; \; (t_{l1})^{q_2}) = [v_1 v_2 \ldots v_n]$ of the phase signal pattern n-TPP comes from $\Gamma_n^2 = \Gamma_n$ (but $\Gamma_n^1 \ne \Gamma_n$), then the n-TAPP pattern has the same structure as the n-TPP pattern, but the multi-domain modulation value in the square is replaced by the joint value of the amplitude value and the phase value;

model 5: it is set that the n-dimensional modulation multi-domain is a joint modulation of the amplitude and frequency of the carrier, set $d_i = A_i$ and $d_i = f_1$, the row index 1, 2, ..., n of the permutation matrix is used to determine a combination of the amplitude values $A_1, A_2, \ldots, A_n$ and the frequency values $f_1, f_2, \ldots, f_n$ from bottom to top, wherein i=0, 1, 2, ..., n is an index of the amplitude value and the frequency value after combination, which can be indexed by the amplitude value or by the frequency value; the amplitude chip or the amplitude slot and the frequency chip or the frequency slot, $\Delta d_b = d_i - d_{i-1} = \Delta A_b - A_i - A_{i-1}$ and $\Delta d_b = d_i - d_{i-1} = \Delta f_b = f_i - f_{i-1}$, the i-th carrier is formed by the i-th amplitude value and the i-th frequency value, b=1, 2, ..., n can be the index of the amplitude chip or the amplitude slot, or can be the index of the phase chip or the phase slot; that is to use two n×n permutation matrices to construct a dual-domain modulation signal model composed of a joint modulation multi-domain with n-dimensional time domain and n-dimensional amplitude domain as well as n-dimensional frequency domain, abbreviated as n-dimensional time amplitude frequency modulation signal (n-TAFM); the element "1" in the two permutation matrices is replaced by the amplitude value $A_i$ and the frequency value $f_i$ corresponding to the time chip $\Delta t_b$, $A_i$ is the i-th symbol value in the permutation codeword $A_m(a; l_1; (t_{l1})^{q_1})= (t_{l1})^{q_1}(al_1)=[u_1u_2 \ldots u_n]$, $f_i$ is numbered by the i-th symbol value in the permutation codeword $w=F_m(a; l_1; (t_{l1})^{q_3}) (t_{l1})^{q_3}(al_1)=[w_1w_2 \ldots w_n] \in \Gamma_n^3 \subset P_n$ when $q_1$, $q_3$ and a are determined, $A_i=u_i$ and $f_i=f_{w_i}$ can be obtained; if, a k-bit binary message sequence selects a codeword $[u_1u_2 \ldots u_n]$ in the permutation array code $\Gamma_n^1=\{(t_{l1})^{Q_1}\{al_1\}\}$, $Q_1 \leq n-1$, $0 \leq q_1 \leq Q_1$, $a=|L_n|$, another k-bit binary message sequence selects a codeword $[w_1w_2 \ldots w_n]$ in the permutation array code $\Gamma_n^3= \{(t_{l1})^{Q_3}\{al_1\}\}$, $Q_3 \leq n-1$, $0 \leq q_3 \leq Q_3$, $a=|L_n|$, then the amplitude and frequency signal n-TAFM of the carrier based on the permutation matrix will carry 2 k bits of binary message, the following mathematical expression can be modeled, comprising an overlay signal model and a real signal model:

$$s_m(t) = \text{Re}\left[A_m(a; l_1; (t_{l1})^{q_1})g(t)e^{j\left(2\pi f_{F_m(a;l_1;(t_{l1})^{q_3})}t\right)}\right]$$

$$= \text{Re}[(u_1g(t)\cos(2\pi f_{w_1}t) +$$

$$ju_1g(t)\sin(2\pi f_{w_1}t)(u_2g(t)\cos(2\pi f_{w_2}t) + ju_2g(t)\sin(2\pi f_{w_2}t))$$

$$\ldots \ldots (u_ng(t)\cos(2\pi f_{w_n}t) + ju_ng(t)\sin(2\pi f_{w_n}t))]$$

$$= [u_1u_2 \ldots u_n]g(t)\cos(2\pi f_{[w_1w_2 \ldots w_n]}t)$$

$$= g(t)[(u_1\cos(2\pi f_{w_1}t_1))(u_2\cos(2\pi f_{w_2}t_2)) (u_n\cos(2\pi f_{w_n}t_n))]$$

a n-dimensional time-amplitude frequency modulation signal pattern n-TAFP is a plane pattern composed of $n^2$ squares, each square is composed of a mix of carrier amplitude modulation and frequency modulation in the square of two patterns-n-TAP and n-TFP; if the codeword $u=A_m(a; l_1; (t_{l1})^{q_1})=[u_1u_2 \ldots u_n]$ of the amplitude signal pattern n-TAP comes from $\Gamma_n^1=\Gamma_n$ (but $\Gamma_n^2 \neq \Gamma_n$), then the n-TAPP pattern has the same structure as the n-TAP pattern, but the multi-domain modulation value in the square is replaced by the joint value of the amplitude value and the frequency value; if the codeword $w=F_m(a; l_1; (t_{l1})^{q_3})=[w_1w_2 \ldots w_n]$ of the frequency signal pattern n-TFP comes from $\Gamma_n^3=\Gamma_n$ (but $\Gamma_n^1 \neq \Gamma_n$), then the n-TAFP pattern has the same structure as the n-TFP pattern, but the multi-domain modulation value in the square is replaced by the joint value of the amplitude value and the frequency value;

model 6: it is set that the n-dimensional modulation multi-domain is the joint modulation of the amplitude domain, the phase domain and the frequency domain of the carrier, set $d_i=A_i$, $d_i=f_i$ and $d_i=f_i$, the row index 1, 2, ..., n of the permutation matrix is used to determine a combination of the amplitude values $A_1, A_2, \ldots, A_n$, the phase values $p_1, p_2, \ldots, p_n$ and the frequency values $f_1, f_2, \ldots, f_n$ from bottom to top, wherein i=0, 1, 2, ..., n is an index of the amplitude value, the phase value and the frequency value after combination, which can be indexed by the amplitude value, by the phase value, or by the frequency value; the amplitude chip or the amplitude slot, the phase chip or the phase slot, and the frequency chip or the frequency slot are respectively $\Delta d_b = d_i - d_{i-1} = \Delta A_b = A_i - A_{i-1}$, $\Delta d_b = d_i - d_{i-1} = \Delta p_b = p_i - p_{i-1}$ and $\Delta d_b = d_i - d_{i-1} = \Delta f_b = f_i - f_{i-1}$; the i-th carrier is formed by the i-th amplitude value, the i-th phase value and the i-th frequency value, b=1, 2, ..., n can be the index of the amplitude chip or the amplitude slot, or can be the index of the phase chip or the phase slot or can be the index of the frequency chip or the frequency slot; that is to use three n×n permutation matrices to construct a n-dimensional dual-domain modulation signal model composed of a joint modulation multi-domain with n-dimensional time domain and n-dimensional amplitude domain as well as n-dimensional phase domain and n-dimensional frequency domain, abbreviated as n-dimensional time-amplitude phase frequency modulation signal (n-TAPFM); the element "1" in the three permutation matrices is replaced by the amplitude value $A_i$, the phase value $p_i$ and the frequency value $f_i$ corresponding to the time chip $\Delta t_b$, $A_i$ is the i-th symbol value in the permutation codeword $A_m(a; l_1; (t_{l1})^{q_1})=(t_{l1})^{q_1}(al_1)= [u_1u_2 \ldots u_n]$, $p_i$ is determined by a symbol value $v_i$ in the permutation codeword $v=P_m(a; l_1; (t_{l1})^{q_2})=(t_{l1})^2(al_1)= [v_1v_2 \ldots v_n] \in \Gamma_n^2 \subset P_n$ $f_i$ is numbered by the i-th symbol value in the permutation codeword $w=F_m(a; l_1; (t_{l1})^{q_3})=(t_{l1})^{q_3}(al_1)=[w_1w_2 \ldots w_n] \in \Gamma_n^3 \subset P_n$, when $q_1$, $q_2$, $q_3$ and a are determined, $A_i=u_i$, $$p_i = \frac{2\pi}{n} \cdot v_i$$

and $f_i=f_{w_i}$ can be obtained; if, a first k-bit binary message sequence selects a codeword $[u_1u_2 \ldots u_n]$ in the permutation array code $\Gamma_n^1=\{(t_{l1})^{Q_1}\{al_1\}\}$, $Q_1 \leq n-1$, $1 \leq q_1 \leq Q_1$, a second k-bit binary message sequence selects a codeword $[v_1 v_2 \ldots v_n]$ in the permutation array coder $\Gamma_n^2=\{(t_{l1})^{Q_2}\{al_1\}\}$, $Q_2 \leq n-1$, $1 \leq q_2 \leq Q_2$, a third k-bit binary message sequence selects a codeword $[w_1w_2 \ldots w_n]$ in the permutation array code $\Gamma_n^3=\{(t_{l1})^{Q_3}\{al_1\}\}$, then the n-dimensional time-amplitude phase frequency modulation signal n-TAPFM based on the three permutation matrices will carry 3 k bits of binary message, the following mathematical expression can be modeled, comprising an overlay signal model and a real signal model:

$$s_m(t) = \text{Re}\left[A_m(a; l_1; (t_{l1})^{q_1})g(t)e^{j\left(2\pi f_{F_m(a;l_1;(t_{l1})^{q_3})}t + \frac{2\pi}{n}P_m(a;l_1;(t_{l1})^{q_2})\right)}\right]$$

$$= \text{Re}\left[\left(u_1g(t)\cos\left(2\pi f_{w_1}t + \frac{2\pi}{n}v_1\right) + ju_1g(t)\sin\left(2\pi f_{w_1}t + +\frac{2\pi}{n}v_1\right)\right)\right.$$

$$\left(u_2g(t)\cos\left(2\pi f_{w_2}t + \frac{2\pi}{n}v_2\right) + ju_2g(t)\sin\left(2\pi f_{w_2}t + \frac{2\pi}{n}v_2\right)\right)$$

$$\ldots \left(u_ng(t)\cos\left(2\pi f_{w_n}t + \frac{2\pi}{n}v_n\right) + ju_ng(t)\sin\left(2\pi f_{w_n}t + \frac{2\pi}{n}v_n\right)\right)\right]$$

$$= [u_1u_2 \ldots u_n]g(t)\cos\left(2\pi f_{[w_1w_2 \ldots w_n]}t + \frac{2\pi}{n}[v_1v_2 \ldots v_n]\right)$$

$$= g(t)\left[\left(u_1\cos\left(2\pi f_{w_1}t_1 + \frac{2\pi}{n}v_1\right)\right)\right.$$

$$\left.\left(u_2\cos\left(2\pi f_{w_2}t_2 + \frac{2\pi}{n}v_2\right)\right) \ldots \left(u_n\cos\left(2\pi f_{w_n}t_n + \frac{2\pi}{n}v_n\right)\right)\right]$$

a n-dimensional time-amplitude phase frequency modulation signal pattern n-TAPFP is a plane pattern composed of $n^2$ squares, each square is composed of a combination of carrier amplitude, phase and frequency modulation in the square of three patterns-n-TAP, n-TPP and n-TFP; if the codeword $u=A_m(a; l_1; (t_{l1})^{q_1})= [u_1u_2 \ldots u_n]$ of the amplitude signal pattern n-TAP comes from $\Gamma_n^1=\Gamma_n$ (but $\Gamma_n^2 \neq \Gamma_n$ and $\Gamma_n^3 \neq \Gamma_n$), then the n-TAPFP pattern has the same structure as the n-TAP pattern, but the multi-domain modulation value in the square is replaced by the joint value of the amplitude value, the phase value and the frequency value; if the codeword $v=P_m(a; l_1; (t_{l1})^{q_2})=[v_1 v_2 \ldots v_n]$ of the phase signal pattern n-TPP comes from $\Gamma_n^2=\Gamma_n$ (but $\Gamma_n^1 \neq \Gamma_n$ and $\Gamma_n^3 \neq \Gamma_n$), then the n-TAPFP pattern has the same structure as the n-TPP pattern, but the multi-domain modulation value in the square is replaced by the joint value of the amplitude value, the phase value and the frequency value; if the codeword $w=F_m(a; l_1; (t_{l1})^{q_3})=[w_1 w_2 \ldots w_n]$ of the frequency signal pattern n-TFP comes from $\Gamma_n^3=\Gamma_n$ (but $\Gamma_n^1 \neq \Gamma_n$ and $\Gamma_n^2 \neq \Gamma_n$), then the n-TAPFP pattern has the same structure as the n-TFP pattern, but the multi-domain modulation value in the square is replaced by the joint value of the amplitude value, the phase value and the frequency value.

6. The TFDMA random self-organizing ad hoc network construction method according to claim 5, wherein the frequency domain modulation signal comprises a design of N hopping frequency points and a design of the center frequency of N subcarriers, and an allocation of total frequency of the system N to each user, wherein:

a design scheme of a sub-channel bandwidth $\Delta f$ is: a spectrum bandwidth allocated to the TFDMA ad hoc network is W, and two ways to divide W are determined; the first way is $\Delta f=f_i-f_{i-1}$, which is a coherent bandwidth, which is defined as the minimum bandwidth that does not cause frequency interference, this frequency allocation method maximizes the number of sub-channels $N=W/\Delta f$ without frequency interference, and which is the design scheme for the sub-channel bandwidth $\Delta f$ with the largest number of users; the second way is $\Delta f=f_i-f_{i-1}$, which is much larger than the coherent bandwidth, the number of frequency points of the system is still calculated through $N=W/\Delta f$, but the number of total frequency points of the system is much smaller than that of the first method, each user still uses n frequency points to access the TFDMA network, but a method of using n frequency points is randomly hopped, and the n frequency points are different each time, thereby forming a fast frequency hopping system, this is the design scheme for the sub-channel bandwidth $\Delta f$ with the strongest anti-interference ability but the smallest number of users; it is further required that, the design scheme for the sub-channel bandwidth $\Delta f$ can be changed between the above schemes;

a total number of system points N allocated to each user's n frequency allocation comprises the following three methods: the first method is a continuous n frequency allocation scheme, the sub-channel bandwidth $\Delta f$ is the coherent bandwidth, and the minimum center frequency of the system is $f_0$; the minimum center frequency $f_{lc,0}$ and n frequencies of each user can be calculated from $f_{lc,0}$ and $\Delta f$; the minimum center frequency point of each user is $f_{lc,0}=f_0+(l-1) \cdot n \cdot \Delta f$, $l=1, 2, \ldots, N/n$, $N=W/\Delta f$; if each user is assigned n different frequencies, the n frequencies of the first user can be calculated using the expression $f_{lc,w_i}=f_{lc,0}+(i-1) \Delta f$; the n frequencies of the second user can be calculated using the expression $f_{2c,i-1}=f_{2c,0}+(i-1) \cdot \Delta f$; ...; the n frequencies of the N/n-th user can be calculated using the expression $f_{(N/n)c,w_i}=f_{(N/n)c,0}+(i-1) \cdot \Delta f$, $i=1, 2, \ldots, n$; the second method is that n hopping frequencies are designed in advance, and the sub-channel bandwidth $\Delta f=f_i-f_{i-1}$ is much larger than the coherent bandwidth, the number of the frequency points of the system is still calculated through $N=W/\Delta f$, each user can take n frequency points, but the method of taking n frequency points is customizable and can be designed for temporary purpose; after each user gets n frequency points, the permutation codeword $[w_1 w_2 \ldots w_n]$ can be used to number the n frequency points, that is, the n hopping frequency points of each user can be correspondingly numbered from small to large according to the frequency value and the symbol value, and expressed as $f_{w_1}, f_{w_2}, \ldots, f_{w_n}$, such that these n frequency points can be coded, and it is specified that after a certain duration, such as after an epoch, the user can hop to a new customized n frequency points; the third method is an expansion allocation plan of n frequencies, set j denote an expansion coefficient, which means the minimum frequency interval between the n frequency points for each user is j times the coherent bandwidth or the sub-channel bandwidth $\Delta f$, and a range of the expansion coefficient j is $2 \leq j \leq N/n$; set the minimum center frequency of the system is still $f_0$, the minimum center frequency and the n frequencies of each user can be calculated through $f_0$, $\Delta f$ and j; the minimum center frequency of each user is $f_{lc,0}=f_0+(l-1) \cdot j \cdot n \cdot \Delta f$, $l=1, 2, \ldots, N/n$, $N=W/\Delta f$; the n frequencies of the first user can be calculated using the expression $f_{1c,i-1}=f_{1c,0}+(i-1) \cdot j \cdot \Delta f$; the n frequencies of the second user can be calculated using the expression $f_{2c,i-1}=f_{2c,0}+(i-1) \cdot j \cdot \Delta f$; ...; the n frequencies of N users can be calculated using the expression $f_{(N/n)c,i-1}=f_{(N/n)c,0}+(i-1) \cdot j \cdot \Delta f$, $i=1, 2, \ldots, n$; in the case of three methods, the maximum number of users of frequency division multiple access that can be run by the system in a time slot is N/n; a k-bit binary message sequence selects a codeword $[w_1 w_2 \ldots w_n]$, $Q_3 \leq n-1$, $a=|L_n|$ in the permutation array constellation diagram $\Gamma_n^3=\{(t_{l1})^{Q_3}\{al_1\}\}$, for the first and third methods, n symbols of a certain codeword in the constellation diagram $\Gamma_n^3$ control the n frequency generator of a user to generate n frequencies $f_{w_1}, f_{w_2}, \ldots, f_{w_n}$ and control emission of the n frequencies; the second method is to use n symbols of the codeword $[w_1 w_2 \ldots w_n]$ to number the n frequencies allocated to a user, each time the same n frequencies are transmitted, but the order of the n frequencies is different during each transmission, after an epoch, it jumps to new n frequency, and then renumbered by the codewords $[w_1 w_2 \ldots w_n]$ according to the frequency value from small to large.

7. The TFDMA random self-organizing ad hoc network construction method according to claim 3, wherein the n×n permutation matrix used to construct the n-dimensional dual-domain modulation signal model is a permutation codeword obtained from the permutation group code $P_n$, and then $2^k$ codewords can be obtained from the n(n−1) codewords of $P_n$ to constitute the permutation array code $1'n$, and the $2^k$ codewords of the permutation array code $\Gamma_n$ constitute the permutation array constellation diagram $\Gamma_n$ of the n-dimensional high-order ($2^k$ order) dual-domain modulation signal, the permutation array code and the permutation array constellation diagram can be equivalently expressed by $\Gamma_n$, the specific design steps for the permutation array code $\Gamma_n$ are:

step 1: a cycle-right-shifted operator $t_m$ is constructed, when it acts as any permutation codeword $x=[x_1 x_2 \ldots x_n]$, the rightmost element of this codeword is moved to the leftmost, and the remaining n−1 elements in turn is moved to the right, that is, $t_m x=t_m[x_1 x_2 \ldots x_n]=[x_n x_1 x_2 \ldots x_{n-1}]$, a function of $t_m$ is equivalent to storing the permutation codeword in a n-dimensional cycle-shift register, and the n-dimensional cycle-shift register is shifted to the right once to obtain a new permutation codeword; a cycle-left-shifted operator $t_{l1}$ is constructed, when it acts on any permutation vector $x=[x_1 x_2 \ldots x_n]$, the leftmost element of this vector is moved to the rightmost, and the remaining n−1 elements are moved to the left in turn, that is, $t_{l1}x=t_{l1}[x_1 x_2 \ldots x_n]=[x_2 x_3 \ldots x_{n-1} x_n x_1]$, a function of $t_{l1}$ is equivalent to storing the permutation codeword into the n-dimensional cycle-shift register, and the n-dimensional cycle-shift register is shifted to the left once to obtain a new permutation codeword;

step 2: a composition function $(t_{rn})^{n-1}$ of the left-shifted operator $t_{l1}$ is constructed, when it acts on any codeword $x=[x_1 x_2 \ldots x_n]$, n permutation codeword including this permutation codeword x are obtained, thereby constituting a loop Latin square, and constituting an orbit set of the permutation codeword with x as the leader of the orbit, or constituting a coset with x as the leader of the coset, thereby obtaining a set $\{(t_{l1})^{n-1}x\}=\{x, (t_{l1})^1 x, (t_{l1})^2 x, \ldots, (t_{l1})^{n-1}x\}=\{(t_{l1})^{n-1}[x_1 x_2 \ldots x_n]\}=\{[x_1 \ldots x_n], \ldots (t_{l1})^1[x_1 \ldots x_n], (t_{l1})^2[x_1 \ldots x_n], \ldots, (t_{l1})^{n-1}[x_1 \ldots x_n]\}=\{[x_1 \ldots x_n], [x_n x_1 \ldots x_{n-1}], [x_{n-1} x_n x_1 \ldots x_{n-2}], \ldots [x_2 \ldots x_n x_1]\}$ constituted by n permutation codewords containing the permutation codeword x; a composition function $(t_{rn})^{n-1}$ of the right-shifted operator $t_{rn}$ is constructed, the same codeword set $\{(t_{l1})^{n-1}x\}=\{x,(t_{l1})^1 x, (t_{l1})^2 x, \ldots, (t_{l1})^{n-1}x\}=\{(t_{l1})^{n-1}[x_1 x_2 \ldots x_n]\}=\{[x_1 \ldots x_n], (t_{l1})^1[x_1 \ldots x_n], (t_{l1})^2[x_1 \ldots x_n], \ldots, (t_{l1})^{n-1}[x_1 \ldots x_n]\}=\{[x_1 \ldots x_n], [x_n x_1 \ldots x_{n-1}], [x_{n-1} x_n x_1 \ldots x_{n-2}], \ldots, [x_2 \ldots x_n x_1]\}$ is obtained; the codeword set $\{(t_{l1})^{n-1}x\}$ and $\{(t_{rn})^{n-1}x\}$ are the same set, but the order of their n codewords is different;

step 3: the composition function $(t_{l1})^Q$ of the cycle-left-shifted operator $t_{l1}$ and the composition function $(t_{rn})^Q$ of the cycle-right-shifted operator $t_{rn}$ to act on a set produced by a coset leader set $L_n$ is the permutation array code $\Gamma_n$, the general calculation expression is $\Gamma_n=\{(t_{l1})^Q L_n\}$ or $\Gamma_n=\{(t_{rn})^Q L_n\}$, these two code sets are different, $Q(\le n-1)$ is called a cycle-shifted index, its value is the power of 2 minus 1; specifically 9 permutation array codes: their code length is n=4, 5, 8, 15, 16, 17, 32, 51, 64; binary message that can carry k bits corresponds to k=3, 4, 5, 6, 7, 8, 9, 10, 11 bits; the number of cosets contained in these 9 permutation array codes are respectively $|L_n|=2^{k_1}=2, 4, 4, 8, 8, 16, 16, 32, 32$, the coset is indexed by $k_1$-bit binary numbers, parameter $k_1=1, 2, 2, 3, 3, 4, 4, 5, 5$ respectively give a bit length of a binary index of $2^{k_1}$ cosets of the 9 permutation array codes; the largest number of codewords selected in each coset of the 9 permutation array codes is $2^{k_2}$ and corresponding parameters $k_2=2, 2, 3, 3, 4, 4, 5, 5,6$ respectively give a bit length of a binary index of $2^{k_2}$ codewords selected from each coset of the 9 permutation array codes, and thus the cycle-shifted index is $Q=2^{k_2}-1$, where $k=k_1+k_2$ is required; a size of the 9 permutation array codes is $|\Gamma_n|=2^k=8, 16, 32, 64, 128, 256, 512, 1024, 2048$, for all codewords of the 9 permutation array codes, the maximum number of fixed-points is $\delta=2, 1, 4, 5, 8, 1, 16, 17, 32$; the minimum Hamming distances of the 9 permutation array codes are respectively $d_{\Gamma_n}=d_{P_n}=d_{L_n}=2, 4, 4, 10, 8, 16, 16, 34, 32$; as for the method of generating the permutation array codes, the 9 permutation array codes are calculated by the following expressions: $\Gamma_4=\{(t_{l1})^3 L_4\}$, $\Gamma_5=\{(t_{l1})^3 L_5\}$, $\Gamma_8=\{(t_{l1})^7 L_8\}$, $\Gamma_{15}=\{(t_{l1})^7 L_{15}\}$, $\Gamma_{16}=\{(t_{l1})^{15} L_{16}\}$, $\Gamma_{17}=\{(t_{l1})^{15} L_{17}\}$, $\Gamma_{32}=\{(t_{l1})^{31} L_{32}\}$, $\Gamma_{51}=\{(t_{l1})^{31} L_{51}\}$, $\Gamma_{64}=\{(t_{l1})^{63} L_{64}\}$.

8. The TFDMA random self-organizing ad hoc network construction method according to claim 7, wherein in the calculation expression of the 9 permutation array codes $\Gamma_4, \Gamma_5, \Gamma_8, \Gamma_{15}, \Gamma_{16}, \Gamma_{17}, \Gamma_{32}, \Gamma_{51}, \Gamma_{64}$, the method of generating the coset leader set $L_n$ is to use proportional transformation $f_a(x)=ax$, when $x=l_1$ is an unit permutation vector, it is used to calculate $L_n=\{al_1 | a \in Z_{n-1}; l_1=[12 \ldots n] \in S_n\} \cup S_n$, which can be divided into three situations:

situation 1, when n is a prime number, the coset leader set $L_n$ is a largest one-fixed-point subgroup, the size of $L_n$ is $|L_n|=n-1$, the largest fixed-point of $L_n$ is $\delta=1$, and the smallest Hamming distance of $L_n$ is $d_{L_n}=n-1$, $L_n$ is a (n,n−1,n−1) permutation group code; the calculation expression of $L_n$ is $L=\{al_1 | a \in Z_{n-1}; l_1=[12 \ldots n] \in S_n\}$, which can be used to calculate the largest one-fixed-point subgroup $L_5=\{al_1 | a \in \{1,2,3,4\}; l_1=[x_1 x_2 x_3 x_4 x_5]\}$ and $L_{17}=\{al_1 | a \in \{1, 2, \ldots, 16\}; l_1=[x_1 x_2 \ldots x_{16} x_{17}]\}$ with code length n=5,17;

situation 2: when $n=_2 r$ is a power of 2, $r \ge 2$ is a positive integer, the size of $L_n$ is $|L_n|=2^{r-1}$, and the maximum fixed-point of $L_n$ is $\delta=2^{r-1}$, the minimum Hamming distance of $L_n$ is $d_{L_n}=2^{r-1}$, the leader set of the coset $L_n$ is a $(2^r, 2^{r-1}, 2^{r-1})$ permutation group code, the calculation expression of $L_n$ is $L_n=\{al_1 | a \in \{$ all odd numbers from 1 to $2^r\}; l_1=[12 \ldots n] \in S_n\}$, which can be used to calculate the leader set of the coset $L_4=\{al_1 | a \in \{1,3\}; l_1=[x_1 x_2 x_3 x_4]\}$, $L_8=\{al_1 | a \in \{1,3,5,7\}; l_1=[x_1 x_2 \ldots x_7 x_8]\}$, $L_{16}=\{al_1 | a \in \{1,3,5,7,9,11,13,15\}; l_1=[x_1 x_2 \ldots x_{15} x_{16}]\}$, $L_{32}=\{al_1\} | a \in \{1, 3, 5, 7, \ldots, 29, 31\}; l_1=[x_1 x_2 \ldots x_{31} x_{32}]\}$, $L_{64}=\{al_1 | a \in \{$ all odd numbers from 1 to 64$\}; l_1=[x_1 x_2 \ldots x_{63} x_{64}]\}$ with a code length as n=4, 8, 16, 32, 64;

situation 3: when n>1 is a product of two prime numbers and contains 3, set h be another prime number, and the size of $L_n$ is $|L_n|=|\{$the set of all numbers from 1 to n−1 excluding multiples of 3 and multiples of h$\}|=\varphi(n)$, the fixed-point contained in the permutation vector of the maximum fixed-point of $L_n$ is $\delta$=the number of all multiples of 3 from 1 to n−1, the minimum Hamming distance of $L_n$ is $d_L=n-\delta$, $L_n$ is a (n,($\varphi$(n),n−$\delta$) permutation group code, the calculation expression of $L_n$ is $L_n=\{a l\_1 | a \in \{$a set formed by all 5 numbers from 1 to n−1 excluding multiples of 3 and multiples of h$\}$; $l_1=[x_1 x_2 \ldots x_n] \in S_n\}$, which can be used to calculate a leader set of the coset $L_{15}=\{al_1 | a \in \{1,2,4,7,8,11,13, 14\}; l_1=[x_1 x_2 \ldots x_{14} x_{15}]\}$ and $$L_{51} = \left\{ al_1 \ \middle| \ \begin{array}{c} a \in \{\text{natural numbers from 1 to 51 excluding} \\ \text{multiples of 3 and multipes of 17}\}; \\ l_1 = [x_1 x_2 \ldots x_{50} x_{51}] \end{array} \right\}$$

with a code length of n=15,51.

9. The TFDMA random self-organizing ad hoc network construction method according to claim 3, wherein the permutation array constellation diagram of the n-dimensional high-order dual-domain modulation signal, the n-dimensional vectors used to modulate the amplitude, phase and frequency of the n carriers come from $2^k$ permutation codewords from the 9 permutation array codes, a signal point $s_m(t)$ of six types of the n-dimensional dual-domain signal model is controlled by the subscript m=1, 2, . . . , $|\Gamma_n|$ to form a signal point generated by $|\Gamma_n|=2^k$ permutation codewords, these $2^k$ signals points constitute the n-dimensional high-order dual-domain modulation signal permutation array constellation diagram, expressed as a set $\{s_m(t) \mid m=1, 2, \ldots, |\Gamma_n|; s_m(t) \in \{\text{n-TPM}, \text{n-TFM}, \text{n-TAPM}, \text{n-TAFM}, \text{n-TAPFM}\}\}$, the specific structure design is as follows:

n-TAM constellation diagram: the n-dimensional $2^k$ order time and amplitude dual-domain modulation signal permutation array constellation diagram is a set $\{s_m(t) \mid m=1, 2, \ldots, 2^k; s_m(t)=[u_1 u_2 \ldots u_n]g(t)\cos \omega_c t; [u_1 u_2 \ldots u_n] \in \Gamma_n\}$ constituted by $2^k$ signal points $s_m(t)$, which are $2^k$ constellation diagrams constituted by "amplitude modulated signals controlled sequentially by n time chips";

n-TPM constellation diagram: the n-dimensional $2^k$ order time and phase dual-domain modulation signal permutation array constellation diagram is a set $$\left\{ s_m(t) \; \middle| \; \begin{array}{l} m = 1, 2, \ldots, 2^k; \\ s_m(t) = g(t)\left[\cos\left(\omega_c t_1 + \frac{2\pi}{n}v_1\right)\cos\left(\omega_c t_2 + \frac{2\pi}{n}v_2\right) \ldots \right. \\ \left. \cos\left(\omega_c t_n + \frac{2\pi}{n}v_n\right)\right]; \\ [v_1 v_2 \ldots v_n] \in \Gamma_n \end{array} \right\}$$

constituted by $2^k$ signal points $s_m(t)$, which are $2^k$ constellation diagrams constituted by "phase modulated signals controlled sequentially by n time chips";

n-TFM constellation diagram: the n-dimensional $2^k$ order time and frequency dual-domain modulation signal permutation array constellation diagram is a set $\{s_m(t) \mid m=1, 2, \ldots, 2^k; s_m(t)=g(t)[(\cos 2\pi f_{w_1} t_1)(\cos 2\pi f_{w_2} t_2) \ldots (\cos 2\pi f_{w_n} t_n)]; [w_1 w_2 \ldots w_n] \in \Gamma_n\}$ constituted by $2^k$ signal points $s_m(t)$, which are $2^k$ constellation diagrams constituted by "frequency modulated signals controlled sequentially by n time chips";

n-TAPM constellation diagram: the n-dimensional $2^k$ order time and amplitude-phase joint dual-domain modulation signal permutation array constellation diagram is a set $$\left\{ s_m(t) \mid m = 1, 2, \ldots, 2^k; \right.$$
$$s_m(t) = g(t)\left[\left(u_1 \cos\left(\omega_c t_1 + \frac{2\pi}{n}v_1\right)\right)\left(u_2 \cos\left(\omega_c t_2 + \frac{2\pi}{n}v_2\right)\right) \ldots \right.$$
$$\left. \left(u_n \cos\left(\omega_c t_n + \frac{2\pi}{n}v_n\right)\right)\right]; [u_1 u_2 \ldots u_n] \in \Gamma_n^1; [v_1 v_2 \ldots v_n] \in \Gamma_n^2; \Gamma_n^1, \Gamma_n^2 \subseteq \Gamma_n \right\}$$

constituted by $2^k$ signal points $s_m(t)$, which are $2^k$ constellation diagrams constituted by "amplitude and phase joint modulation signals controlled sequentially by n time chips";

n-TAFM constellation diagram: the n-dimensional $2^k$ order time and amplitude-frequency dual-domain modulation signal permutation array constellation diagram is a set $\{s_m(t) m=1, 2, \ldots, 2^k; s_m(t)=g(t)[(u_1 \cos(2\pi f_{w_1} t_1))(u_2 \cos(2\pi f_{w_2} t_2)) \ldots (u_n \cos(2\pi f_{w_n} t_n))]; [u_1 u_2 \ldots u_n] \in \Gamma_n^1; [w_1 w_2 \ldots w_n] \in \Gamma_n^3; \Gamma_n^1, \Gamma_n^3 \subseteq \Gamma_n\}$ constituted by $2^k$ signal points $s_m(t)$, which are $2^k$ constellation diagrams constituted by "variable power frequency modulation signals controlled sequentially by n time chips";

n-TAPFM constellation diagram: the n-dimensional $2^k$ order time and amplitude-phase-frequency joint dual-domain modulation signal permutation array constellation diagram is a set $$\left\{ s_m(t) \mid m = 1, 2, \ldots, 2^k; \right.$$
$$s_m(t) = g(t)\left[\left(u_1 \cos\left(2\pi f_{w_1} t_1 + \frac{2\pi}{n}v_1\right)\right)\left(u_2 \cos\left(2\pi f_{w_2} t_2 + \frac{2\pi}{n}v_2\right)\right) \right.$$
$$\left. \ldots \left(u_n \cos\left(2\pi f_{w_n} t_n + \frac{2\pi}{n}v_n\right)\right)\right]; [u_1 u_2 \ldots u_n] \in$$
$$\Gamma_n^1; [v_1 v_2 \ldots v_n] \in \Gamma_n^2; [w_1 w_2 \ldots w_n] \in$$
$$\left. \Gamma_n^3; \Gamma_n^1, \Gamma_n^2, \Gamma_n^3 \subseteq \Gamma_n \right\}$$

constituted by $2^k$ signal points $s_m(t)$, which are $2^k$ constellation diagrams constituted by "variable power phase modulation-frequency modulation joint modulation signals controlled sequentially by n time chips";

the permutation array code $\Gamma_n = \{(t_{l1})^Q \{a l_1\}\}$, and its subset $\Gamma_n^1 = \{(t_{l1})^{Q_1} \{a l_1\}\}$, $\Gamma_n^2 = \{(t_{l1})^{Q_2} \{a l_1\}\}$ and $\Gamma_n^3 = \{(t_{l1})^{Q_3} \{a l_1\}\}$ can be generated by an n-dimensional shift register array; the number of shift register n-SRs is determined through a value of parameter $a \in \{\varphi\}$, and the number of cycle-shifteds of $|\{\varphi\}|=|L_n|$n-SRs is determined through values of designed parameters $Q$, $Q_1$, $Q_2$ and $Q_3$.

\* \* \* \* \*